United States Patent
Kyuma

(10) Patent No.: US 10,632,371 B2
(45) Date of Patent: Apr. 28, 2020

(54) STORAGE MEDIUM HAVING STORED THEREIN INFORMATION PROCESSING PROGRAM, INFORMATION PROCESSING SYSTEM, INFORMATION PROCESSING APPARATUS, AND INFORMATION PROCESSING METHOD

(71) Applicant: NINTENDO CO., LTD., Kyoto (JP)

(72) Inventor: Koichi Kyuma, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 289 days.

(21) Appl. No.: 15/729,798

(22) Filed: Oct. 11, 2017

(65) Prior Publication Data

US 2018/0178120 A1 Jun. 28, 2018

(30) Foreign Application Priority Data

Dec. 27, 2016 (JP) .................................. 2016-252315
May 19, 2017 (JP) .................................. 2017-099496

(51) Int. Cl.
*A63F 13/285* (2014.01)
*A63F 13/24* (2014.01)
*A63F 13/25* (2014.01)
*A63F 13/92* (2014.01)
*A63F 13/23* (2014.01)
*A63F 13/2145* (2014.01)
*A63F 13/50* (2014.01)

(52) U.S. Cl.
CPC ........ *A63F 13/285* (2014.09); *A63F 13/2145* (2014.09); *A63F 13/23* (2014.09); *A63F 13/24* (2014.09); *A63F 13/25* (2014.09); *A63F 13/50* (2014.09); *A63F 13/92* (2014.09)

(58) Field of Classification Search
CPC ...... A63F 13/285; A63F 13/23; A63F 13/235; A63F 13/24; A63F 13/25; A63F 13/92; A63F 13/2145; A63F 13/26; A63F 2300/1037; G06F 3/016
See application file for complete search history.

(56) References Cited

U.S. PATENT DOCUMENTS

| 6,921,336 B1* | 7/2005 | Best .................... A63F 13/10 463/32 |
|---|---|---|
| 2003/0090460 A1 | 5/2003 | Schena et al. |
| 2006/0046843 A1 | 3/2006 | Nakajima |

(Continued)

FOREIGN PATENT DOCUMENTS

| EP | 1 057 504 A2 | 12/2000 |
|---|---|---|
| JP | 2006-68210 | 3/2006 |

(Continued)

OTHER PUBLICATIONS

U.S. Appl. No. 15/616,100, filed Jun. 7, 2017, Koichi Kyuma.

(Continued)

*Primary Examiner* — Jasson H Yoo
(74) *Attorney, Agent, or Firm* — Nixon & Vanderhye, P.C.

(57) ABSTRACT

Vibration data for vibrating a vibrator is generated, and in accordance with a use form of a device including the vibrator, a first function or a second function is selected. Then, based on an amplitude value in the vibration data and the selected function, a new amplitude value is set, and vibration data including the set amplitude value is output to the device.

20 Claims, 30 Drawing Sheets

(56) References Cited

U.S. PATENT DOCUMENTS

| | | | |
|---|---|---|---|
| 2006/0290662 A1 | 12/2006 | Houston et al. | |
| 2007/0265088 A1 | 11/2007 | Nakada et al. | |
| 2007/0285216 A1 | 12/2007 | Tierling et al. | |
| 2011/0134061 A1* | 6/2011 | Lim | G06F 3/016 345/173 |
| 2011/0190058 A1 | 8/2011 | Houston et al. | |
| 2011/0248817 A1 | 10/2011 | Houston et al. | |
| 2012/0084467 A1* | 4/2012 | Birnbaum | G06F 3/016 710/16 |
| 2013/0038603 A1 | 2/2013 | Bae | |
| 2013/0165226 A1 | 6/2013 | Thorner | |
| 2013/0261811 A1 | 10/2013 | Yagi et al. | |
| 2013/0281211 A1 | 10/2013 | Yasuda et al. | |
| 2013/0281212 A1 | 10/2013 | Tsuchiya et al. | |
| 2014/0285453 A1 | 9/2014 | Park et al. | |
| 2015/0268722 A1 | 9/2015 | Wang et al. | |
| 2015/0290076 A1 | 10/2015 | Hobbs et al. | |
| 2015/0323995 A1* | 11/2015 | Lim | G06F 3/0416 345/174 |
| 2015/0356838 A1 | 12/2015 | Obana et al. | |
| 2016/0163165 A1 | 6/2016 | Morrell et al. | |
| 2016/0214007 A1 | 7/2016 | Yamashita | |
| 2016/0361633 A1 | 12/2016 | Fujita et al. | |
| 2016/0367892 A1 | 12/2016 | Otani et al. | |
| 2017/0087458 A1 | 3/2017 | Nakagawa et al. | |
| 2018/0028910 A1 | 2/2018 | Aoki et al. | |
| 2018/0028911 A1 | 2/2018 | Aoki et al. | |

FOREIGN PATENT DOCUMENTS

| | | |
|---|---|---|
| JP | 2007-301038 | 11/2007 |
| JP | 2013-236909 | 11/2013 |
| WO | 2012/125924 A2 | 9/2012 |

OTHER PUBLICATIONS

Extended European Search Report dated Dec. 12, 2017 issued in European Application No. 17175003.7 (9 pgs.).

Extended European Search Report dated Feb. 13, 2018 issued in European Application No. 17194859.9 (7 pages).

* cited by examiner

FIG. 9
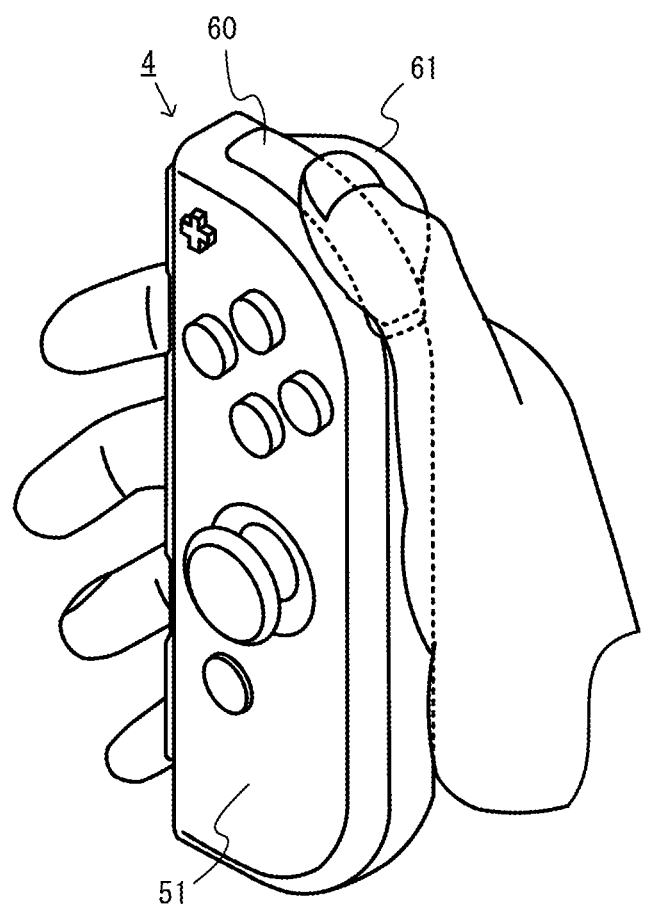
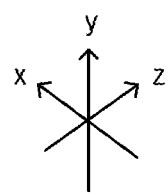

FIG. 11
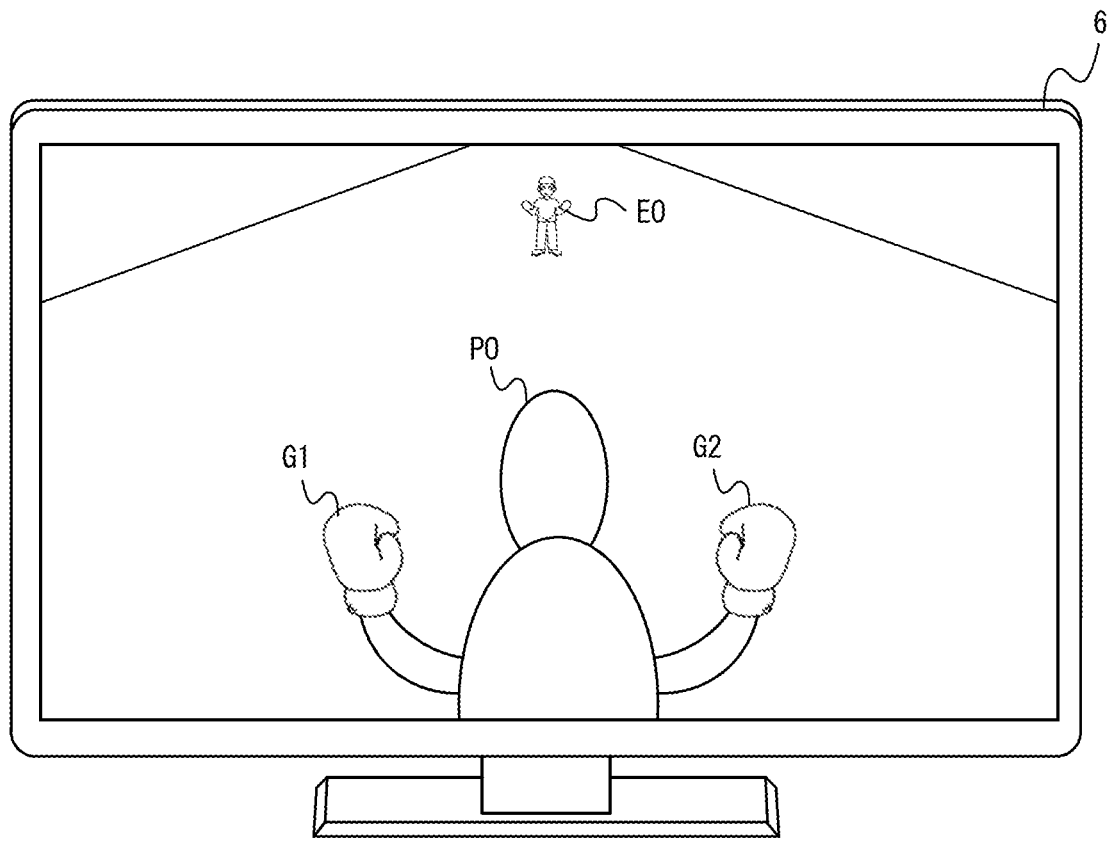
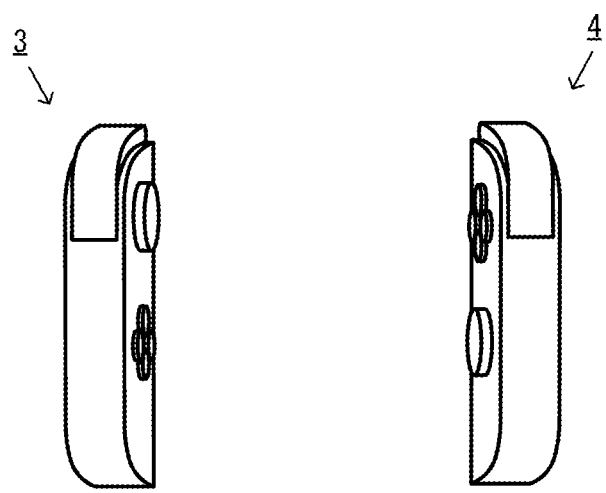

FIG. 12
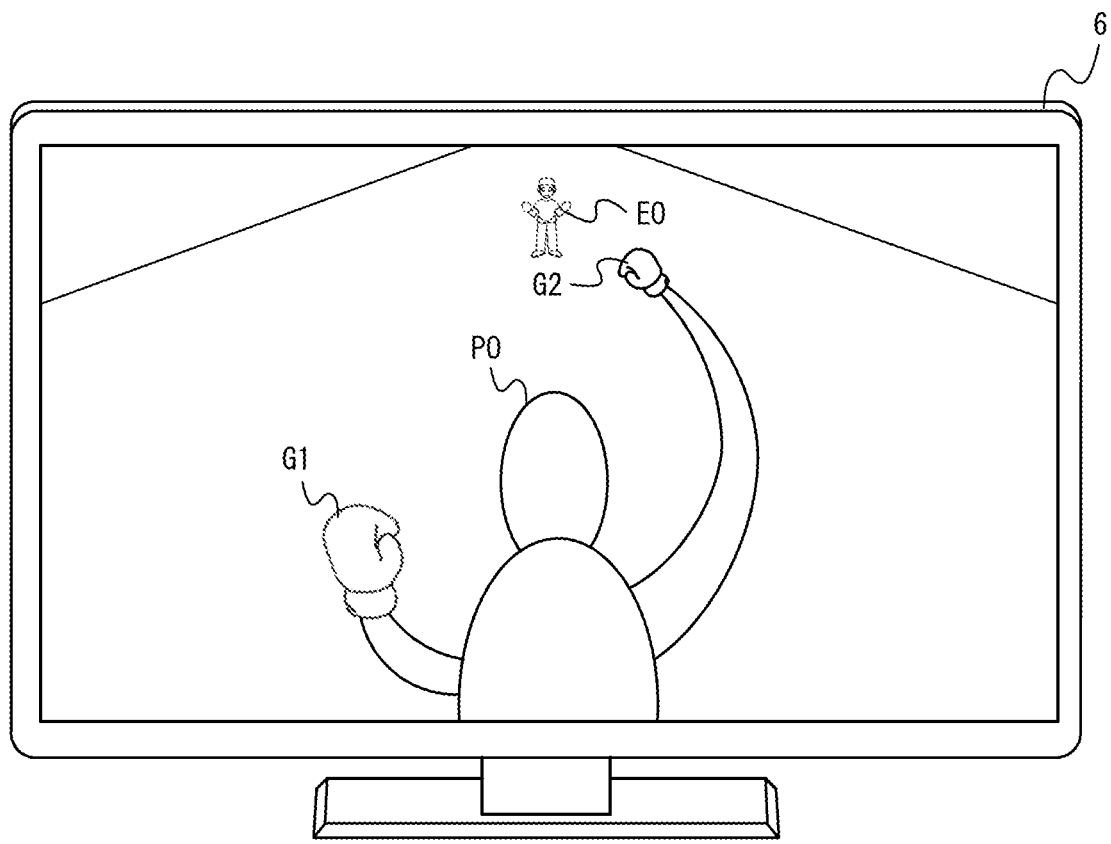
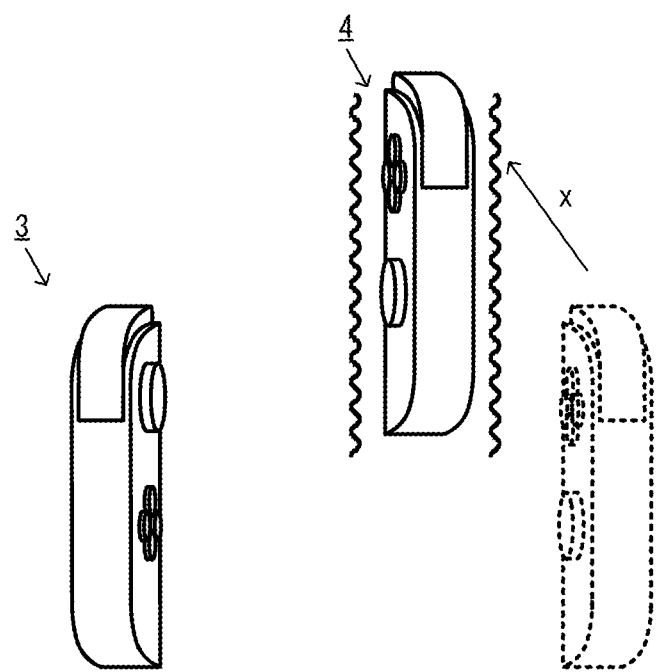

FIG. 13
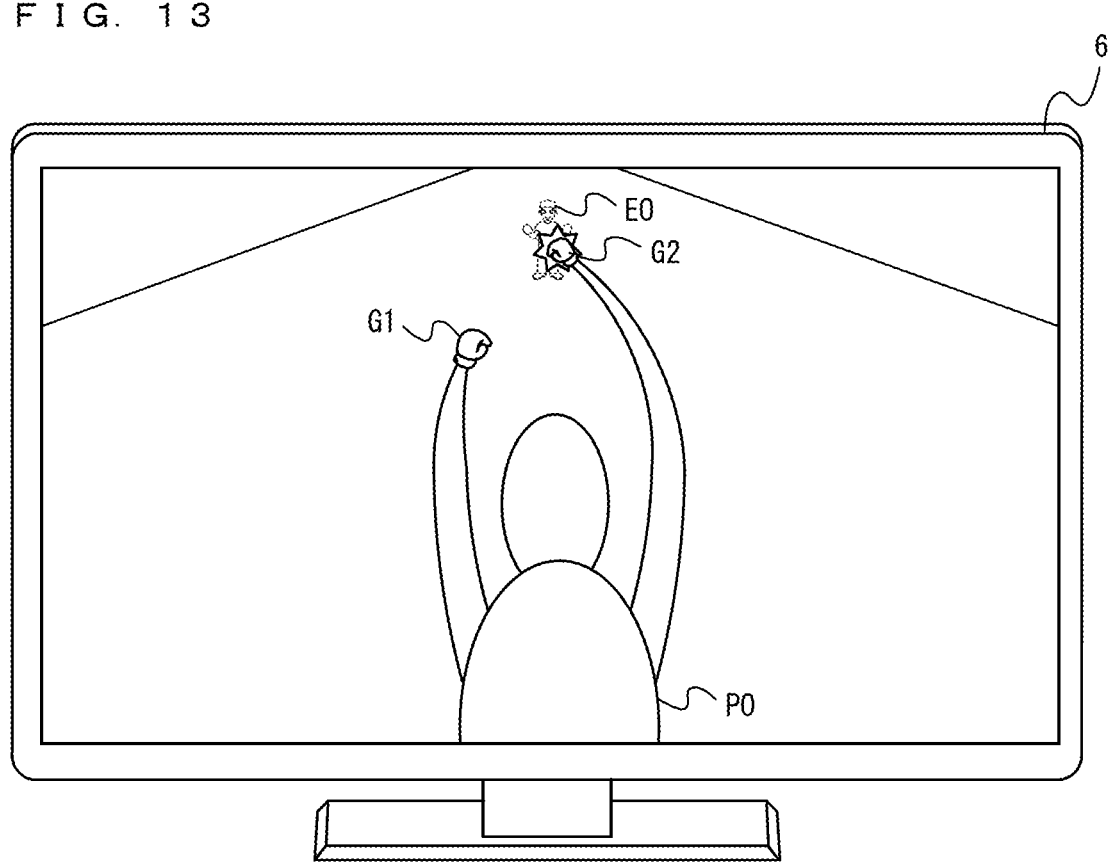
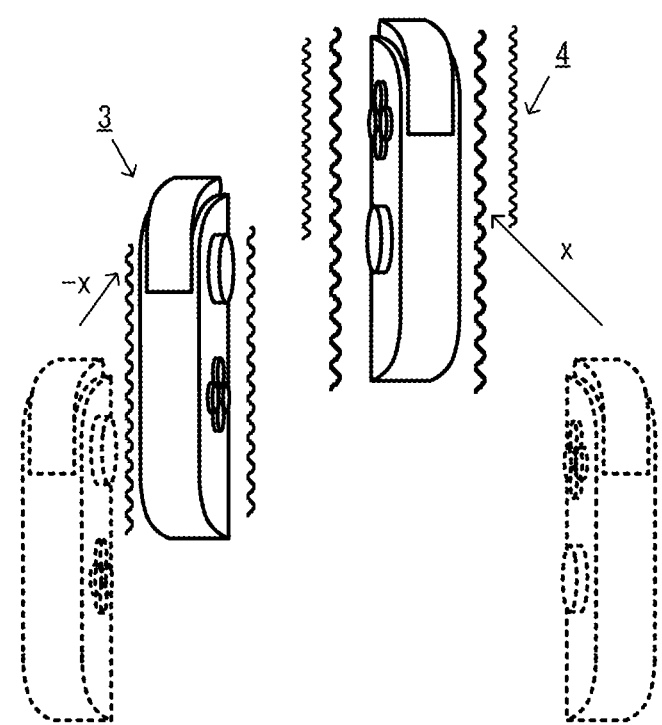

FIG. 14
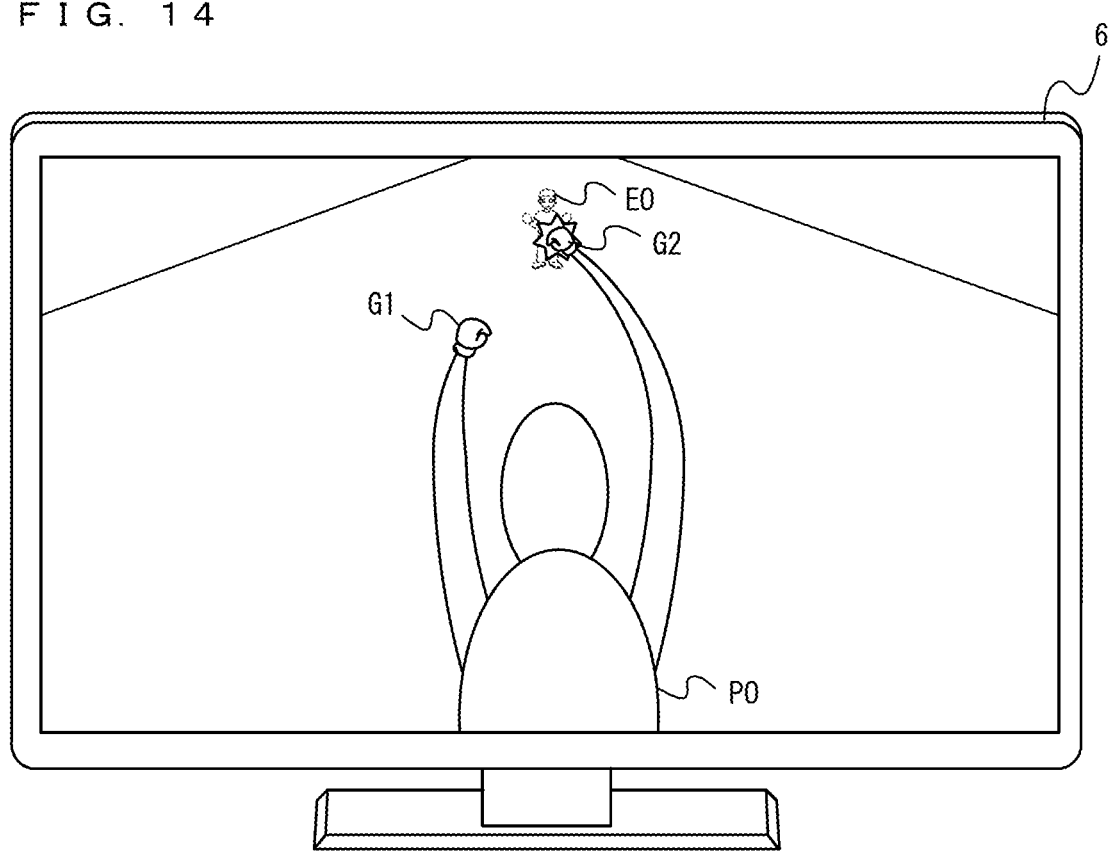
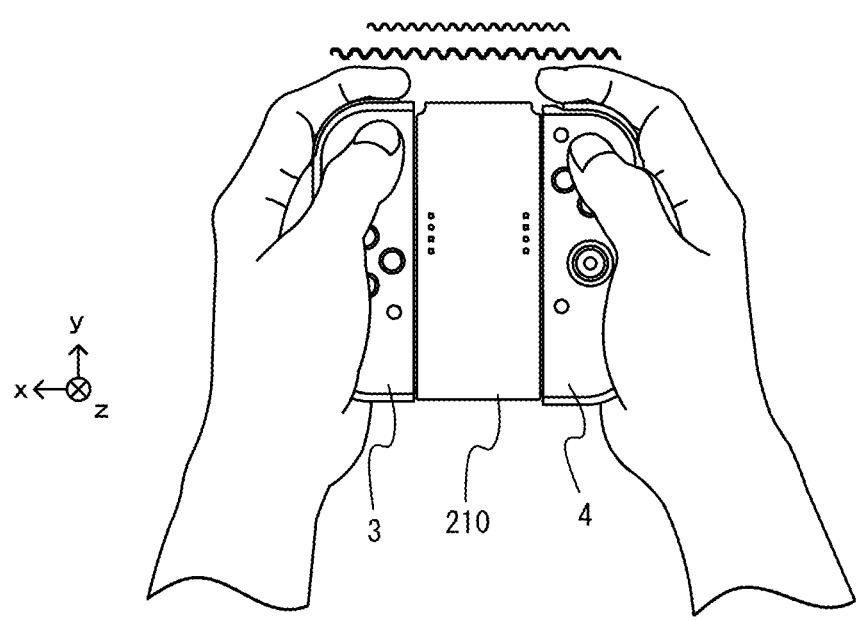

FIG. 15
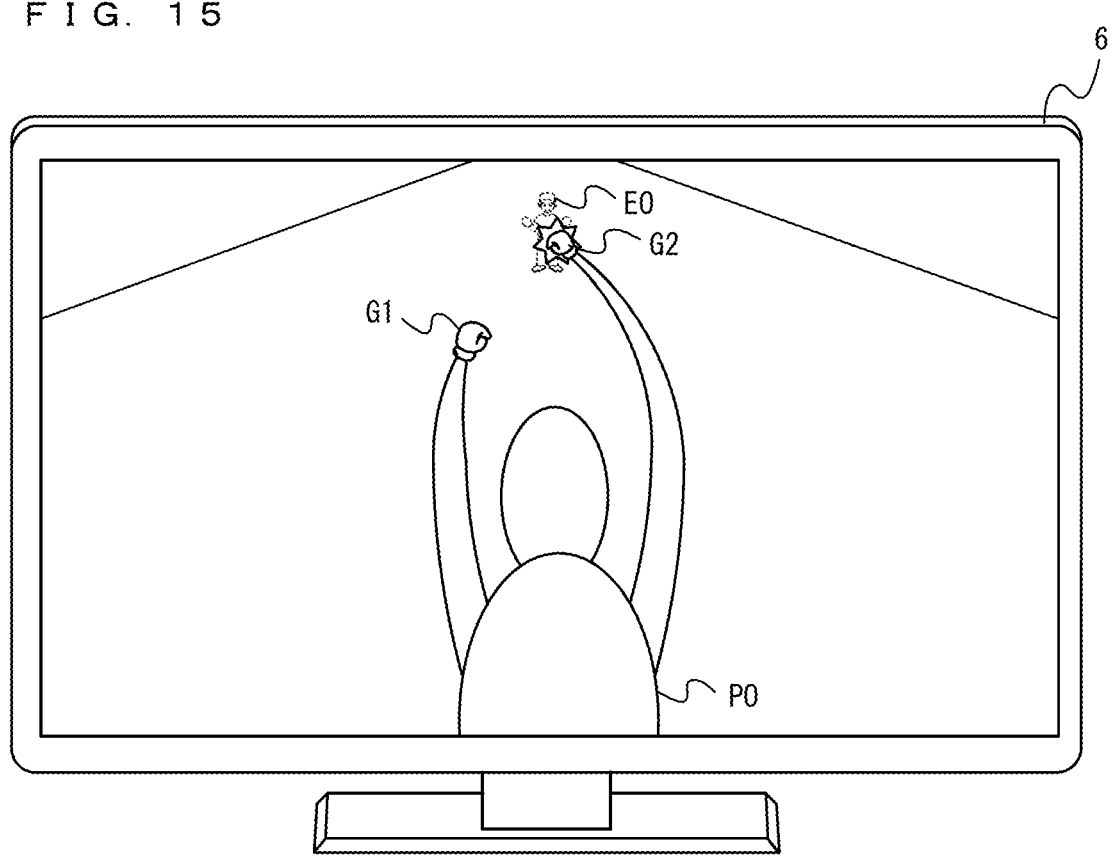
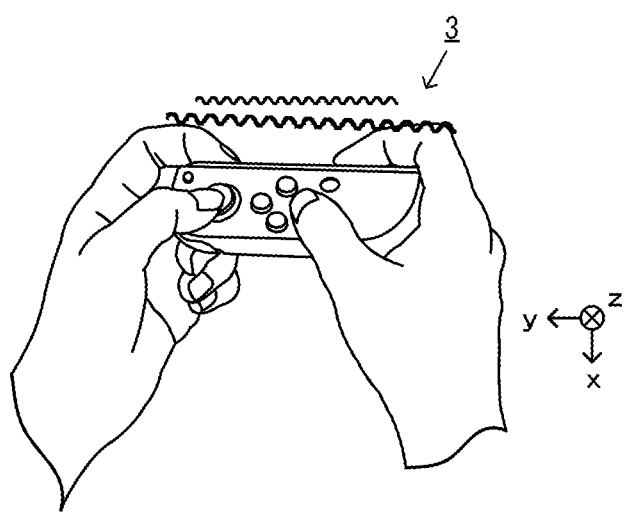

F I G. 17

| | VERTICALLY-HELD OPERATION METHOD (TWO CONTROLLERS) | EXTENSION GRIP OPERATION METHOD (TWO CONTROLLERS) · MOBILE DEVICE MODE OPERATION METHOD (TWO CONTROLLERS) | HORIZONTALLY-HELD OPERATION METHOD (SINGLE CONTROLLER) | |
|---|---|---|---|---|
| | | | LEFT CONTROLLER | RIGHT CONTROLLER |
| MOVE TO LEFT | TILT TO LEFT (BOTH) | TILT STICK 32 IN POSITIVE x-AXIS DIRECTION | TILT STICK 32 IN POSITIVE y-AXIS DIRECTION | TILT STICK 52 IN NEGATIVE y-AXIS DIRECTION |
| MOVE TO RIGHT | TILT TO RIGHT (BOTH) | TILT STICK 32 IN NEGATIVE x-AXIS DIRECTION | TILT STICK 32 IN NEGATIVE y-AXIS DIRECTION | TILT STICK 52 IN POSITIVE y-AXIS DIRECTION |
| MOVE FORWARD | TILT FORWARD (BOTH) | TILT STICK 32 IN POSITIVE y-AXIS DIRECTION | TILT STICK 32 IN NEGATIVE x-AXIS DIRECTION | TILT STICK 52 IN POSITIVE x-AXIS DIRECTION |
| MOVE BACKWARD | TILT BACKWARD (BOTH) | TILT STICK 32 IN NEGATIVE y-AXIS DIRECTION | TILT STICK 32 IN POSITIVE x-AXIS DIRECTION | TILT STICK 52 IN NEGATIVE x-AXIS DIRECTION |
| LEFT PUNCH | SWING (LEFT) | PRESS B-BUTTON 54 | PRESS LEFT DIRECTION BUTTON 36 | PRESS A-BUTTON 53 |
| RIGHT PUNCH | SWING (RIGHT) | PRESS A-BUTTON 53 | PRESS DOWN DIRECTION BUTTON 34 | PRESS X-BUTTON 55 |
| JUMP | PRESS FIRST R-BUTTON 60 | PRESS X-BUTTON 55 | PRESS RIGHT DIRECTION BUTTON 33 | PRESS Y-BUTTON 56 |
| DASH | PRESS FIRST L-BUTTON 38 | PRESS Y-BUTTON 56 | PRESS UP DIRECTION BUTTON 35 | PRESS B-BUTTON 54 |
| HOOK PUNCH | TILT (LEFT OR RIGHT) | TILT STICK 32 | TILT STICK 32 | TILT STICK 52 |
| DEFENSE | TILT INWARD (BOTH) | PUSH IN STICK 32 | PUSH IN STICK 32 | PUSH IN STICK 52 |

| | COEFFICIENT a | UPPER LIMIT VALUE b |
|---|---|---|
| VERTICALLY-HELD OPERATION METHOD | 1 | 1 |
| HORIZONTALLY-HELD OPERATION METHOD | 0.35 | 0.2 |
| MOBILE DEVICE MODE OPERATION METHOD | 0.45 | 0.1 |
| EXTENSION GRIP OPERATION METHOD, ETC. | 0.65 | 0.4 |

F I G. 2 5
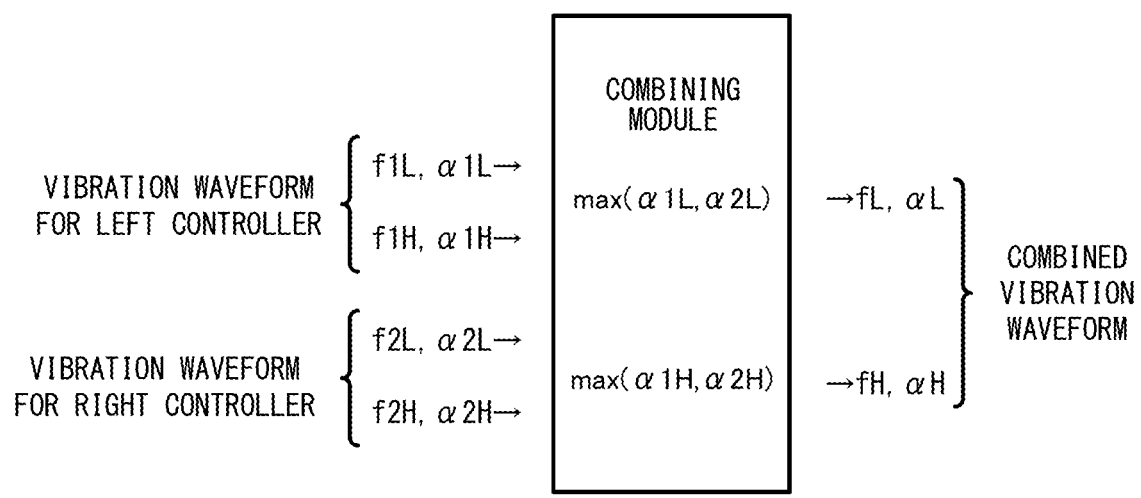

STORAGE MEDIUM HAVING STORED THEREIN INFORMATION PROCESSING PROGRAM, INFORMATION PROCESSING SYSTEM, INFORMATION PROCESSING APPARATUS, AND INFORMATION PROCESSING METHOD

CROSS REFERENCE TO RELATED APPLICATION

The disclosures of Japanese Patent Application No. 2016-252315, filed on Dec. 27, 2016 and Japanese Patent Application No. 2017-099496, filed on May 19, 2017, are incorporated herein by reference.

FIELD

The technology shown here relates to a storage medium having stored therein an information processing program, an information processing system, an information processing apparatus, and an information processing method for vibrating a vibrator of a device.

BACKGROUND AND SUMMARY

Conventionally, for example, there is a game system where an operation is performed using a game controller including a vibrator, and based on a control signal output from a game apparatus, a vibration is generated by the vibrator.

In the game system, however, even if the vibrator of the game controller is vibrated using the same vibration waveform, a vibration perceived by a player may be different depending on the use form in which the game controller is used.

Therefore, it is an object of an exemplary embodiment to provide a storage medium having stored therein an information processing program, an information processing system, an information processing apparatus, and an information processing method that are capable of imparting an appropriate vibration to a user in accordance with the use form of a device including a vibrator.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of a non-transitory computer-readable storage medium having stored therein an information processing program according to the exemplary embodiment, a non-transitory computer-readable storage medium having stored therein an information processing program is executed by a computer included in an information processing apparatus for vibrating a vibrator of a device. The information processing program causes the computer to execute: generating vibration data for vibrating the vibrator; in accordance with a use form of the device, selecting a first function or a second function; based on an amplitude value in the vibration data and the selected function, setting a new amplitude value; and outputting vibration data including the set amplitude value to the device.

Based on the above, a function for adjusting the intensity of a vibration is selected in accordance with the use form of a device. Thus, it is possible to adjust a vibration to be imparted to a device including a vibrator to an appropriate vibration intensity corresponding to the use form.

Further, the second function may be a function in which a degree of increase in the new amplitude value is smaller than a degree of increase in the amplitude value in the vibration data.

Based on the above, when a vibration is relatively large, it is possible to adjust the intensity of the vibration so as not to be too strong.

Further, the second function may be a function in which as the amplitude value in the vibration data increases, a degree of increase in the new amplitude value decreases in a stepwise manner or in a gradually decreasing manner.

Based on the above, when a vibration is relatively large, it is possible to adjust the intensity of the vibration in a step-by-step manner or in a gradually decreasing manner so as not to be too strong.

Further, the second function may at least include a first sub-function and a second sub-function. In the setting of the new amplitude value, in a case where the second function is selected, either of a first value calculated using the amplitude value in the vibration data and the first sub-function, and a second value calculated using the amplitude value in the vibration data and the second sub-function may be selected, thereby setting the selected value as the new amplitude value.

Based on the above, a plurality of sub-functions are selected in accordance with the use form, and it is possible to separately use sub-functions between a relatively strong vibration and a relatively weak vibration. Consequently, it is possible to adjust the strong vibration to a suitable vibration intensity and also adjust a weak vibration to a suitable vibration intensity. Thus, it is possible to adjust vibrations to appropriate vibration intensities corresponding to the use form.

Further, in the setting of the new amplitude value, the first value and the second value may be compared, and a smaller one of the first value and the second value may be set as the new amplitude value.

Based on the above, it is possible to adjust the degree of decrease in an amplitude value using the plurality of sub-functions.

Further, the second function may at least include a first sub-function and a second sub-function. In the selection of the function, in a case where the second function is selected, and when the amplitude value in the vibration data is less than a predetermined threshold, the first sub-function may be selected, and when the amplitude value in the vibration data is equal to or greater than the threshold, the second sub-function may be selected.

Based on the above, one of sub-functions is selected depending on whether an amplitude value is less than a predetermined threshold or is equal to or greater than the predetermined threshold. Thus, it is possible to adjust an amplitude value without calculating a plurality of new amplitude values for an amplitude value before being adjusted.

Further, the first sub-function may include a monomial expression or a polynomial expression including a term for multiplying the amplitude value in the vibration data by a predetermined coefficient.

Based on the above, it is possible to adjust an amplitude value using a simple function.

Further, the second sub-function may be a function for converting the amplitude value in the vibration data into a predetermined upper limit value.

Based on the above, it is possible to set an upper limit of a new amplitude value.

Further, the first function may be a function in which as the amplitude value in the vibration data increases, a degree of increase in the new amplitude value becomes greater than in the second function.

Based on the above, even when a vibration is relatively large, a first function is selected for the use form in which the vibration is to be made relatively strong, whereby it is possible to adjust the vibration to an appropriate vibration intensity.

Further, in the setting of the new amplitude value, a new amplitude value may be set with respect to a plurality of frequency ranges.

Based on the above, it is possible to appropriately control an amplitude corresponding to a frequency band.

Further, the device including the vibrator may be a game controller capable of communicating with the information processing apparatus.

Based on the above, it is possible to appropriately adjust the intensity of a vibration to be imparted to a game controller used when a game operation is performed.

Further, the use form may include a first use form in which the device including the vibrator is detached from a main body of the information processing apparatus and used, and a second use form in which the device including the vibrator is attached to the main body of the information processing apparatus and used. In the selection of the function, different functions may be selected depending on whether the use form of the device is the first use form or the second use form.

Based on the above, it is possible to impart appropriate vibrations between the use form in which the device including the vibrator is detached from an information processing apparatus and used, and the use form in which the device including the vibrator is attached to the information processing apparatus and used.

Further, the use form may include a first use form in which a user uses the device including the vibrator by holding the device with one hand, and a second use form in which the user uses the device including the vibrator by holding the device with both hands. In the selection of the function, different functions may be selected depending on whether the use form of the device is the first use form or the second use form.

Based on the above, it is possible to deal with a change in a vibration perceived by a user, which changes depending on the manner of holding the device (holding the device with their palm, holding the device with their fingertips, or the like), or the area of the user's hand in contact with the device, a part of the user's hand in contact with the device, or the like.

Further, the use form may include a first use form in which a user uses a main body of the device including the vibrator by moving the main body, and a second use form in which the user uses the main body of the device including the vibrator by performing an input operation using an input device provided in the device including the vibrator. In the selection of the function, different functions may be selected depending on whether the use form of the device is the first use form or the second use form.

Based on the above, when an operation is performed by holding and swinging the device, it is difficult for a user to perceive the vibration of the device, whereas when an operation is performed without swinging the device, it is easy for the user to perceive the vibration of the device. It is, however, possible to impart an appropriate vibration to the device for such a difference in use form.

Further, the second function may be a function for calculating the new amplitude value to be a value relatively smaller than a value calculated based on the first function. In the selection of the function, when the use form of the device is the first use form, the first function may be selected, and when the use form of the device is the second use form, the second function may be selected.

Based on the above, a vibration is made relatively strong in the use form in which it is difficult to perceive a vibration by performing an operation by holding and swinging the device, whereby it is possible to make it easy for the user to perceive the vibration. Further, a vibration is made relatively weak in the use form in which it is easy to perceive a vibration by performing an operation without swinging the device, whereby it is possible to make it easy for the user to perceive an appropriate vibration.

Further, the exemplary embodiment may be carried out in the forms of an information processing system, an information processing apparatus, and an information processing method.

According to the exemplary embodiment, in either of an operation method using two operation devices and an operation method using a single operation device, it is possible to impart an appropriate vibration to a user of the operation devices.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 9 is a diagram showing a non-limiting example of the state where the single user uses the game system 1 by holding the set of the left controller 3 and the right controller 4 in the separate state;

FIG. 11 is a diagram showing a non-limiting example of a game image displayed in a game played by moving the left controller 3 and the right controller 4;

FIG. 12 is a diagram showing a non-limiting example of the game image displayed in the game played by moving the left controller 3 and the right controller 4;

FIG. 13 is a diagram showing a non-limiting example of the game image displayed in the game played by moving the left controller 3 and the right controller 4;

FIG. 14 is a diagram showing a non-limiting example of the state where an operation is performed using an accessory device to which the left controller 3 and the right controller 4 are attachable;

FIG. 15 is a diagram showing a non-limiting example of the state where a single user uses the game system 1 by holding one of the left controller 3 and the right controller 4 in the separate state;

FIG. 17 is a non-limiting example of an operation correspondence table indicating the actions of a player object PO for operation contents for each of operation methods;

FIG. 25 is a diagram showing a non-limiting example of a combining module for use when the high-frequency side and the low-frequency side are collectively determined;

DETAILED DESCRIPTION OF NON-LIMITING EXAMPLE EMBODIMENTS

An information processing program, an information processing system, an information processing apparatus, and an information processing method according to an exemplary embodiment are described below. A game system 1, which is an example of the information processing system according to the exemplary embodiment, includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
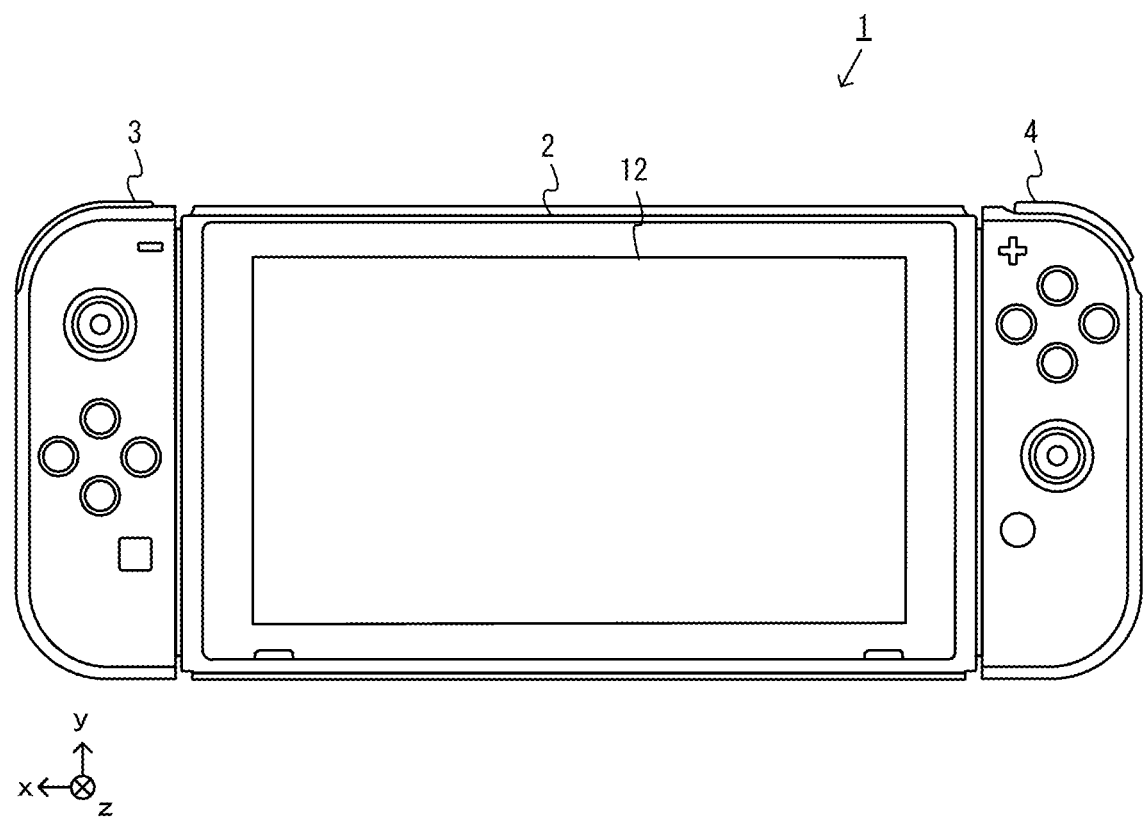
FIG. 1 is a diagram showing a non-limiting example of the state where a left controller 3 and a right controller 4 are attached to a main body apparatus 2 in an example of a game system 1 according to an exemplary embodiment.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs. It should be noted that in the exemplary embodiment, the longitudinal direction of a main surface of the game system 1 is referred to as a "horizontal direction" (also as a "left-right direction"), the short direction of the main surface is referred to as a "vertical direction" (also as an "up-down direction"), and a direction perpendicular to the main surface is referred to as a depth direction (also as a "front-back direction"). Further, to facilitate the understanding of directions in the game system 1, three axial (xyz-axis) directions are defined for the game system 1. Specifically, as shown in FIG. 1, in the game system 1, the depth direction of the display 12 from a front surface, on which the display 12 is provided, to a back surface is defined as a positive z-axis direction. In the horizontal direction perpendicular to the depth direction, the direction from the right to left (the direction from the attachment position of the right controller 4 to the attachment position of the left controller 3) is defined as a positive x-axis direction. In the up-down direction perpendicular to the depth direction and the horizontal direction, the direction upward along the display 12 is defined as a positive y-axis direction.

Figure 2:
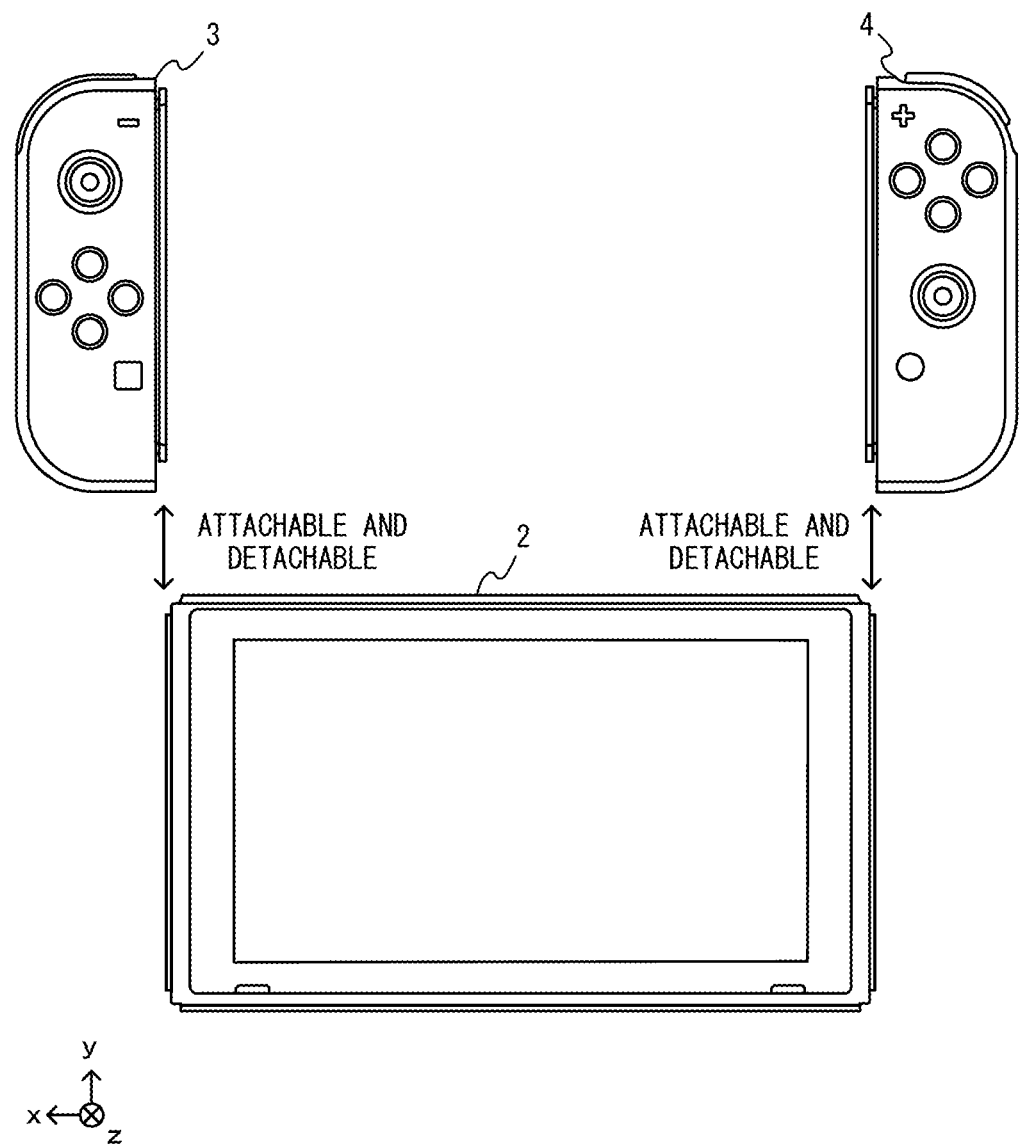
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
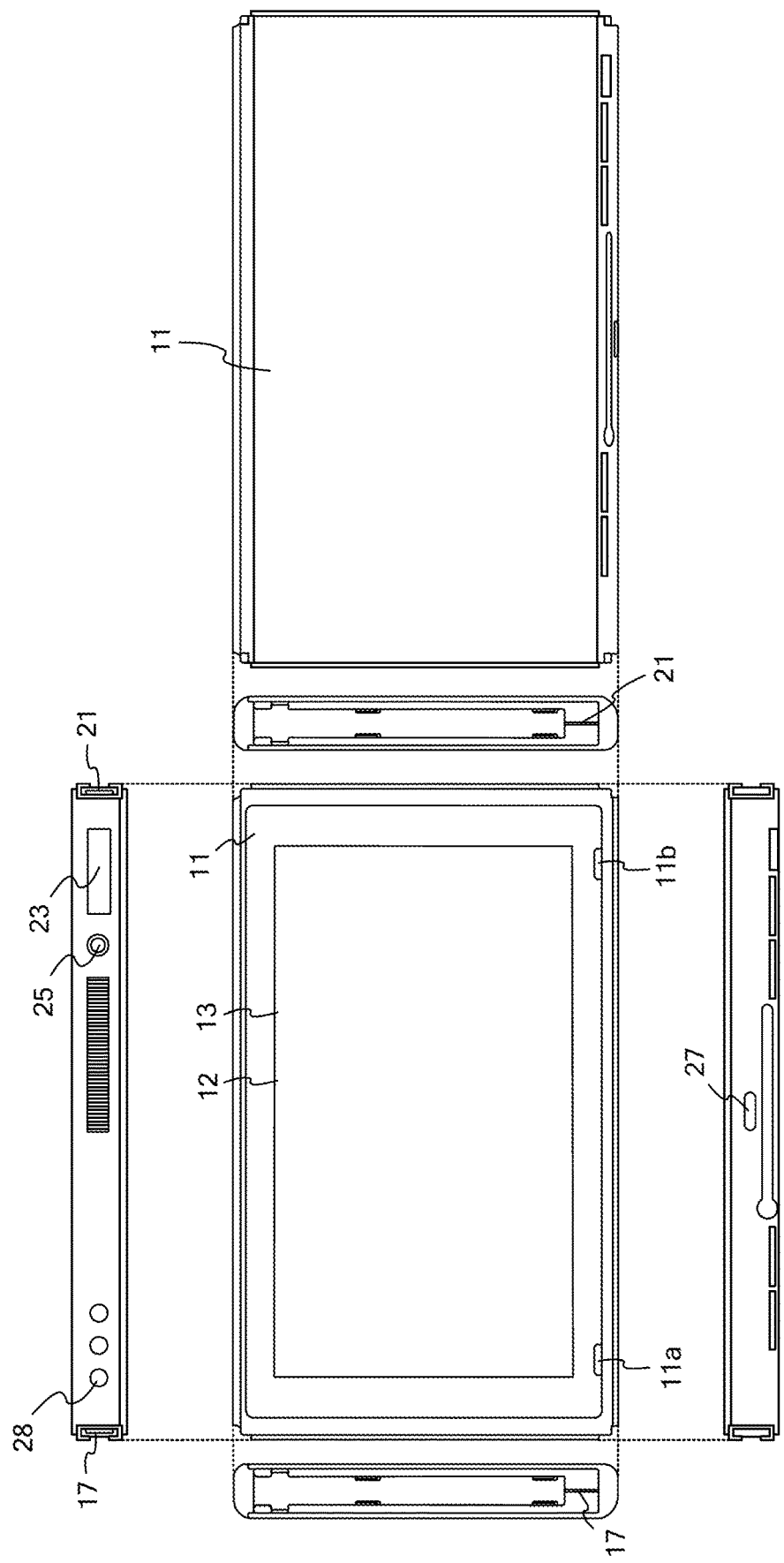
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
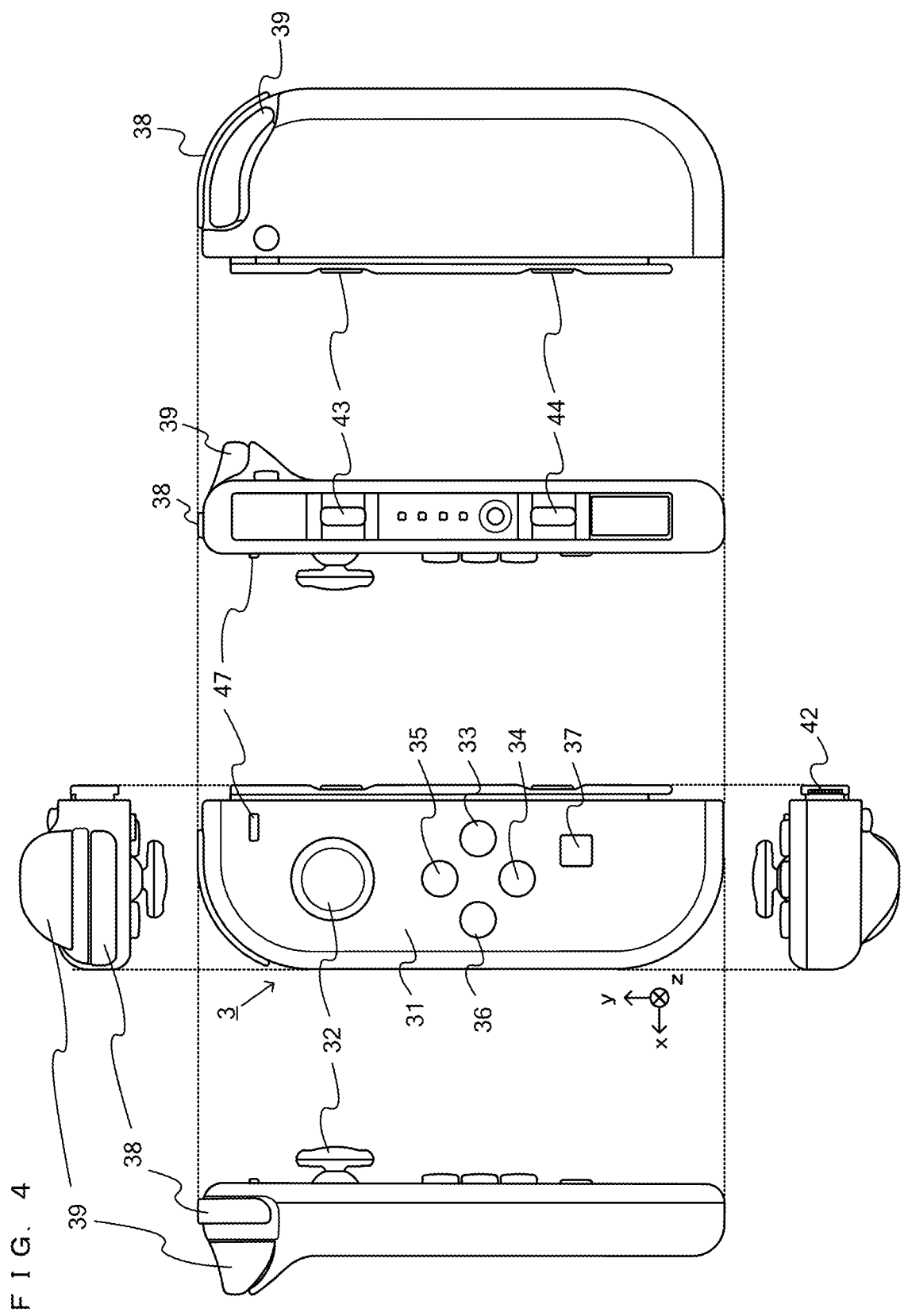
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
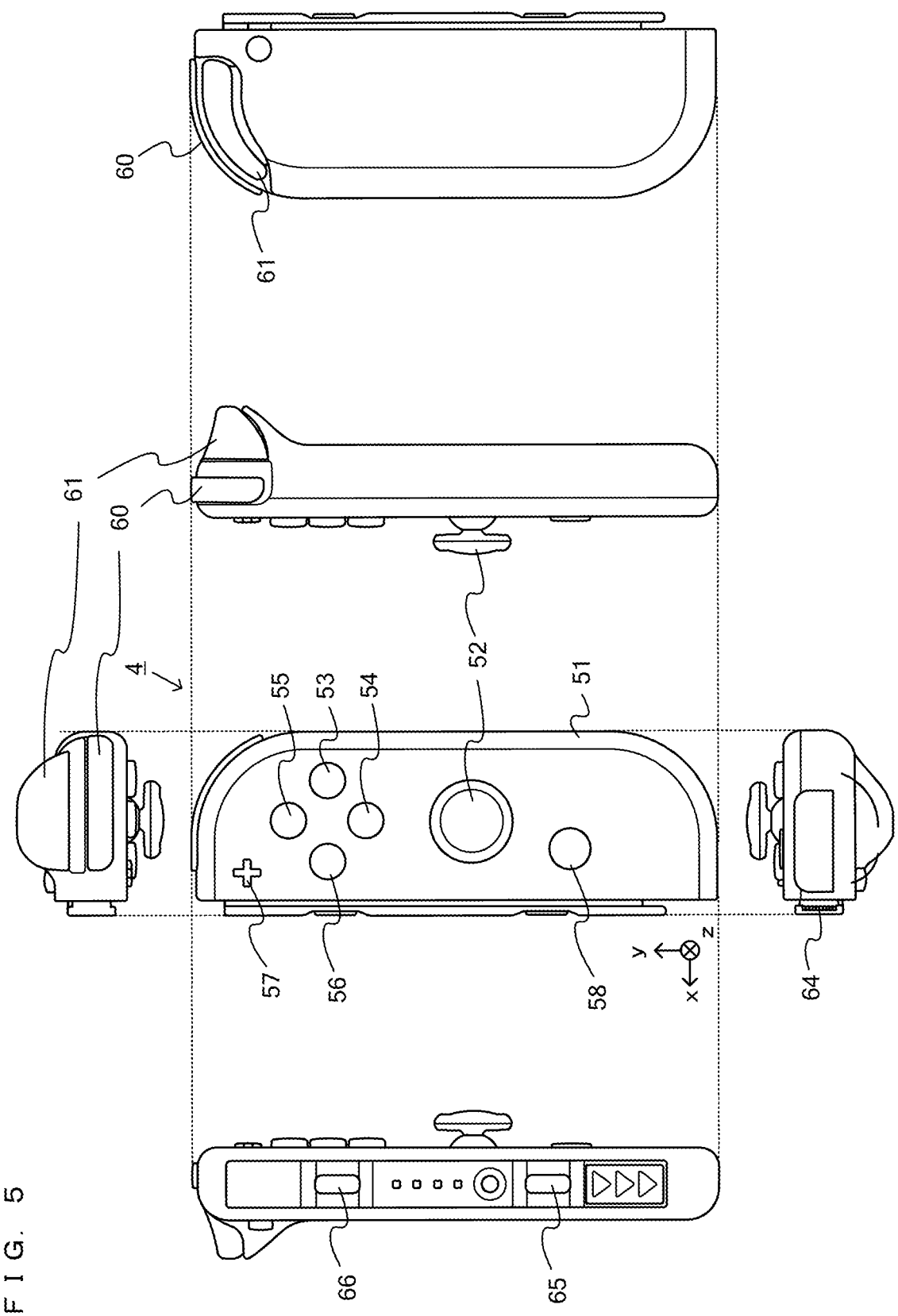
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
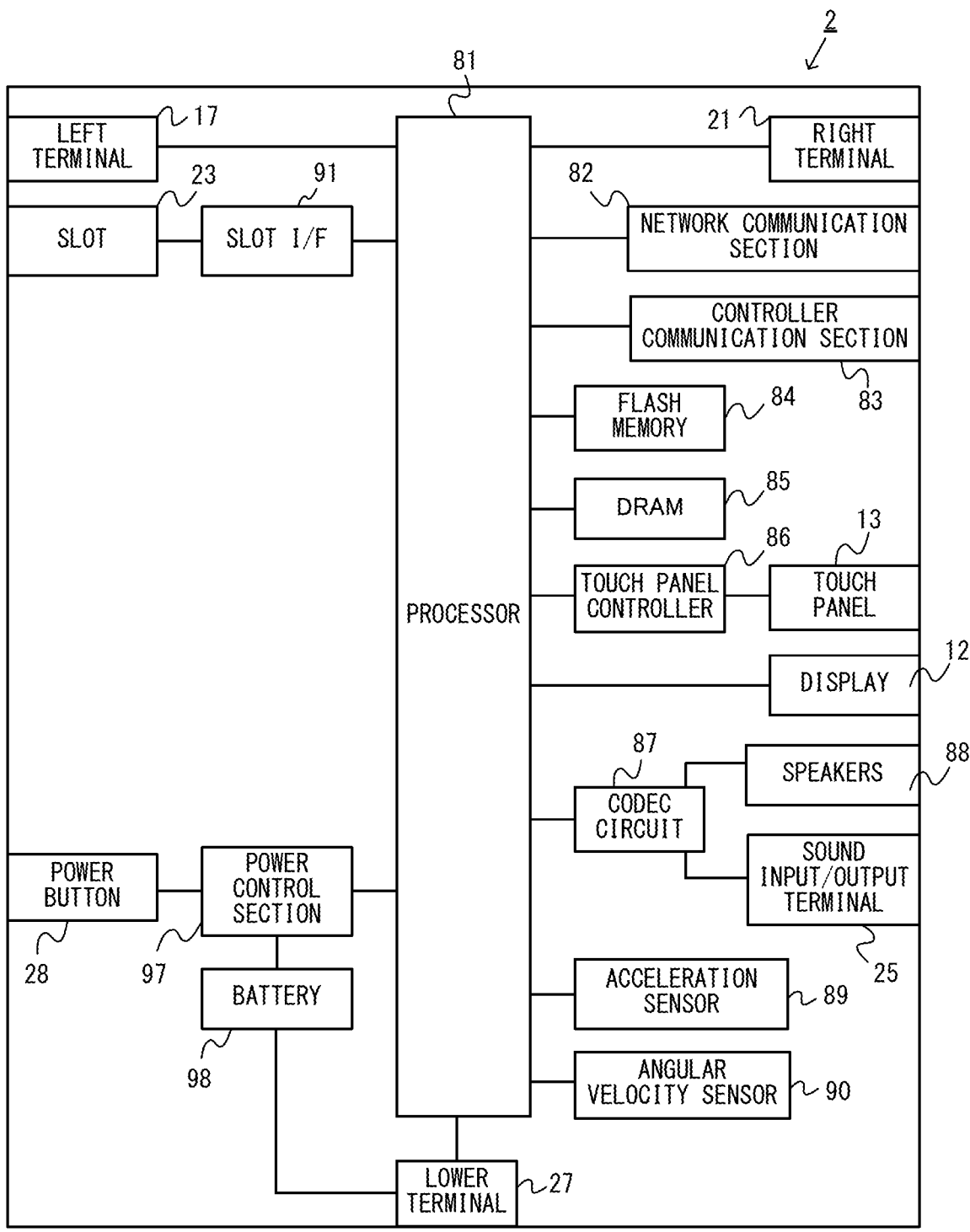
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
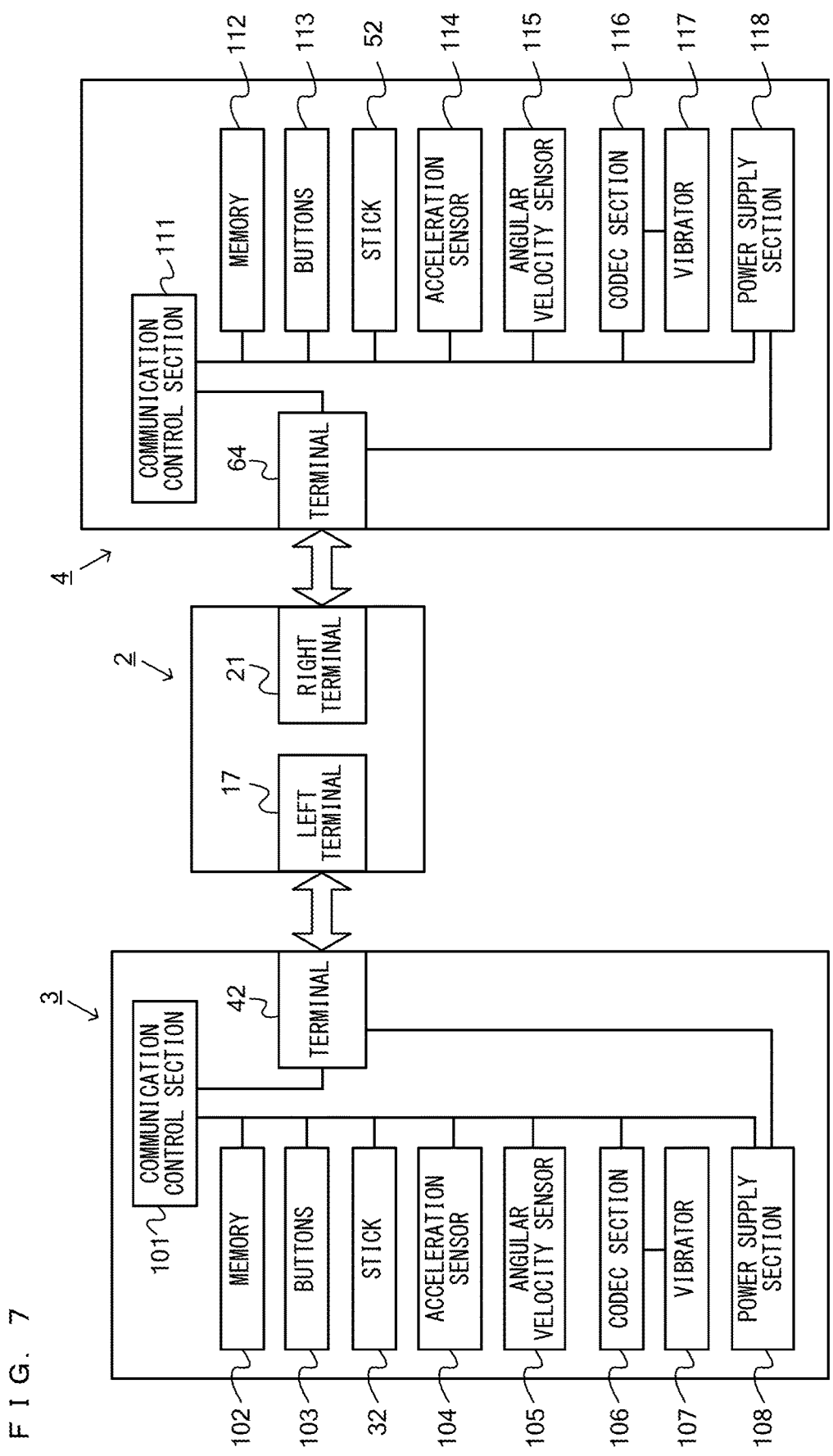
FIG. 7 is a block diagram showing a non-limiting example of the internal configuration of the game system 1.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, the main body apparatus 2 may transmit information indicating the waveform itself. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 includes a power supply section 118. The power supply section 118 has a function similar to that of the power supply section 108 of the left controller 3 and operates similarly to the power supply section 108.

As describe above, in the game system 1 according to the exemplary embodiment, the left controller 3 and the right controller 4 are attachable to and detachable from the main body apparatus 2. Further, the unified apparatus obtained by attaching the left controller 3 and the right controller 4 to the main body apparatus 2 or the main body apparatus 2 alone is attached to the cradle and thereby can output an image (and a sound) to the stationary monitor. A description is given below using the game system in use forms in which an image (and a sound) is output to the stationary monitor by attaching the main body apparatus 2 alone to the cradle in the state where the left controller 3 and the right controller 4 are detached from the main body apparatus 2, and the game system in use forms in which an image (and a sound) is output to the display 12 in the state of the unified apparatus obtained by attaching the left controller 3 and the right controller 4 to the main body apparatus 2.

As described above, in the exemplary embodiment, the game system 1 can be used in the state where the left controller 3 and the right controller 4 are detached from the main body apparatus 2 (referred to as a "separate state"). As a form in a case where an operation is performed on an application (e.g., a game application) using the game system 1 in the separate state, a form in which a single user uses both the left controller 3 and the right controller 4 is possible. It should be noted that when a single user uses both the left controller 3 and the right controller 4, the user can also use an accessory device (e.g., an extension grip 210 described later) for joining the left controller 3 and the right controller 4 to cause the left controller 3 and the right controller 4 to function as a single operation device. Further, as another form in a case where an operation is performed on an application (e.g., a game application) using the game system 1 in the separate state, a form in which a single user uses one of the left controller 3 and the right controller 4 is possible. It should be noted that when a plurality of users perform operations using the same application in this use form, a form is possible in which each of the plurality of users uses one of the left controller 3 and the right controller 4, or a form is possible in which a plurality of sets of the left controller 3 and the right controller 4 are prepared, and each user uses one of the plurality of sets.

Figure 8:
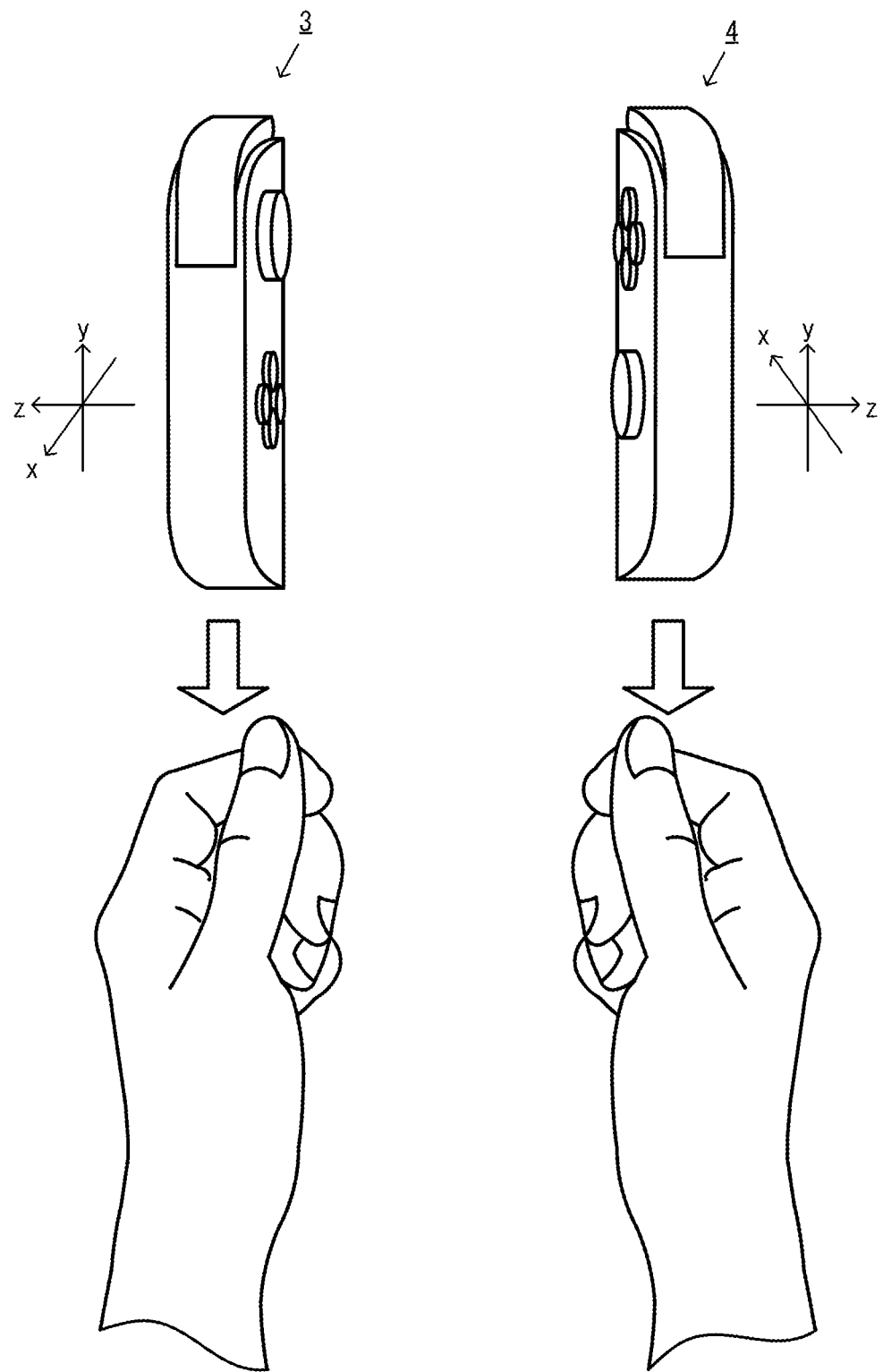
FIG. 8 is a diagram showing a non-limiting example of the state where a single user uses the game system 1 by holding a set of the left controller 3 and the right controller 4 in a separate state.
Figure 10:
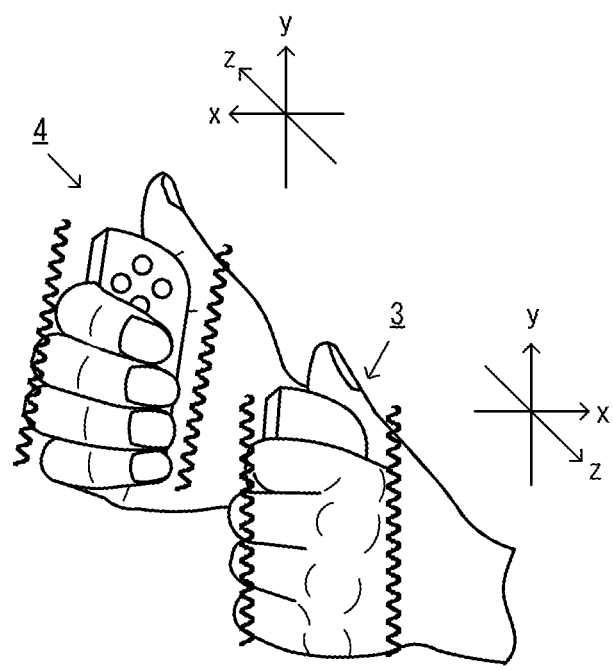
FIG. 10 is a diagram showing a non-limiting example of the state where a single user uses the game system 1 by holding the set of the left controller 3 and the right controller 4 in the separate state.

FIGS. 8 to 10 are diagrams showing an example of the state where a single user uses the game system 1 by holding a set of the left controller 3 and the right controller 4 in the separate state. As shown in FIGS. 8 to 10, in the separate state, the user can view an image displayed on the stationary monitor 6 while operating the left controller 3 and the right controller 4 by holding the left controller 3 with their left hand and the right controller 4 with their right hand.

For example, in the exemplary embodiment, the user holds the left controller 3 with their left hand such that the down direction of the longitudinal direction of the left controller 3 (the down direction (the negative y-axis direction) shown in FIG. 1), which is vertically long and approximately plate-shaped, is the vertical direction, also the side surface that is in contact with the main body apparatus 2 when the left controller 3 is attached to the main body apparatus 2 is directed forward, and also the main surface of the left controller 3 (the surface on which the analog stick 32 is provided) is directed to the right. That is, the left controller 3 held with the left hand of the user is in the state where the negative x-axis direction is directed in the forward direction of the user, and the positive z-axis direction is directed to the left. Further, the user holds the right controller 4 with their right hand such that the down direction of the longitudinal direction of the right controller 4 (the down direction (the negative y-axis direction) shown in FIG. 1), which is vertically long and approximately plate-shaped, is the vertical direction, also the side surface that is in contact with the main body apparatus 2 when the right controller 4 is attached to the main body apparatus 2 is directed forward, and also the main surface of the right controller 4 (the surface on which the analog stick 52 is provided) is directed to the left. That is, the right controller 4 held with the right hand of the user is in the state where the positive x-axis direction is directed in the forward direction of the user, and the positive z-axis direction is directed to the right.

In the state where the left controller 3 is held with the left hand, and the right controller 4 is held with the right hand (hereinafter, such a use form will occasionally be referred to as a "vertically-held operation method", and the orientations of the left controller 3 and the right controller 4 held in these directions will occasionally be referred to as "basic orientations"), each controller is moved in up, down, left, right, front, and back directions, rotated, or swung, whereby game play is performed in accordance with the motion or the orientation of the controller. Then, in the above game play, the acceleration sensor 104 of the left controller 3 can detect accelerations in the xyz-axis directions as operation inputs, and the angular velocity sensor 105 can detect angular velocities about the xyz-axis directions as operation inputs. Further, the acceleration sensor 114 of the right controller 4 can detect accelerations in the xyz-axis directions as operation inputs, and the angular velocity sensor 115 can detect angular velocities about the xyz-axis directions as operation inputs. Further, in the vertically-held operation, it is possible to perform the operation of pressing the first L-button 38 with the thumb of the left hand of the user and perform the operation of pressing the first R-button 60 with the thumb of the right hand of the user, and game play is also performed by these button operations.

Further, in the exemplary embodiment, when the user performs game play by holding the left controller 3 and the right controller 4, vibrations are imparted to the left controller 3 and/or the right controller 4 in accordance with the situation of this game. As described above, the left controller 3 includes the vibrator 107, and the right controller 4 includes the vibrator 117. The processor 81 of the main body apparatus 2 transmits vibration data to the left controller 3 and/or the right controller 4 in accordance with the situation of an executed game and thereby can vibrate the vibrator 107 and/or the vibrator 117 at an amplitude and a frequency corresponding to the vibration data.

FIGS. 11 to 13 are diagrams showing examples of a game image displayed in a game played by moving the left controller 3 and the right controller 4. As shown in FIG. 11, in this exemplary embodiment, an image of a game (e.g., a boxing game) in which a player object PO and an enemy object EO compete against each other is displayed on the stationary monitor 6. Then, the user operating the left controller 3 and the right controller 4 can operate the player object PO by swinging the main body of the left controller 3 and/or the main body of the right controller 4, changing the orientations of the main body of the left controller 3 and/or the main body of the right controller 4, or pressing an operation button (e.g., the first L-button 38 or the first R-button 60).

For example, the user swings the left controller 3 and thereby can control the action of a first object G1, which represents a left glove (a left fist) of the player object PO. The user swings the right controller 4 and thereby can control the action of a second object G2, which represents a right glove (a right fist) of the player object PO. Specifically, when the user performs the operation of swinging so as to throw a left punch using the left hand holding the left controller 3, the first object G1, which represents the left glove of the player object PO, moves toward the place where the enemy object EO is placed. Further, when the user performs the operation of swinging so as to throw a right punch using the right hand holding the right controller 4, the second object G2, which represents the right glove of the player object PO, moves toward the place where the enemy object EO is placed.

Specifically, when the right controller 4 is swung so as to be pushed forward (in the positive x-axis direction of the right controller 4) in the state where neither of the left controller 3 and the right controller 4 moves (the state shown in FIG. 11), then as shown in FIG. 12, the second object G2 of the player object PO moves toward the enemy object EO in accordance with the motion of the right controller 4. Consequently, a game image is displayed such that the player object PO throws a right punch at the enemy object EO. Further, when the left controller 3 is swung so as to be pushed forward (in the negative x-axis direction of the left controller 3) in the state where neither of the left controller 3 and the right controller 4 moves, the first object G1 of the player object PO moves toward the enemy object EO in accordance with the motion of the left controller 3. Consequently, a game image is displayed such that the player object PO throws a left punch at the enemy object EO.

Here, the moving direction of the first object G1 starting moving is set by the orientation of the left controller 3 when the left controller 3 is swung so as to be pushed forward. Further, the moving direction of the second object G2 starting moving is set by the orientation of the right controller 4 when the right controller 4 is moved so as to be pushed forward. For example, when the right controller 4 moves in the positive x-axis direction as shown in FIG. 12, the moving direction of the second object G2 is set in accordance with the orientation in a roll direction of the right controller 4 in this movement. As an example, in the exemplary embodiment, in the period in which the right controller 4 moves, the tilt in the y-axis direction of the right controller 4 with respect to the direction in which a gravitational acceleration acts in real space is calculated, and the moving direction of the second object G2 is calculated based on the tilt in the y-axis direction. Specifically, when the tilt in the y-axis direction indicates that the right controller 4 is in the orientation in which the right controller 4 roll-rotates in the right direction with respect to the above reference orientation, the second object G2 moves in the right direction in a virtual space. Further, when the tilt in the y-axis direction indicates that the right controller 4 is in the orientation in which the right controller 4 roll-rotates in the left direction with respect to the reference orientation, the second object G2 moves in the left direction in the virtual space. Then, the angle at which the moving direction shifts in the right direction or the left direction is calculated in accordance with the tilt angle in the y-axis direction.

Further, in this exemplary game, even when the distance between the player object PO and the enemy object EO is relatively long in the virtual space, it is possible to throw a punch. The arms of the player object PO extend, whereby the first object G1 and the second object G2 can move by a relatively long distance. Then, the first object G1 or the second object G2 collides with another object (e.g., the enemy object EO) or moves by a predetermined distance, then finishes the movement, and returns to a movement start position where the first object G1 or the second object G2 starts moving (e.g., a hand portion of the player object PO shown in FIG. 11). The first object G1 and the second object G2 return to the movement start positions and thereby can make a next movement toward the enemy object EO. In other words, it is possible to throw a next punch. Thus, the time from when the first object G1 or the second object G2 starts moving from the movement start position to when the first object G1 or the second object G2 returns to the movement start position again is longer than in a general boxing game.

Further, in this exemplary game, even while the first object G1 or the second object G2 is moving using such a movement time (typically, the period in which the first object G1 or the second object G2 is moving in the direction of the enemy object EO), it is possible to change a trajectory moving in accordance with the orientation or the motion of the left controller 3 or the right controller 4. For example, when the left controller 3 or the right controller 4 rotates in the roll direction or rotates in a yaw direction from the orientation of the left controller 3 or the right controller 4 when the first object G1 or the second object G2 starts moving, the trajectory of the first object G1 or the second object G2 is changed in accordance with the rotation.

As an example, in the exemplary embodiment, in the state where the rotational velocity (the angular velocity) about the x-axis of the left controller 3 or the right controller 4 after the first object G1 or the second object G2 starts moving is the rotation in the roll direction, the trajectory of the first object G1 or the second object G2 moving based on this rotational velocity about the x-axis is changed. Specifically, when the rotational velocity of the left controller 3 roll-rotating in the right direction about the x-axis while the first object G1 is moving is obtained, the trajectory of the first object G1 is changed in the right direction in the virtual space. When the rotational velocity of the left controller 3 roll-rotating in the left direction about the x-axis is obtained, the trajectory of the first object G1 is changed in the left direction in the virtual space. Further, when the rotational velocity of the right controller 4 roll-rotating in the right direction about the x-axis while the second object G2 is moving is obtained, the trajectory of the second object G2 is changed in the right direction in the virtual space. When the rotational velocity of the right controller 4 roll-rotating in the left direction about the x-axis is obtained, the trajectory of the second object G2 is changed in the left direction in the virtual space.

As another example, in the exemplary embodiment, in the state where the rotational velocity (the angular velocity) of the left controller 3 or the right controller 4 about the direction of gravity in real space after the first object G1 or the second object G2 starts moving is the rotation in the yaw direction, the trajectory of the first object G1 or the second object G2 moving based on this rotational velocity is changed. Specifically, when the rotational velocity of the left controller 3 yaw-rotating in the right direction about the direction of gravity while the first object G1 is moving is obtained, the trajectory of the first object G1 is changed in the right direction in the virtual space. When the rotational velocity of the left controller 3 yaw-rotating in the left direction about the direction of gravity is obtained, the trajectory of the first object G1 is changed in the left direction in the virtual space. Further, when the rotational velocity of the right controller 4 yaw-rotating in the right direction about the direction of gravity while the second object G2 is moving is obtained, the trajectory of the second object G2 is changed in the right direction in the virtual space. When the rotational velocity of the right controller 4 yaw-rotating in the left direction about the direction of gravity is obtained, the trajectory of the second object G2 is changed in the left direction in the virtual space.

Further, in this exemplary game, using the magnitude of an acceleration generated in the left controller 3 or the right controller 4, it is determined whether or not the left controller 3 or the right controller 4 is swung. Then, when it is determined that the left controller 3 is swung in the negative x-axis direction in the state where the first object G1 is placed at the movement start position, the first object G1 starts moving from the movement start position toward the enemy object EO. Further, when it is determined that the right controller 4 is swung in the positive x-axis direction in the state where the second object G2 is placed at the movement start position, the second object G2 starts moving from the movement start position toward the enemy object EO.

Further, in this exemplary game, even when one of the first object G1 and the second object G2 starts moving from the movement start position and is moving, it is possible to cause also the other of the first object G1 and the second object G2 to start moving from the movement start position. For example, as shown in FIG. 13, the user swings the right controller 4 so as to push the right controller 4 forward (in the positive x-axis direction of the right controller 4), whereby the second object G2 starts moving toward the enemy object EO. Then, the user swings the left controller 3 so as to push the left controller 3 forward (in the negative x-axis direction of the left controller 3) during the movement of the second object G2, whereby the first object G1 also starts moving toward the enemy object EO. Thus, on the stationary monitor 6 shown in FIG. 13, a game image is displayed in which both the first object G1 and the second object G2 move toward the enemy object EO. Further, FIG. 13 shows an example of a game image in which the second object G2 having started moving first collides with (hits) the enemy object EO.

Here, in this exemplary game, vibrations are imparted to the left controller 3 and/or the right controller 4 in accordance with the states of the first object G1 and/or the second object G2 in a virtual game world. As an example, in this exemplary game, when the first object G1 moves in the virtual game world, a vibration corresponding to the type, the moving velocity, the moving direction, the collision state, and the like of the first object G1 is imparted to the left controller 3. Further, when the second object G2 moves in the virtual game world, a vibration corresponding to the type, the moving velocity, the moving direction, the collision state, and the like of the second object G2 is imparted to the right controller 4.

For example, in the example shown in FIG. 12, the user swings the right controller 4 so as to push the right controller 4 forward (in the positive x-axis direction of the right controller 4), whereby the second object G2 moves toward the enemy object EO in the virtual game world, and a vibration corresponding to this movement is imparted only to the right controller 4. Further, in the example shown in FIG. 13, the user swings the left controller 3 so as to push the left controller 3 forward (in the negative x-axis direction of the left controller 3) during the movement of the second object G2, whereby the first object G1 also moves toward the enemy object EO in the virtual game world, and a vibration corresponding to this movement is imparted only to the left controller 3. Meanwhile, the second object G2 collides with (hits) the enemy object EO in the virtual game world. Thus, a vibration corresponding to this collision is imparted only to the right controller 4. As described above, in accordance with the movement states of the first object G1 and the second object G2, independent and different vibrations are imparted to the left controller 3 and the right controller 4. Thus, a realistic vibration is imparted to the user by each controller.

Further, in this exemplary game, it is possible to move the player object PO or cause the player object PO to perform an action in the virtual game world in accordance with the motions or the orientations of both the left controller 3 and the right controller 4. For example, when both the left controller 3 and the right controller 4 rotate in a pitch direction or rotate in the roll direction in real space, the player object PO is caused to move in accordance with the tilts of the rotations. Specifically, the tilts in the x-axis direction and the y-axis direction of the left controller 3 and the tilts in the x-axis direction and the y-axis direction of the right controller 4 with respect to the direction of gravity in real space are calculated. Then, based on these tilts, when it is determined that both the left controller 3 and the right controller 4 are in the orientations in which the left controller 3 and the right controller 4 are tilted forward, the player object PO is caused to move forward in the virtual game world by the amount of movement corresponding to the angles at which both the left controller 3 and the right controller 4 are tilted forward (e.g., the average value of these angles). Further, based on these tilts, when it is determined that both the left controller 3 and the right controller 4 are in the orientations in which the left controller 3 and the right controller 4 are tilted backward, the player object PO is caused to move backward in the virtual game world by the amount of movement corresponding to the angles at which both the left controller 3 and the right controller 4 are tilted backward (e.g., the average value of these angles). Further, based on these tilts, when it is determined that both the left controller 3 and the right controller 4 are in the orientations in which the left controller 3 and the right controller 4 are tilted to the left, the player object PO is caused to move to the left in the virtual game world by the amount of movement corresponding to the angles at which both the left controller 3 and the right controller 4 are tilted to the left (e.g., the average value of these angles). Further, based on these tilts, when it is determined that both the left controller 3 and the right controller 4 are in the orientations in which the left controller 3 and the right controller 4 are tilted to the right, the player object PO is caused to move to the right in the virtual game world by the amount of movement corresponding to the angles at which both the left controller 3 and the right controller 4 are tilted to the right (e.g., the average value of these angles). Further, based on these tilts, when it is determined that both the left controller 3 and the right controller 4 are in the orientations in which the left controller 3 and the right controller 4 are tilted inward, the player object PO performs the action of defending against an attack from the enemy object EO in the virtual game world.

Further, in this exemplary game, in accordance with operations on the operation buttons of the left controller 3 and the right controller 4, it is possible to cause the player object PO to move or perform an action in the virtual space. For example, when the first L-button 38 of the left controller 3 is subjected to a pressing operation, the player object PO moves dashing (moves rapidly) in the virtual game world. Further, when the first R-button 60 of the right controller 4 is subjected to a pressing operation, the player object PO jumps in the virtual game world.

Further, in the exemplary embodiment, it is also possible to play the above game using an attachment (an accessory device) for joining the left controller 3 and the right controller 4 to cause the left controller 3 and the right controller 4 to function as a single operation device.

FIG. 14 is a diagram showing an example of an accessory device to which the left controller 3 and the right controller 4 are attachable. As shown in FIG. 14, an extension grip 210, which is an example of the accessory device, is an accessory device used by the user to perform an operation. The left controller 3 is attachable to the extension grip 210, and the right controller 4 is also attachable to the extension grip 210. Thus, with the extension grip 210, the user can perform an operation (hereinafter, such a use form will occasionally be referred to as an "extension grip operation method") by holding, in a unified manner, the two controllers 3 and 4 detached from the main body apparatus 2.

The extension grip 210 has mechanisms similar to those of the main body apparatus 2 as mechanisms for attaching the left controller 3 and the right controller 4. Thus, similarly to the case where the left controller 3 and the right controller 4 are attached to the main body apparatus 2, the left controller 3 and the right controller 4 can be attached to the extension grip 210. Specifically, in the extension grip 210, mechanisms for attaching the left controller 3 and the right controller 4 are provided on both left and right sides across a main body portion having a predetermined width, and rail members for attaching the left controller 3 and the right controller 4 are provided in parallel. Consequently, the left controller 3 and the right controller 4 are attached to the extension grip 210 such that the xyz-axis directions of the left controller 3 and the right controller 4 are parallel to each other. Then, the user holds with both hands the left controller 3 and the right controller 4 attached to the extension grip 210 and unified. Consequently, the user can hold in a unified manner the two controllers, namely the left controller 3 and the right controller 4, detached from the main body apparatus 2.

When the above game is played using the left controller 3 and the right controller 4 unified by such an extension grip 210, an operation is performed using the operation buttons and the sticks provided in the left controller 3 and the right controller 4. For example, when the B-button 54 of the right controller 4 is subjected to a pressing operation, the player object PO throws a left punch, and the first object G1 starts moving. When the A-button 53 of the right controller 4 is subjected to a pressing operation, the player object PO throws a right punch, and the second object G2 starts moving. When the analog stick 32 of the left controller 3 is subjected to a tilt operation while the first object G1 and/or the second object G2 are moving in a virtual game world, the moving directions of the first object G1 and/or the second object G2 that are moving change in accordance with the direction of the tilt operation and the tilt angle. When the analog stick 32 of the left controller 3 is subjected to a tilt operation in a case where both the first object G1 and the second object G2 are placed at the movement start positions, the player object PO moves in the virtual game world in accordance with the direction of the tilt operation and the tilt angle. Further, when the operation of pushing in the analog stick 32 of the left controller 3 is performed in a case where both the first object G1 and the second object G2 are placed at the movement start positions, the player object PO defends against an attack from the enemy object EO in the virtual game world. When the X-button 55 of the right controller 4 is subjected to a pressing operation, the player object PO performs the action of jumping in the virtual game world. Then, when the Y-button 56 of the right controller 4 is subjected to a pressing operation, the player object PO dashes (moves rapidly) in the virtual game world.

Also when game play is performed using the extension grip 210, vibrations are imparted to the left controller 3 and/or the right controller 4 attached to the extension grip 210 in accordance with the states of the first object G1 and/or the second object G2 in the virtual game world. As an example, also when game play is performed using the extension grip 210, and when the first object G1 moves in the virtual game world, a vibration corresponding to the type, the moving velocity, the moving direction, the collision state, and the like of the first object G1 is imparted to the left controller 3 attached to the extension grip 210. Further, when the second object G2 moves in the virtual game world, a vibration corresponding to the type, the moving velocity, the moving direction, the collision state, and the like of the second object G2 is imparted to the right controller 4 attached to the extension grip 210.

For example, in the example shown in FIG. 14, the user presses the A-button 53 of the right controller 4, whereby the second object G2 moves toward the enemy object EO in the virtual game world, and a vibration corresponding to this movement is imparted to the right controller 4 attached to the extension grip 210. Further, the user presses the B-button 54 of the right controller 4 during the movement of the second object G2, whereby the first object G1 also moves toward the enemy object EO in the virtual game world, and a vibration corresponding to this movement is also imparted to the left controller 3 attached to the extension grip 210. Meanwhile, the second object G2 collides with (hits) the enemy object EO in the virtual game world. Thus, a vibration corresponding to this collision is imparted to the right controller 4 attached to the extension grip 210. As described above, in accordance with the movement states of the first object G1 and the second object G2, independent and different vibrations are imparted also to the left controller 3 and the right controller 4 attached to the extension grip 210. Thus, a realistic vibration is imparted to the user by each controller. It should be noted that as will be apparent later, each of the magnitudes (the amplitudes) of vibrations to be imparted to the left controller 3 and/or the right controller 4 in the extension grip operation method is adjusted to be relatively smaller than each of the magnitudes (the amplitudes) of vibrations to be imparted to the left controller 3 and/or the right controller 4 in the vertically-held operation method.

FIG. 15 is a diagram showing an example of the state where a single user uses the game system 1 by holding one of the left controller 3 and the right controller 4 in the separate state. As shown in FIG. 15, in the separate state, the user can view an image displayed on the stationary monitor 6 while performing an operation by, for example, holding the left controller 3 with both hands.

For example, in the exemplary embodiment, the user holds the left controller 3 with both hands such that the longitudinal direction of the left controller 3 (the y-axis direction shown in FIG. 1), which is vertically long and approximately plate-shaped, is the horizontal direction, also the side surface that is in contact with the main body apparatus 2 when the left controller 3 is attached to the main body apparatus 2 is directed forward, and also the main surface of the left controller 3 (the surface on which the analog stick 32 is provided) is directed upward. That is, the left controller 3 held with both hands of the user is in the state where the positive y-axis direction is the left direction of the user, and the negative x-axis direction is directed in the forward direction of the user, and the positive z-axis direction is directed downward. It should be noted that when the user holds the right controller 4, which is vertically long and approximately plate-shaped, with both hands, the user holds the right controller 4 such that the longitudinal direction of the right controller 4 (the y-axis direction shown in FIG. 1), which is vertically long and approximately plate-shaped, is the horizontal direction, also the side surface that is in contact with the main body apparatus 2 when the right controller 4 is attached to the main body apparatus 2 is directed forward, and also the main surface of the right controller 4 (the surface on which the analog stick 52 is provided) is directed upward.

As described above, in the state where one of the left controller 3 and the right controller 4 is held with both hands (hereinafter, such a use form will occasionally be referred to as a "horizontally-held operation method"), the operation buttons and the stick of the one controller are operated, whereby game play is performed. For example, in the horizontally-held operation, the left hand of the user is placed on an upper surface of the one controller (the side surface further in the positive y-axis direction shown in FIG. 1), and the right hand of the user is placed on a lower surface of the one controller (the side surface further in the negative y-axis direction shown in FIG. 1). Thus, in the horizontally-held operation, an operation can be performed using the operation buttons and the stick provided on the main surface of the held controller. Further, in the horizontally-held operation, an operation can be performed using the operation buttons (e.g., the second L-button 43, the second R-button 44, the second L-button 65, the second R-button 66, and the like) provided on the side surface that is in contact with the main body apparatus 2 when the held controller is attached to the main body apparatus 2.

As an example, when the user performs the horizontally-held operation by holding the left controller 3 with both hands, an operation is performed using the operation buttons and the stick provided in the left controller 3. For example, when the left direction button 36 of the left controller 3 is subjected to a pressing operation, the player object PO throws a left punch, and the first object G1 starts moving. When the down direction button 34 of the left controller 3 is subjected to a pressing operation, the player object PO throws a right punch, and the second object G2 starts moving. When the analog stick 32 of the left controller 3 is subjected to a tilt operation while the first object G1 and/or the second object G2 are moving in a virtual game world, the moving directions of the first object G1 and/or the second object G2 that are moving change in accordance with the direction of the tilt operation and the tilt angle. When the analog stick 32 of the left controller 3 is subjected to a tilt operation in a case where both the first object G1 and the second object G2 are placed at the movement start positions, the player object PO moves in the virtual game world in accordance with the direction of the tilt operation and the tilt angle. Further, when the operation of pushing in the analog stick 32 of the left controller 3 is performed in a case where both the first object G1 and the second object G2 are placed at the movement start positions, the player object PO defends against an attack from the enemy object EO in the virtual game world. When the right direction button 33 of the left controller 3 is subjected to a pressing operation, the player object PO performs the action of jumping in the virtual game world. Then, when the up direction button 35 of the left controller 3 is subjected to a pressing operation, the player object PO dashes (moves rapidly) in the virtual game world.

As another example, when the user performs the horizontally-held operation by holding the right controller 4 with both hands, an operation is performed using the operation buttons and the stick provided in the right controller 4. For example, when the A-button 53 of the right controller 4 is subjected to a pressing operation, the player object PO throws a left punch, and the first object G1 starts moving. When the X-button 55 of the right controller 4 is subjected to a pressing operation, the player object PO throws a right punch, and the second object G2 starts moving. When the analog stick 52 of the right controller 4 is subjected to a tilt operation while the first object G1 and/or the second object G2 are moving in a virtual game world, the moving directions of the first object G1 and/or the second object G2 that are moving change in accordance with the direction of the tilt operation and the tilt angle. When the analog stick 52 of the right controller 4 is subjected to a tilt operation in a case where both the first object G1 and the second object G2 are placed at the movement start positions, the player object PO moves in the virtual game world in accordance with the direction of the tilt operation and the tilt angle. Further, when the operation of pushing in the analog stick 52 of the right controller 4 is performed in a case where both the first object G1 and the second object G2 are placed at the movement start positions, the player object PO defends against an attack from the enemy object EO in the virtual game world. When the Y-button 56 of the right controller 4 is subjected to a pressing operation, the player object PO performs the action of jumping in the virtual game world. Then, when the B-button 54 of the right controller 4 is subjected to a pressing operation, the player object PO dashes (moves rapidly) in the virtual game world.

Further, in the exemplary embodiment, also when the user performs game play by holding one of the left controller 3 and the right controller 4 by the horizontally-held operation method, a vibration is imparted to the held one of the left controller 3 and the right controller 4 in accordance with the situation of this game. As described above, the left controller 3 includes the vibrator 107, and the right controller 4 includes the vibrator 117. The processor 81 of the main body apparatus 2 transmits vibration data to one of the left controller 3 and the right controller 4 in accordance with the situation of an executed game and thereby can vibrate the vibrator 107 or the vibrator 117 at an amplitude and a frequency corresponding to the vibration data. It should be noted that as will be apparent later, when game play is performed using a single controller by the horizontally-held operation method, vibrations imparted to two respective controllers when game play is performed using the two controllers are combined into a single vibration, and the single vibration is imparted to the single controller. Then, the magnitude (the amplitude) of the vibration combined in the horizontally-held operation method is adjusted to be relatively smaller than each of the magnitudes (the amplitudes) of vibrations to be imparted to the left controller 3 and/or the right controller 4 in the vertically-held operation method, and a combining process is performed using this adjusted vibration data.

Further, in the exemplary embodiment, the above game can also be played using the unified apparatus obtained by attaching the left controller 3 and the right controller 4 to the main body apparatus 2.

Figure 16:
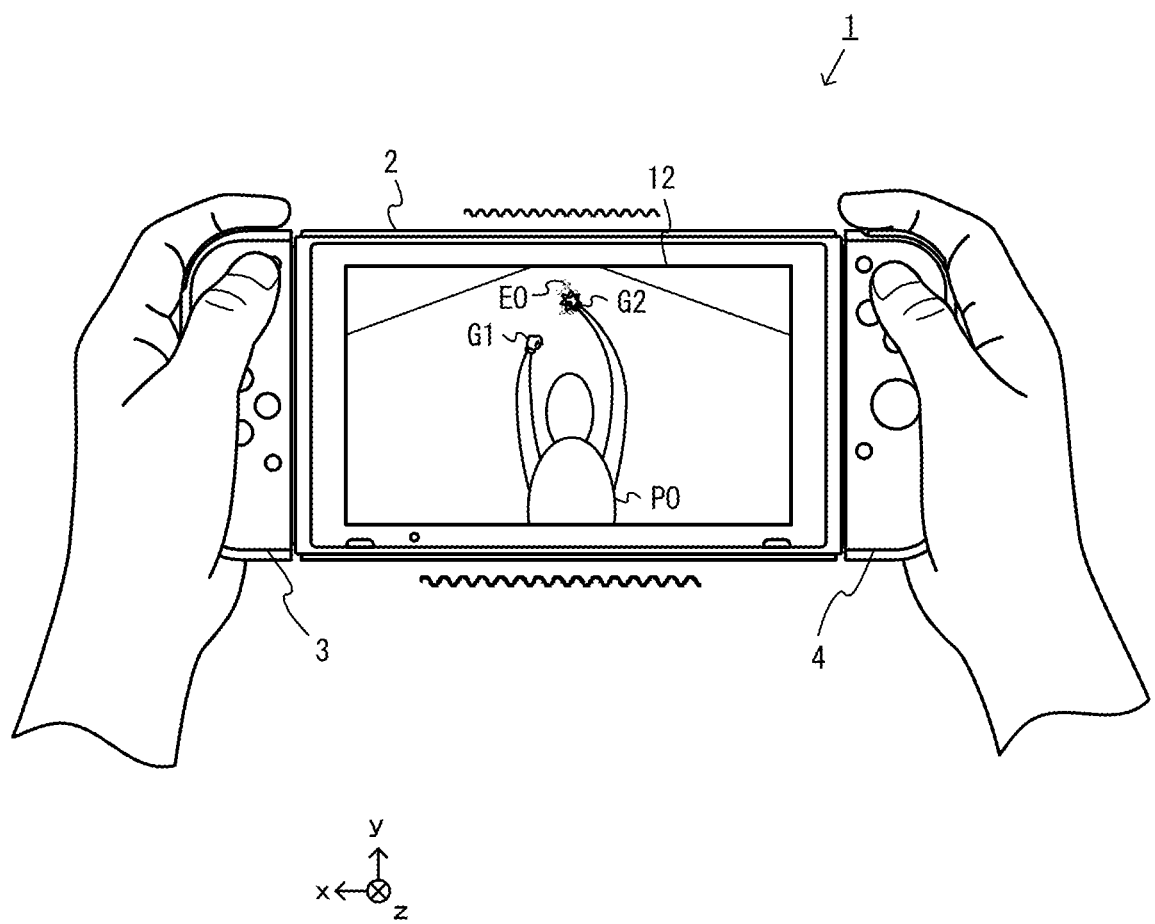
FIG. 16 is a diagram showing a non-limiting example of the state where an operation is performed by attaching the left controller 3 and the right controller 4 to the main body apparatus 2.

FIG. 16 is a diagram showing an example of the state where an operation is performed by attaching the left controller 3 and the right controller 4 to the main body apparatus 2 (hereinafter, such a use form will occasionally be referred to as a "mobile device mode operation method"). As shown in FIG. 16, when game play is performed by the mobile device mode operation method, the above game image is displayed on the display 12 of the main body apparatus 2.

When the above game is played using the unified apparatus based on such a mobile device mode operation method, an operation is performed using the operation buttons and the sticks provided in the left controller 3 and the right controller 4. For example, in the mobile device mode operation method, the action of the player object PO corresponding to an operation using the operation buttons and the sticks may be the same as that in the above extension grip operation method, and specific examples are not described here.

Also when game play is performed using the unified apparatus, vibrations are imparted to the left controller 3 and/or the right controller 4 attached to the main body apparatus 2 in accordance with the states of the first object G1 and/or the second object G2 in the virtual game world. As an example, also when game play is performed using the unified apparatus, and when the first object G1 moves in the virtual game world, a vibration corresponding to the type, the moving velocity, the moving direction, the collision state, and the like of the first object G1 is imparted to the left controller 3 attached to the extension grip 210. Further, when the second object G2 moves in the virtual game world, a vibration corresponding to the type, the moving velocity, the moving direction, the collision state, and the like of the second object G2 is imparted to the right controller 4 attached to the extension grip 210.

For example, also in the example shown in FIG. 16, the user presses the A-button 53 of the right controller 4, whereby the second object G2 moves toward the enemy object EO in the virtual game world, and a vibration corresponding to this movement is imparted to the right controller 4 attached to the extension grip 210. Further, the user presses the B-button 54 of the right controller 4 during the movement of the second object G2, whereby the first object G1 also moves toward the enemy object EO in the virtual game world, and a vibration corresponding to this movement is also imparted to the left controller 3 attached to the extension grip 210. Meanwhile, the second object G2 collides with (hits) the enemy object EO in the virtual game world. Thus, a vibration corresponding to this collision is imparted to the right controller 4 attached to the extension grip 210. As described above, in accordance with the movement states of the first object G1 and the second object G2, independent and different vibrations are imparted also to the left controller 3 and the right controller 4 attached to the extension grip 210. Thus, a realistic vibration is imparted to the user by each controller. It should be noted that as will be apparent later, each of the magnitudes (the amplitudes) of vibrations to be imparted to the left controller 3 and/or the right controller 4 in the mobile device mode operation method is also adjusted to be relatively smaller than each of the magnitudes (the amplitudes) of vibrations to be imparted to the left controller 3 and/or the right controller 4 in the vertically-held operation method.

FIG. 17 is an example of an operation correspondence table indicating the actions of the player object PO for operation contents in each of the above operation methods (the vertically-held operation method, the extension grip operation method, the horizontally-held operation method, and the mobile device mode operation method).

Figures 18, 19:
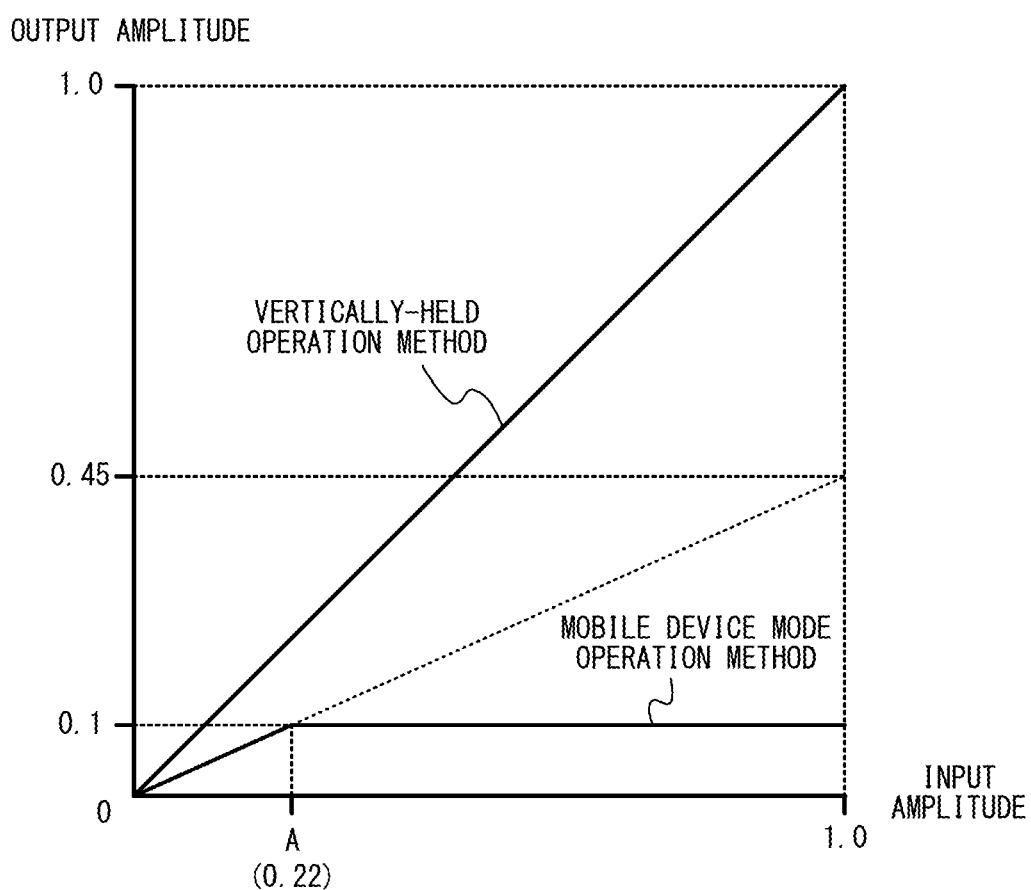
FIG. 18 is a diagram showing non-limiting examples of functions for adjusting the amplitude of a vibration in each operation method.
FIG. 19 is a diagram showing a non-limiting example of the relationship between amplitudes in a vertically-held operation method and a mobile device mode operation method subjected to an amplitude adjustment.

As is clear from FIG. 19, even when the user wishes to cause the player object PO to perform the same action, it may be necessary to perform a different operation due to the fact that the operation method is different. For example, when the user wishes to cause the player object PO to move in the front, back, left, and right directions, then in the vertically-held operation method, it is necessary to perform the operation of tilting the left controller 3 and the right controller 4 in the direction in which the user wishes to cause the player object PO to move. In the extension grip operation method, the mobile device mode operation method, and the horizontally-held operation method, however, it is necessary to perform an tilt operation on a stick. Further, when the user wishes to cause the player object PO to move in the front, back, left, and right directions, a stick for use in the operation is different between the extension grip operation method, the mobile device mode operation method, and the horizontally-held operation method using the right controller 4. Further, when the user wishes to cause the player object PO to move in the front, back, left, and right directions, the direction in which the analog stick 32 is tilted is different between the extension grip operation method, the mobile device mode operation method, and the horizontally-held operation method using the left controller 3. Specifically, when the user wishes to cause the player object PO to move to the left or right, then in the extension grip operation method and the mobile device mode operation method, it is necessary to tilt the analog stick 32 in the positive x-axis direction or the negative x-axis direction. In the horizontally-held operation method using the left controller 3, however, it is necessary to tilt the analog stick 32 in the positive y-axis direction or the negative y-axis direction. Further, when the user wishes to cause the player object PO to move forward or backward, then in the extension grip operation method and the mobile device mode operation method, it is necessary to tilt the analog stick 32 in the positive y-axis direction or the negative y-axis direction. In the horizontally-held operation method using the left controller 3, however, it is necessary to tilt the analog stick 32 in the negative x-axis direction or the positive x-axis direction. Further, these operation contents have similar differences also in a case where the moving directions of the first object G1 and/or the second object G2 are changed.

Further, when the user causes the player object PO to perform the action of throwing a left punch or a right punch, then in the vertically-held operation method, it is necessary to perform the operation of swinging the left controller 3 or the right controller 4. In the extension grip operation method, the mobile device mode operation method, and the horizontally-held operation method, however, it is necessary to perform the operation of pressing operation buttons assigned as described above. Then, an operation button assigned in a case where the user causes the player object PO to perform the action of throwing a left punch or a right punch is different also between the extension grip operation method, the mobile device mode operation method, and the horizontally-held operation method. Further, when the user causes the player object PO to perform the action of or dashing, an operation button assigned to each operation method is different.

Further, as is clear from FIG. 19, even when the same operation is performed using the left controller 3 and/or the right controller 4, the corresponding action of the player object PO may be different due to the fact that the operation method is different. For example, between when a tilt operation is performed on the analog stick 32 in the extension grip operation method and the mobile device mode operation method and when a tilt operation is performed on the analog stick 32 in the horizontally-held operation method using the left controller 3, the direction in which the player object PO moves is different, even if the operation of tilting the stick in the same direction is performed. Further, when the B-button 54 is subjected to a pressing operation in the extension grip operation method and the mobile device mode operation method, the player object PO performs the action of throwing a left punch. However, when the B-button 54 is subjected to a pressing operation in the horizontally-held operation method using the right controller 4, the player object PO performs the action of dashing. When the A-button 53 is subjected to a pressing operation in the extension grip operation method and the mobile device mode operation method, the player object PO performs the action of throwing a right punch. However, when the A-button 53 is subjected to a pressing operation in the horizontally-held operation method using the right controller 4, the player object PO performs the action of throwing a left punch. When the X-button 55 is subjected to a pressing operation in the extension grip operation method and the mobile device mode operation method, the player object PO performs the action of jumping. However, when the X-button 55 is subjected to a pressing operation in the horizontally-held operation method using the right controller 4, the player object PO performs the action of throwing a right punch. Then, when the Y-button 56 is subjected to a pressing operation in the extension grip operation method and the mobile device mode operation method, the player object PO performs the action of dashing. However, when the Y-button 56 is subjected to a pressing operation in the horizontally-held operation method using the right controller 4, the player object PO performs the action of jumping.

Further, in the exemplary embodiment, also when the user performs game play by holding both the left controller 3 and the right controller 4 by the vertically-held operation method, a vibration relatively stronger than in another operation method is imparted to the held one of the left controller 3 and the right controller 4 in accordance with the situation of this game. As described above, the left controller 3 includes the vibrator 107, and the right controller 4 includes the vibrator 117. The processor 81 of the main body apparatus 2 transmits vibration data to the left controller 3 and/or the right controller 4 in accordance with the situation of an executed game and thereby can vibrate the vibrator 107 or the vibrator 117 at an amplitude and a frequency corresponding to the vibration data.

In FIG. 18, in the exemplary embodiment, each of the intensities (typically, the magnitudes of the amplitudes) of vibrations to be imparted to the left controller 3 and/or the right controller 4 is changed using a function corresponding to the operation method for operating the controller, and the frequency of the vibration is not changed. Specifically, in the exemplary embodiment, a plurality of functions (parameters) (a first sub-function and a second sub-function (a coefficient a and an upper limit value b)) in a case where the magnitude of the amplitude is changed are prepared in accordance with the operation method.

The coefficient a indicates a coefficient by which the amplitude before being adjusted (an input amplitude x) is multiplied. Thus, it is indicated that the adjusted amplitude (an output amplitude y) to be output by adjusting the magnitude of the amplitude is adjusted by the following function (the first sub-function).

$$y=ax.$$

As an example, the coefficient a is set such that a=1 in the vertically-held operation method, a=0.35, in the horizontally-held operation method, a=0.45 in the mobile device mode operation method, and a=0.65 in the extension grip operation method. Such a coefficient a is set, whereby, although the input amplitude x is set as it is as the output amplitude y without being adjusted in the vertically-held operation method, in all the other operation methods, the input amplitude x is converted to be smaller, and the vibration having the output amplitude y is adjusted to be weaker than in the vertically-held operation method.

The upper limit value b indicates a constant in which, when the maximum value of the input amplitude or each of the maximum values of the amplitudes of vibrations to be imparted to the left controller 3 and/or the right controller 4 (the maximum value of the output amplitude) is 1, the amplitude before being adjusted (the input amplitude x) is changed to be less than or equal to the maximum value. Thus, it is indicated that when the input amplitude x is equal to or greater than the upper limit value b, the adjusted amplitude (the output amplitude y) to be output by adjusting the magnitude of the amplitude is adjusted by the following function (the second sub-function).

$$y=b.$$

As an example, the upper limit value b is set such that b=1 in the vertically-held operation method, b=0.2 in the horizontally-held operation method, b=0.1 in the mobile device mode operation method, and b=0.4 in the extension grip operation method. Such an upper limit value b is set, whereby, although the input amplitude x is set as it is as the output amplitude y without being adjusted in the vertically-held operation method, in all the other operation methods, the output amplitude y is converted to be less than or equal to the upper limit value b, and the vibration is adjusted to be weaker than in the vertically-held operation method.

In the exemplary embodiment, the output amplitude y calculated using y=ax (the first sub-function) and the output amplitude y calculated based on y=b (the second sub-function) are compared, and the output amplitude of which y is a smaller value is employed as the output amplitude y. For example, as shown in FIG. 19, when vibrations are imparted to the left controller 3 and/or the right controller 4 using the mobile device mode operation method, the value of y converted using y=0.45x (the first sub-function) is output as the output amplitude y until the value of y calculated using y=0.45x exceeds an upper limit value of 0.1 (when the input amplitude x is 0 to A (about 0.22)). When the value of y calculated using y=0.45x exceeds an upper limit value of 0.1 (when the input amplitude x is A (about 0.22) to 1), the value of y=0.1 is output as the output amplitude y. On the other hand, in the vertically-held operation method, the input amplitude x is output as it is as the output amplitude y without being adjusted. Thus, as a result, the magnitude of the amplitude to be imparted to each controller in the mobile device mode operation method is adjusted to be smaller than in the vertically-held operation method.

Figure 20:
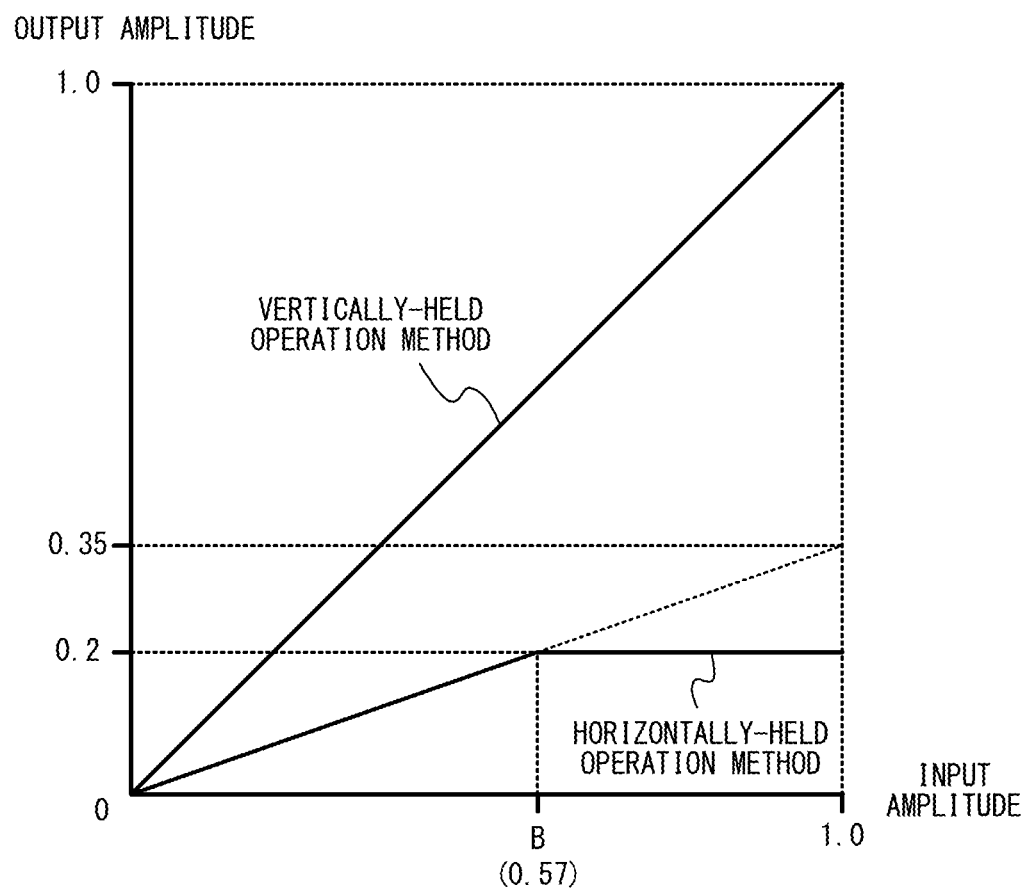
FIG. 20 is a diagram showing a non-limiting example of the relationship between amplitudes in the vertically-held operation method and a horizontally-held operation method subjected to an amplitude adjustment.

Further, as shown in FIG. 20, when a vibration is imparted to the left controller 3 or the right controller 4 using the horizontally-held operation method, the value of y converted using y=0.35x (the first sub-function) is output as the output amplitude y until the value of y calculated y=0.35x exceeds an upper limit value of 0.2 (when the input amplitude x is 0 to B (about 0.57)). When the value of y calculated using y=0.35x exceeds an upper limit value of 0.2 (when the input amplitude x is B (about 0.57) to 1), the value of y=0.2 is output as the output amplitude y. On the other hand, in the vertically-held operation method, the input amplitude x is output as it is as the output amplitude y without being adjusted. Thus, as a result, the magnitude of the amplitude to be imparted to each controller in the horizontally-held operation method is adjusted to be smaller than in the vertically-held operation method.

Figure 21:
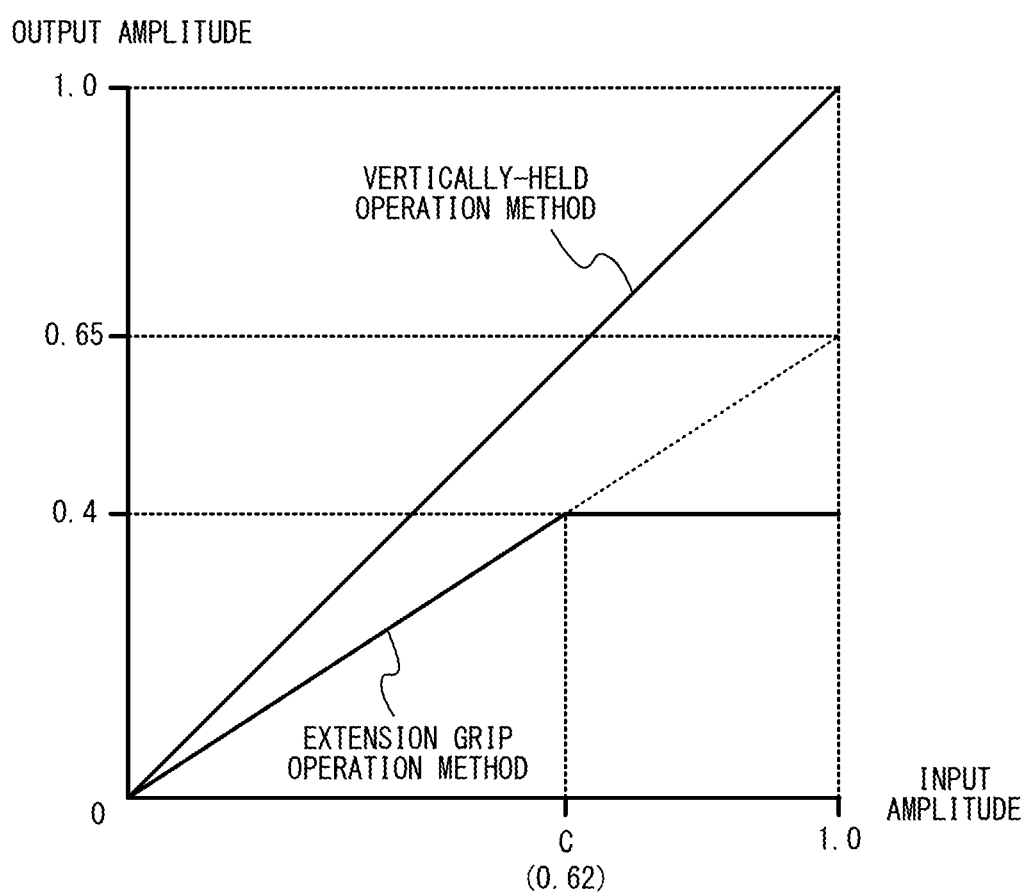
FIG. 21 is a diagram showing a non-limiting example of the relationship between amplitudes in the vertically-held operation method and an operation grip operation method subjected to an amplitude adjustment.

Further, as shown in FIG. 21, when vibrations are imparted to the left controller 3 and/or the right controller 4 using the extension grip operation method, the value of y converted using y=0.65x (the first sub-function) is output as the output amplitude y until the value of y calculated using y=0.65x exceeds an upper limit value of 0.4 (when the input amplitude x is 0 to C (about 0.62)). When the value of y calculated using y=0.65x exceeds an upper limit value of 0.4 (when the input amplitude x is C (about 0.62) to 1), the value of y=0.4 is output as the output amplitude y. On the other hand, in the vertically-held operation method, the input amplitude x is output as it is as the output amplitude y without being adjusted. Thus, as a result, the magnitude of the amplitude to be imparted to each controller in the extension grip operation method is adjusted to be smaller than in the vertically-held operation method.

It should be noted that the functions (the parameters) used in the extension grip operation method are used when an operation is performed by attaching the left controller 3 and the right controller 4 to the extension grip 210. Alternatively, the functions (the parameters) may be used also when the left controller 3 and/or the right controller 4 are attached to another accessory device, or when an operation is performed using a controller having another shape. That is, the function (the parameters) used in the extension grip operation method may also be selected when an operation is performed using another operation method (other operation methods) different from the vertically-held operation method, the horizontally-held operation method, and the mobile device mode operation method.

Figure 22:
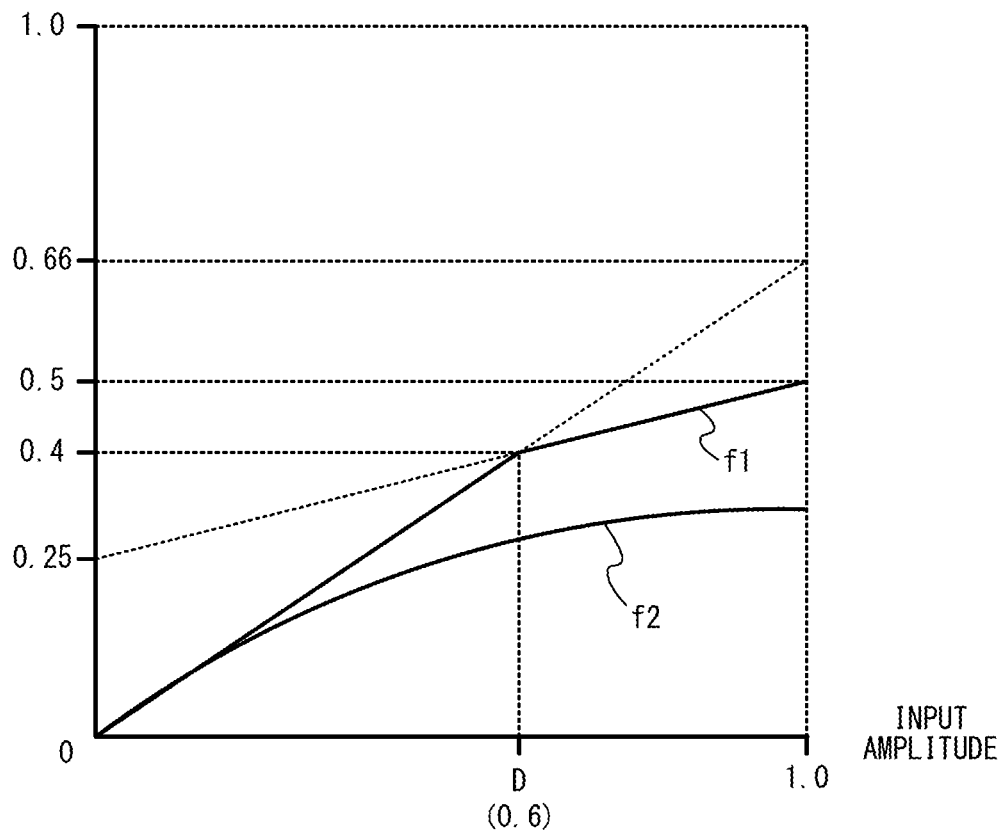
FIG. 22 is a diagram showing a non-limiting example of another amplitude adjustment.

Further, the amplitude may be adjusted using functions (parameters) different from the above functions (parameters). For example, as shown in FIG. 22, the first sub-function and the second sub-function may be set without setting the upper limit value b (a function f1), or a single function (e.g., a logarithmic function, a high-dimensional function, a trigonometric function, or the like passing through (0, 0)) may be set without setting the upper limit value b (a function f2), thereby adjusting the output amplitude y. For example, in the case of the function f1, the value of y converted using y=2 x/3 (the first sub-function) is output as the output amplitude y until the value of y calculated using y=2 x/3 exceeds a switch value of 0.4 (when the input amplitude x is 0 to D (about 0.6)). When the value of y calculated using y=2 x/3 exceeds a switch value of 0.4 (when the input amplitude x is D (about 0.6) to 1), the value of y=(x/4)+0.25 is output as the output amplitude y. Further, the function f2 is a function (e.g., a logarithmic function)

passing through (0, 0), in which as the input amplitude x increases, the degree of increase in the output amplitude y decreases in a gradually decreasing manner. No matter what value the input amplitude x is (when all values with which the input amplitude x is 0 to 1), the value of y calculated using the function f2 is output as the output amplitude y.

Further, in the above examples, the output amplitude is adjusted to be smaller than the input amplitude. Alternatively, functions (parameters) for adjusting the output amplitude to be greater than the input amplitude in accordance with the operation method may be used. Further, in the above examples, when the magnitude of the amplitude is changed, the first sub-function and the second sub-function (the coefficient a and the upper limit value b) corresponding to the operation method are used. Alternatively, three or more sub-functions (three or more parameters) may be set corresponding to the operation method, and sub-functions (parameters) may be selected from these sub-functions (parameters), thereby adjusting the amplitude. Further, in the above examples, the amplitude is adjusted regardless of the frequency of the vibration. Alternatively, functions (parameters) for adjusting an amplitude at a particular frequency indicated by vibration data or an amplitude in a particular frequency band may be used. For example, functions for adjusting the amplitude of a vibration at a resonance frequency of the left controller 3, the right controller 4, the main body apparatus 2, an accessory device (the extension grip 210), another controller used for an operation, or the like, or an apparatus obtained by combining these devices to be small may be set, and the functions may be selected in accordance with an operation device (i.e., a use form) used for an operation, thereby adjusting the amplitude.

Figure 23:
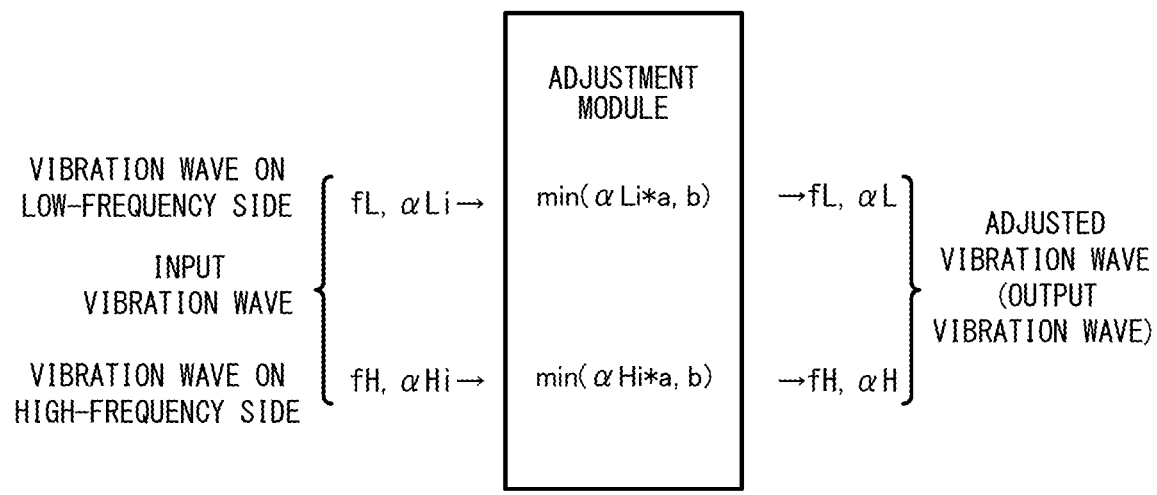
FIG. 23 is a diagram showing a non-limiting example of an adjustment module for use when amplitudes on a high-frequency side and a low-frequency side are adjusted.

Further, when input vibration data is indicated by the combination of a vibration waveform of a high-frequency band and a vibration waveform of a low-frequency band, amplitudes on the high-frequency side and the low-frequency side are adjusted. In FIG. 23, an adjustment module for performing the above amplitude adjustment compares a first amplitude adjustment value $\alpha Li*a$ obtained by multiplying an amplitude $\alpha Li$ of a vibration waveform on the low-frequency side by the coefficient a, with a second amplitude adjustment value b indicated by the amplitude upper limit value b (i.e., a function $\min(\alpha Li*a,b)$), and outputs a vibration waveform indicating a smaller amplitude in the comparison as an adjusted vibration waveform on the low-frequency side. Further, the adjustment module compares a first amplitude adjustment value $\alpha Hi*a$ obtained by multiplying an amplitude $\alpha Hi$ of a vibration waveform on the high-frequency side by the coefficient a, with a second amplitude adjustment value b indicated by the amplitude upper limit value b (i.e., a function $\min(\alpha Hi*a,b)$), and outputs a vibration waveform indicating a smaller amplitude in the comparison as an adjusted vibration waveform on the high-frequency side. It should be noted that the adjustment module outputs a frequency fL of the adjusted vibration waveform on the high-frequency side and a frequency fH of the adjusted vibration waveform on the high-frequency side without changing the frequency fL of the vibration waveform on the low-frequency side and the frequency fH of the high-frequency side vibration waveform. Further, when input vibration data is indicated by the combination of vibration waveforms of three or more different frequency bands, the adjustment module may adjust the amplitudes of the respective frequency bands.

It should be noted that in the above amplitude adjustment process, the value of y converted using the first sub-function and the value of y converted using the second sub-function are compared, and the value of y indicating a smaller value in the comparison is output as the output amplitude y. Alternatively, even when the same first sub-function and second sub-function are used, the output amplitude y may be output using different methods. For example, as is clear from the descriptions with reference to FIGS. 19 to 22, the switch values of the input amplitude x (i.e., the input amplitudes A to D in FIGS. 19 to 22) that switch between a case where the value of y using the first sub-function is employed and a case where the value of y using the second sub-function is employed are used, whereby it is possible to switch a sub-function itself for use in calculation. That is, a conversion function itself for use may be selected in accordance with the value of the input amplitude x so that when the value of the input amplitude x is less than the switch values A to D, the output amplitude y is calculated and output using the first sub-function, and when the value of the input amplitude x is equal to or greater than the switch values A to D, the output amplitude y is calculated and output using the second sub-function.

As described above, the intensity of a vibration is adjusted in accordance with the operation method that is being used. Thus, it is possible to reduce the situation where a vibration felt by the user is too strong or too weak depending on the operation method. For example, if a function for multiplying the amplitude by the coefficient a less than 1 is merely used, and when the intensity of a vibration is adjusted so that a strong vibration is suitable for the user, a weak vibration may be too weak for the user. This results in the situation where the user cannot sense the weak vibration. On the other hand, if a function for limiting the amplitude to the upper limit value b is merely used, it is not possible to adjust the weak vibration less than the upper limit value b in accordance with the operation method. In response to this assumed problem, two sub-functions are appropriately selected, whereby it is possible to adjust the strong vibration to a suitable vibration intensity and also adjust the weak vibration to a suitable vibration intensity. Thus, it is possible to adjust both vibrations to appropriate vibration intensities corresponding to the operation method. Further, when an operation is performed by swinging the left controller 3 and/or the right controller 4 by holding the left controller 3 and/or the right controller 4 (e.g., when the vertically-held operation method is employed), it is difficult for the user to perceive the vibrations of the controllers. Thus, the vibrations are made relatively strong, whereby it is possible to cause the user to easily perceive the vibrations. On the other hand, in another operation method, it is not assumed that an operation is performed by swinging the left controller 3 and/or the right controller 4. Thus, the user can perceive vibrations imparted from the controllers without making the vibrations strong. Thus, it is possible to adjust the vibrations to vibration intensities corresponding to this situation. Further, when the user is caused to perceive the vibration of a controller, it is possible that the vibration to be perceived by the user changes due to the material, the weight, or the shape of the controller, the board thickness of a case main body, the ease of transmission of the vibration in the housing, the ease of transmission of the vibration in an apparatus (the main body apparatus 2 or the extension grip 210) to which the controller is attached, the ease of transmission of the vibration in an attachment part, the distance between the vibrator and a part held by the user, the manner of holding the controller (holding the controller with their palm, holding the controller with their fingertips, or the like), the area of the user's hand in contact with the controller, a part of the hand in contact with the controller, or the like. As described above, however, the amplitude is adjusted in accordance with the operation method, whereby it is possible to cause the user to perceive a vibration with an appropriate intensity.

Figure 24:
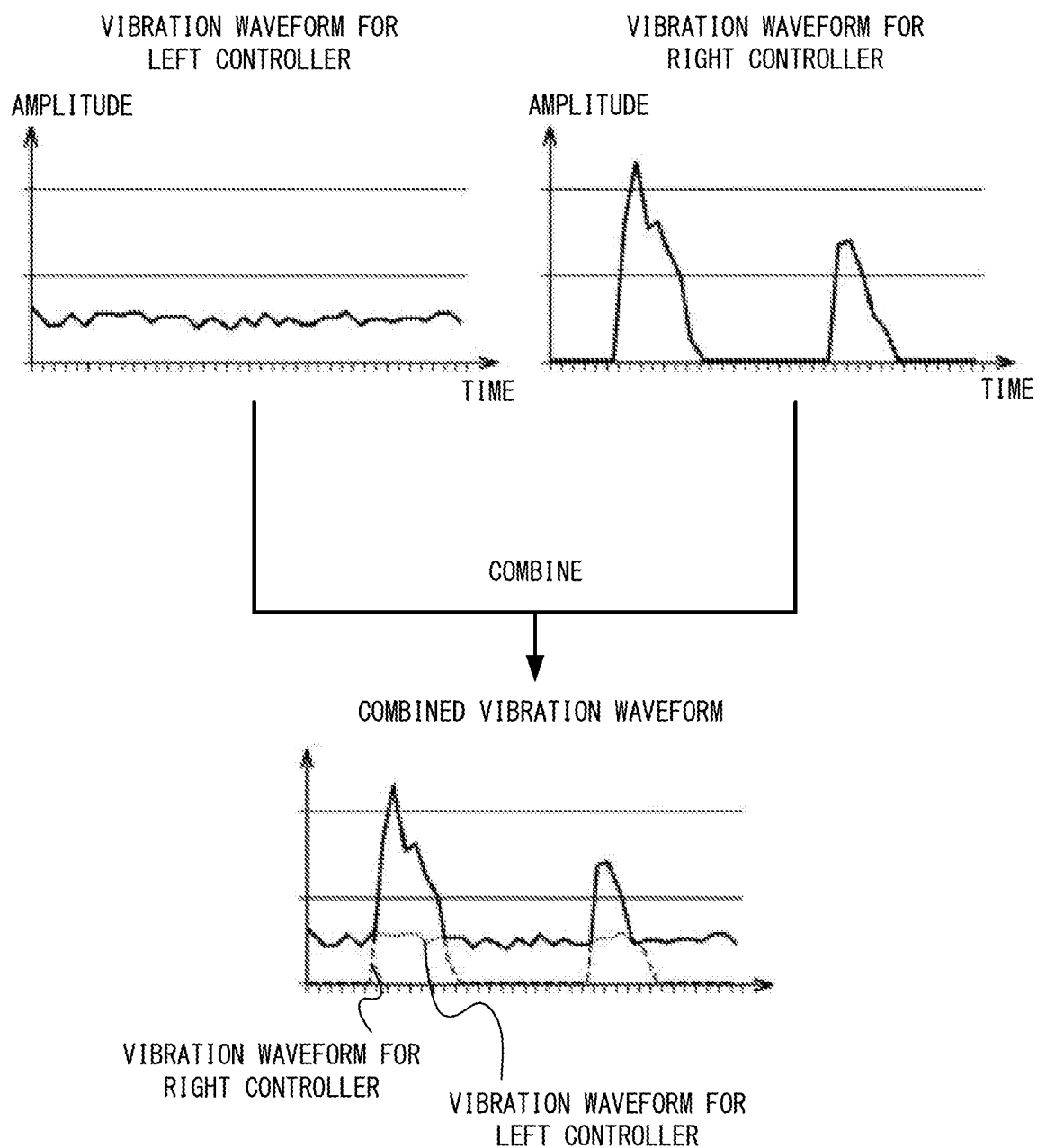
FIG. 24 is a diagram illustrating a non-limiting example of a method for generating vibration data by a selection method.
Figure 26:
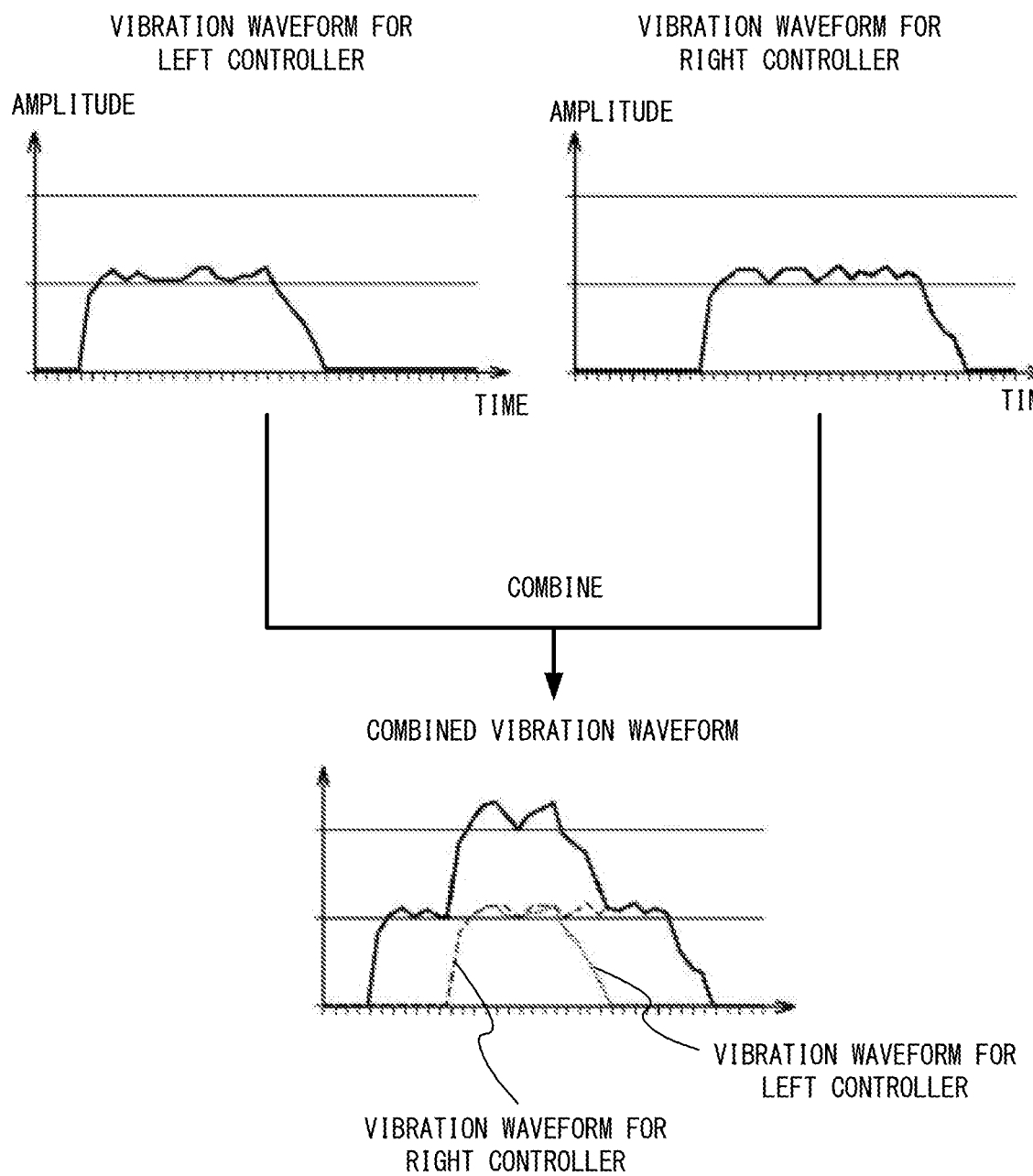
FIG. 26 is a diagram illustrating a non-limiting example of a method for generating vibration data by an addition method.

Further, vibration data for vibrating one of the left controller 3 and the right controller 4 held by the horizontally-held operation method is generated based on vibration data for vibrating the left controller 3 and vibration data for vibrating the right controller 4 in the vertically-held operation method, the extension grip operation method, and the mobile device mode operation method. That is, when game play is performed using a single controller, vibrations imparted to respective controllers when game play is performed using two controllers are combined into a single vibration, and the single vibration is imparted to the single controller. For example, examples of a method for generating vibration data for vibrating a single controller include a selection method and an addition method. With reference to FIGS. 24 to 26, a description is given below of methods for generating vibration data. It should be noted that FIG. 24 is a diagram illustrating an example of a method for generating vibration data by the selection method. FIG. 25 is a diagram showing an example of a combining module for use when a high-frequency side and a low-frequency side are collectively determined. FIG. 26 is a diagram illustrating an example of a method for generating vibration data by the addition method.

When vibration data is generated by the selection method, either one of vibration data after being subjected to the above amplitude adjustment for vibrating the left controller 3 and vibration data after being subjected to the above amplitude adjustment for vibrating the right controller 4 is selected every predetermined time. Specifically, when vibration data after being subjected to the above amplitude adjustment for vibrating the left controller 3 and vibration data after being subjected to the above amplitude adjustment for vibrating the right controller 4 are input, then based on the adjusted amplitude of a vibration waveform for the left controller indicated by the vibration data for vibrating the left controller 3 and the adjusted amplitude of a vibration waveform for the right controller indicated by the vibration data for vibrating the right controller 4, vibration data indicating the vibration waveform having a greater amplitude is selected every predetermined time. Vibration data is thus selected by the selection method, whereby it is possible to preferentially generate a vibration that can be remarkably perceived by the user.

FIG. 24 shows an example of a case where a vibration waveform for the left controller and a vibration waveform for the right controller are input. The vibration waveform for the left controller indicates a relatively weak and continuous vibration, and the vibration waveform for the right controller indicates a relatively strong and short vibration. For example, when vibration data is generated by the selection method, it is determined which vibration waveform has a greater amplitude every predetermined period (e.g., 5 msec to several tens of msec), vibration data indicating the vibration waveform having a greater amplitude is selected and output. Thus, in the selection method, a combined vibration waveform is generated based on a vibration waveform selected every predetermined period, and vibration data indicating the combined vibration waveform is output.

It should be noted that when vibration data is selected by the selection method, vibration data to be selected may be determined also taking into account the frequency of a vibration waveform indicated by the vibration data. For example, when vibration data input after being subjected to the above amplitude adjustment is indicated by the combination of a vibration waveform of a high-frequency band and a vibration waveform of a low-frequency band, a method for independently determining each of the high-frequency side and the low-frequency side, and a method for determining the high-frequency side and the low-frequency side by weighting one of the high-frequency side and the low-frequency side are possible. In the first method, when a vibration waveform for the left controller and a vibration waveform for the right controller are input, then based on the amplitude of the vibration waveform for the left controller on the high-frequency side and the amplitude of the vibration waveform for the right controller on the high-frequency side, vibration data indicating a vibration waveform having a greater amplitude is selected as vibration data on the high-frequency side every predetermined time. Further, when a vibration waveform for the left controller and a vibration waveform for the right controller are input, then based on the amplitude of the vibration waveform for the left controller on the low-frequency side and the amplitude of the vibration waveform for the right controller on the low-frequency side, vibration data indicating a vibration waveform having a greater amplitude is selected as vibration data on the low-frequency side every predetermined time. In the second method, after the amplitude of each frequency band is weighted, a vibration waveform indicating the greatest amplitude is selected every predetermined period, and between the input vibration waveform for the left controller and the input vibration waveform for the right controller, vibration data indicating a vibration waveform including the selected vibration waveform is selected.

Further, when vibration data input after being subjected to the above amplitude adjustment is indicated by the combination of a vibration waveform of a high-frequency band and a vibration waveform of a low-frequency band, it is possible to collectively determine the high-frequency side and the low-frequency side. In FIG. 25, the above combining module compares an amplitude obtained by combining an adjusted amplitude $\alpha 1L$ on the low-frequency side and an adjusted amplitude $\alpha 1H$ on the high-frequency side of the vibration waveform for the left controller, with an amplitude obtained by combining an adjusted amplitude $\alpha 2L$ on the low-frequency side and an adjusted amplitude $\alpha 2H$ on the high-frequency side of the vibration waveform for the right controller (i.e., a function max $(\alpha 1L+\alpha 1H, \alpha 2L+\alpha 2H)$), and outputs as a combined vibration waveform a vibration waveform indicating a greater amplitude in the comparison. That is, based on a value $(\alpha 1L+\alpha 1H)$ calculated from a first amplitude $(\alpha 1L)$ and a second amplitude $(\alpha 1H)$ included in the vibration waveform for the left controller after being subjected to the above amplitude adjustment, and a value $(\alpha 2L+\alpha 2H)$ calculated from a first amplitude $(\alpha 2L)$ and a second amplitude $(\alpha 2H)$ included in the vibration waveform for the right controller after being subjected to the above amplitude adjustment, the combining module selectively outputs either of the vibration waveforms.

As described above, when a plurality of vibration data for vibrating the left controller 3 and a plurality of vibration data for vibrating the right controller 4 are input, then based on the total of the amplitudes indicated by the plurality of vibration data for vibrating the left controller 3 and the total of the amplitudes indicated by the plurality of vibration data for vibrating the right controller 4, a plurality of vibration data having a larger total of the amplitudes are selected every predetermined period. Thus, between the vibration waveform for the left controller and the vibration waveform for the right controller, a greater amplitude is selected as a whole. Thus, it is possible to impart vibration stimulus to the user while maintaining the characteristics of the entirety of input vibration waveforms.

Further, in the selection method shown in FIG. 25, evaluation may be made by weighting the amplitude of an input vibration pattern based on the frequency. Generally, a human being is sensitive to a vibration on the low-frequency side. Thus, for example, the amplitude on the low-frequency side may be multiplied by a weighting coefficient (e.g., b>1) greater than the amplitude on the high-frequency side. In this case, using a function max (bXα1L+α1H, bXα2L+α2H), it may be determined which amplitude is greater.

Further, the configuration may be such that without regard to the difference between a frequency f1L on the low-frequency side of the vibration waveform for the left controller and a frequency f2L on the low-frequency side of the vibration waveform for the right controller, and the difference between a frequency f1H on the high-frequency side of the vibration waveform for the left controller and a frequency f2H on the high-frequency side of the vibration waveform for the right controller, only the amplitudes of the vibration waveforms may be compared.

Further, a predetermined number of frequency components may be selected, based on the magnitudes of the amplitudes, from frequency components included in the vibration waveform for the left controller and the vibration waveform for the right controller. That is, the top two frequency components may be extracted from the amplitude α1L on the low-frequency side of the vibration waveform for the left controller, the amplitude α1H on the high-frequency side of the vibration waveform for the left controller, the amplitude α2L on the low-frequency side of the vibration waveform for the right controller, and the amplitude α2H on the high-frequency side of the vibration waveform for the right controller, and output as a combined vibration waveform.

Further, when vibration data is selected by the selection method, vibration data to be selected may be determined based on a parameter different from the amplitude of a vibration waveform indicated by the vibration data. For example, based on the frequency of a vibration waveform indicated by vibration data, vibration data indicating the vibration waveform having a smaller frequency may be selected every predetermined time.

As shown in FIG. 26, when vibration data is generated by the addition method, vibration waveforms of vibration data for vibrating the left controller 3 after being subjected to the above amplitude adjustment and vibration data for vibrating the right controller 4 after being subjected to the above amplitude adjustment are superimposed on each other every predetermined time. Specifically, when vibration data for vibrating the left controller 3 after being subjected to the above amplitude adjustment and vibration data for vibrating the right controller 4 after being subjected to the above amplitude adjustment are input, a combined vibration waveform is generated by superimposing a vibration waveform for the left controller indicated by the vibration data for vibrating the left controller 3 and a vibration waveform for the right controller indicated by the vibration data for vibrating the right controller 4 on each other every predetermined time, and vibration data indicating the combined vibration waveform is generated. Specifically, it is possible to generate a combined vibration waveform by adding the amplitudes of vibration waveforms after being subjected to the above amplitude adjustment input every predetermined cycle. In this case, vibration waveform for the left controller after being subjected to the above amplitude adjustment and vibration waveform for the right controller after being subjected to the above amplitude adjustment are coupled together on a time axis. Vibration data is thus generated by the addition method, whereby, for example, in the situation where a plurality of vibrations of similar types can frequently overlap each other as shown in FIG. 25, it is possible to cause the user to perceive vibrations overlapping each other without lacking the plurality of vibrations of similar types.

Here, when vibration data is combined by the addition method, the frequency of a combined vibration waveform is calculated based on the frequency of a vibration waveform for the left controller and the frequency of a vibration waveform for the right controller. As a first example, among an input vibration waveform for the left controller and an input vibration waveform for the right controller, the frequency of a vibration waveform having the greatest amplitude is adopted. As a second example, the average value of the frequency of an input vibration waveform for the left controller and the frequency of an input vibration waveform for the right controller is adopted. As a third example, after the frequency of an input vibration waveform for the left controller and the frequency of an input vibration waveform for the right controller are weighted based on the respective amplitudes (e.g., a weighted average corresponding to the amplitude), the frequency is calculated based on the first example or the second example.

It should be noted that when vibration data is combined by the addition method, it is possible to generate a combined vibration waveform by adding the amplitudes of vibration waveforms input every predetermined cycle. Alternatively, a combined vibration waveform may be generated by averaging the amplitudes of vibration waveforms. Further, when a combined vibration waveform is generated by averaging the amplitudes of vibration waveforms, the amplitudes weighted based on the frequencies of the respective vibration waveforms may be averaged.

As described above, even when an operation is performed using one of the left controller 3 and the right controller 4 by the horizontally-held operation method, a vibration is generated based on a vibration to be imparted when an operation is performed using both the left controller 3 and the right controller 4. Thus, the user performing an operation by the horizontally-held operation method can perceive a vibration based on the same vibration data as a vibration by another operation method. Thus, it is possible to prevent interest by an operation method from being impaired.

Further, in the above description, examples have been used where vibration data for vibrating a single controller is generated by the selection method and the addition method. Alternatively, the vibration data may be generated using another method. For example, when a vibration synchronized with a sound is imparted to each of the left controller 3 and the right controller 4 in the vertically-held operation method, the extension grip operation method, and the mobile device mode operation method, then in the horizontally-held operation method, a vibration based on a combined sound obtained by combining these sounds may be imparted to one of the left controller 3 and the right controller 4. Specifically, in the vertically-held operation method, the extension grip operation method, and the mobile device mode operation method, vibration data for vibrating the left controller 3 is generated based on sound data indicating a sound (e.g., a movement sound, a collision sound, a breaking sound, or the like) involved in the movement of the first object G1 in the virtual game world, and vibration data for vibrating the right controller 4 is generated based on a sound data indicating a sound (e.g., a movement sound, a collision sound, a breaking sound, or the like) involved in the movement of the second object G2 in the virtual game world. In this case, in the horizontally-held operation method, combined sound data obtained by combining the sound involved in the movement of the first object G1 and the sound involved in the movement of the second object G2 is generated, and based on the combined sound data, vibration data for vibrating one of the left controller 3 and the right controller 4 is generated.

Further, in the above description, the process of adjusting the amplitude in accordance with the operation method and then combining vibration data is performed. Alternatively, another procedure may be employed. For example, after the process of combining the vibration data is performed, the above amplitude adjustment process corresponding to the operation method may be performed.

Figure 27:
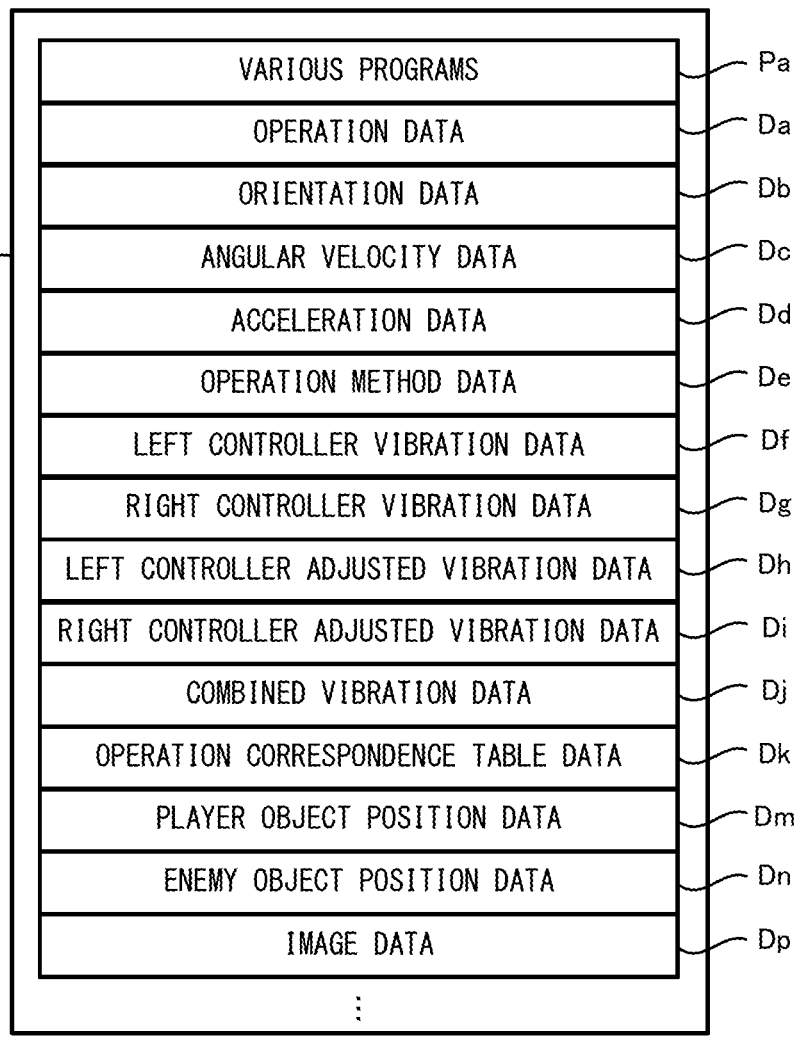
FIG. 27 is a diagram showing a non-limiting example of a data area set in a DRAM 85 of the main body apparatus 2.

Next, with reference to FIGS. 27 to 32, a description is given of an example of specific processing executed by the game system 1 according to the exemplary embodiment. FIG. 27 is a diagram showing an example of a data area set in the DRAM 85 of the main body apparatus 2 according to the exemplary embodiment. It should be noted that in the DRAM 85, in addition to data shown in FIG. 27, data used for other processes is also stored, but is not described in detail here.

In a program storage area of the DRAM 85, various programs Pa, which are executed by the game system 1, are stored. In the exemplary embodiment, as the various programs Pa, a communication program for wirelessly communicating with the left controller 3 and the right controller 4, an application program for performing information processing (e.g., game processing) based on data acquired from the left controller 3 and/or the right controller 4, a vibration control program for vibrating the left controller 3 and/or the right controller 4, and the like are stored. It should be noted that the various programs Pa may be stored in advance in the flash memory 84, or may be acquired from a storage medium attachable to and detachable from the game system 1 (e.g., a storage medium attached to the slot 23) and stored in the DRAM 85, or may be acquired from another apparatus via a network such as the Internet and stored in the DRAM 85. The processor 81 executes the various programs Pa stored in the DRAM 85.

In a data storage area of the DRAM 85, various data used for processes such as a communication process, information processing, and the like executed by the game system 1 is stored. In the exemplary embodiment, in the DRAM 85, operation data Da, orientation data Db, angular velocity data Dc, acceleration data Dd, operation method data De, left controller vibration data Df, right controller vibration data Dg, left controller adjusted vibration data Dh, right controller adjusted vibration data Di, combined vibration data Dj, operation correspondence table data Dk, player object position data Dm, enemy object position data Dn, image data Dp, and the like are stored.

The operation data Da is operation data appropriately acquired from each of the left controller 3 and/or the right controller 4. As described above, operation data transmitted from each of the left controller 3 and/or the right controller 4 includes information regarding an input (specifically, information regarding an operation or the detection result of each sensor) from each input section (specifically, each button, an analog stick, and each sensor). In the exemplary embodiment, operation data is transmitted from each of the left controller 3 and/or the right controller 4 in a predetermined cycle through wireless communication, and the operation data Da is appropriately updated using the received operation data. It should be noted that the update cycle of the operation data Dc may be such that the operation data Da is updated every frame, which is the cycle of the processing described later performed by the game system 1, or is updated every cycle in which operation data is transmitted through the above wireless communication.

The orientation data Db is data indicating each of the orientations of the left controller 3 and the right controller 4 with respect to the direction of a gravitational acceleration in real space. For example, the orientation data Db includes data indicating the direction of a gravitational acceleration acting on each of the left controller 3 and the right controller 4, data indicating xyz-axis directions relative to the direction of the gravitational acceleration, and the like.

The angular velocity data Dc is data indicating angular velocities generated in each of the left controller 3 and the right controller 4. For example, the angular velocity data Dc includes data indicating angular velocities about the xyz axes generated in each of the left controller 3 and the right controller 4 and the like.

The acceleration data Dd is data indicating accelerations generated in each of the left controller 3 and the right controller 4. For example, the acceleration data Dd includes data indicating accelerations generated in the xyz-axis directions, except for the gravitational acceleration generated in each of the left controller 3 and the right controller 4.

The operation method data De is data indicating an operation method (e.g., the vertically-held operation method, the extension grip operation method, the horizontally-held operation method, or the mobile device mode operation method) selected and set by the user.

The left controller vibration data Df is data indicating a vibration for vibrating the left controller 3. The right controller vibration data Dg is data indicating a vibration for vibrating the right controller 4. The left controller adjusted vibration data Dh is data indicating a vibration subjected to the amplitude adjustment for vibrating the left controller 3. The right controller adjusted vibration data Di is data indicating a vibration subjected to the amplitude adjustment for vibrating the right controller 4. The combined vibration data Dj is data indicating a vibration for vibrating one of the left controller 3 and the right controller 4 when the horizontally-held operation method is set.

The operation correspondence table data Dk is data indicating the operation correspondence table (see FIG. 17) in which the contents of instructions to be given corresponding to operations are described with respect to each operation method.

The player object position data Dm is data indicating each of the positions and the directions (the moving directions) in the virtual space of the first object G1, the second object G2, and the player object PO. The enemy object position data Dn is data indicating the position and the direction in the virtual space of the enemy object EO and data indicating the positions and the directions in the virtual space of objects shot from the enemy object EO (e.g., objects representing the left glove (the left fist) and the right glove (the right fist)).

The image data Dp is data for displaying an image (e.g., an image of a virtual object, a field image, or a background image) on the display 12 of the main body apparatus 2 or the display screen of the stationary monitor 6 when a game is performed.

Figure 28:
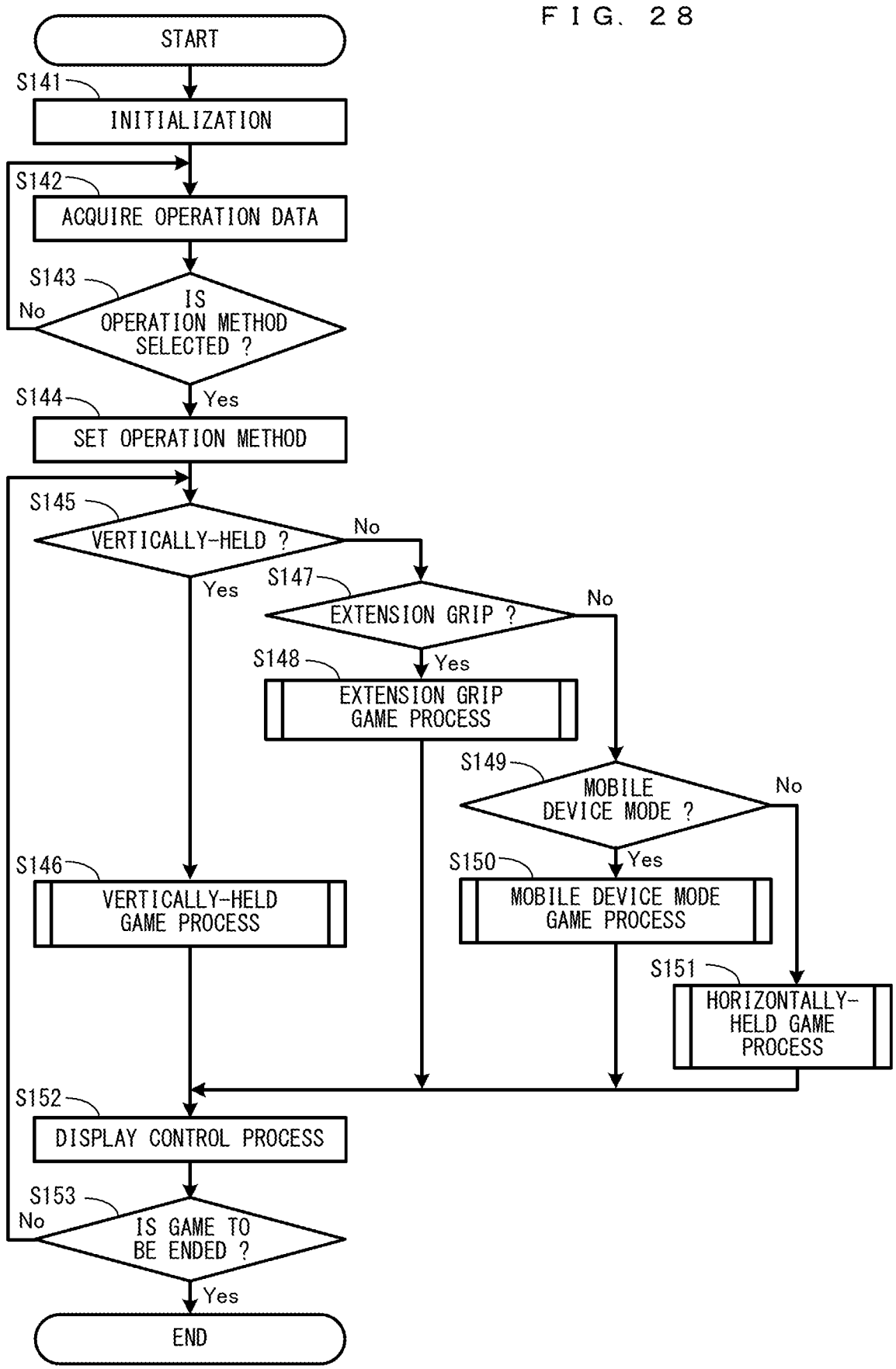
FIG. 28 is a flow chart showing a non-limiting example of game processing executed by the game system 1.
Figure 29:
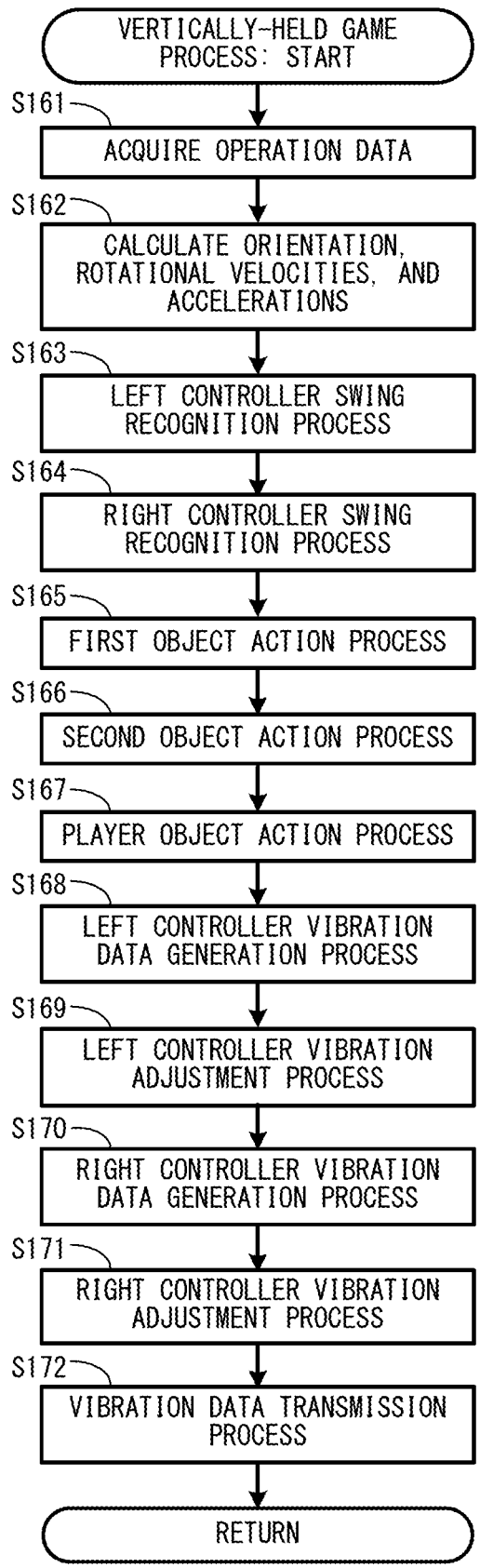
FIG. 29 is a subroutine showing a non-limiting example of the details of a vertically-held game process performed in step S146 in FIG. 28.
Figure 30:
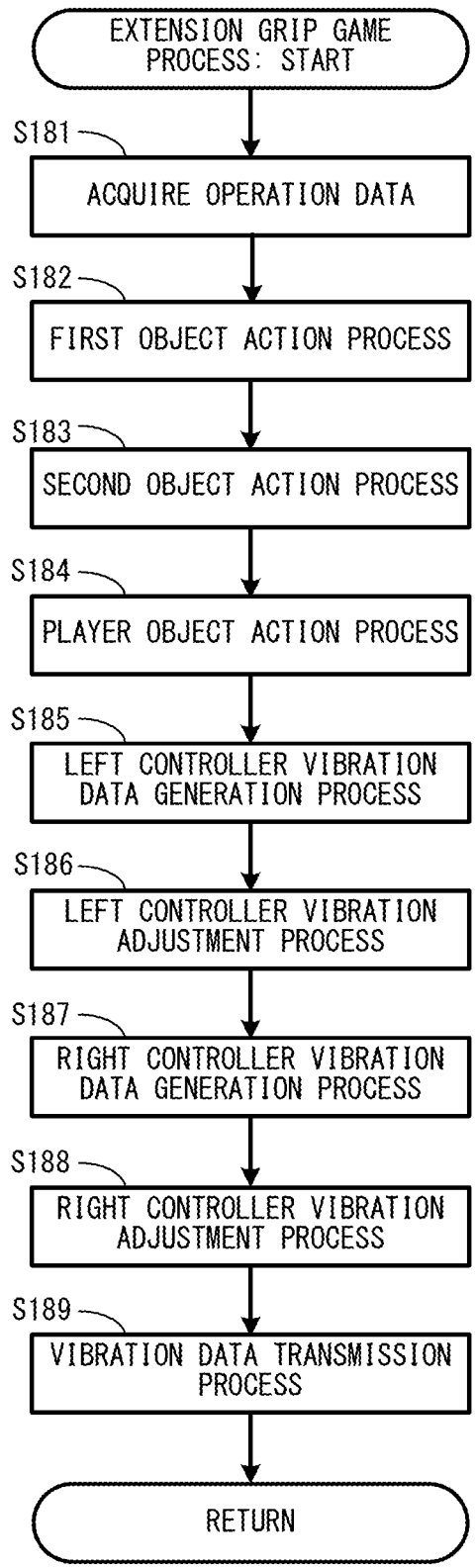
FIG. 30 is a subroutine showing a non-limiting example of the details of an extension grip game process performed in step S148 in FIG. 28.
Figure 31:
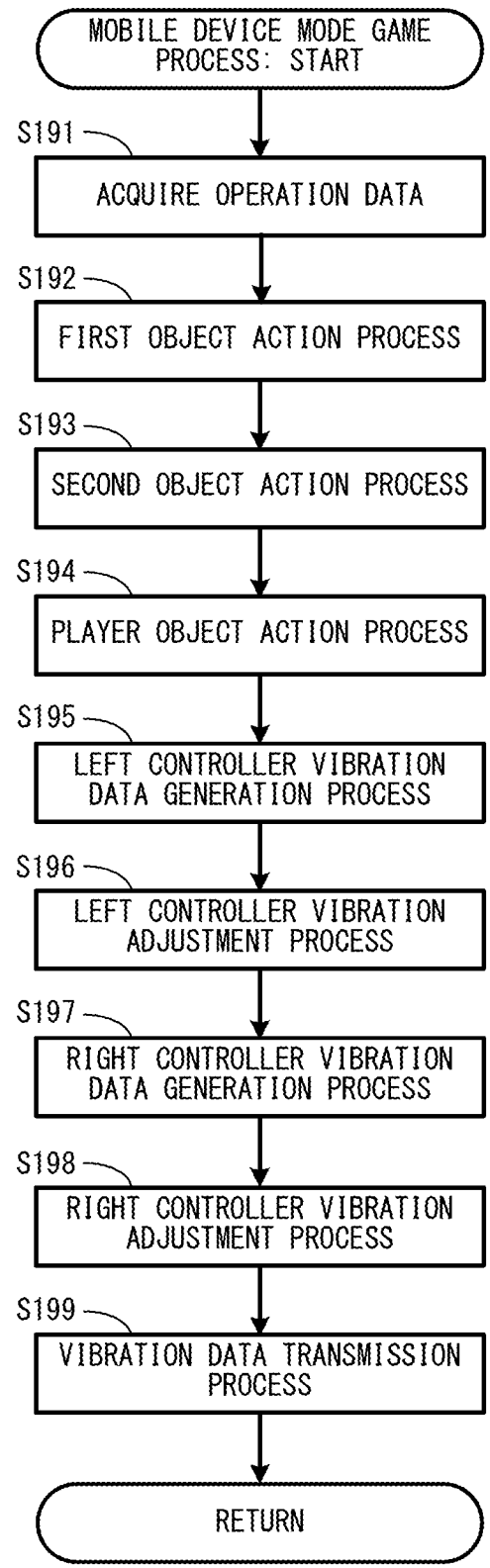
FIG. 31 is a subroutine showing a non-limiting example of the details of a mobile device mode game process performed in step S150 in FIG. 28.
Figure 32:
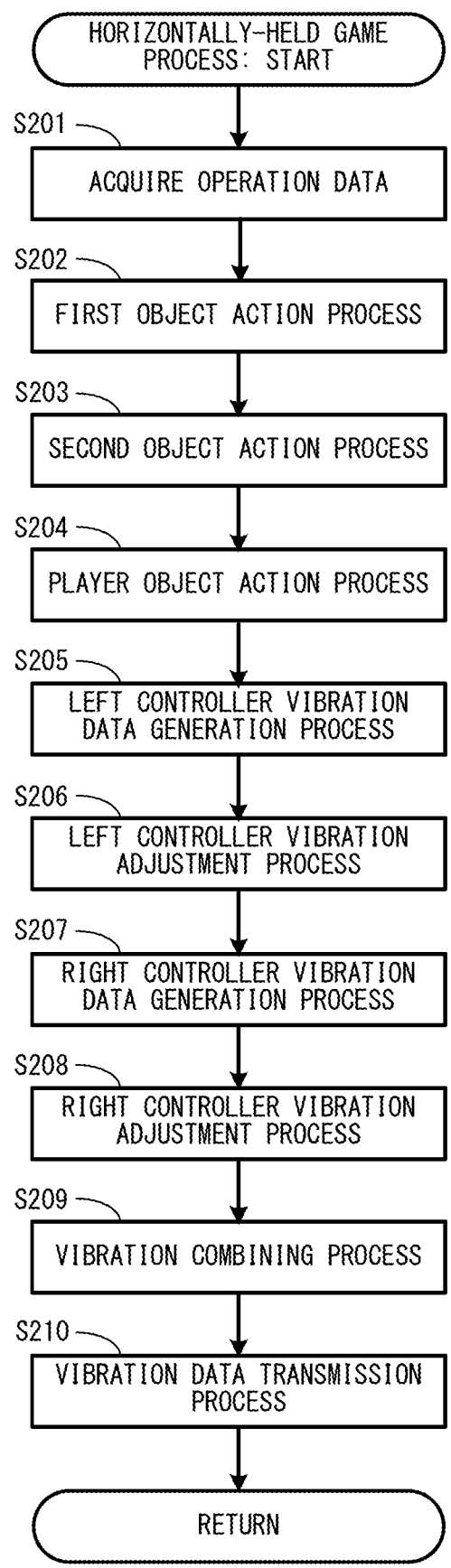
FIG. 32 is a subroutine showing a non-limiting example of the details of a horizontally-held game process performed in step S151 in FIG. 28.

Next, with reference to FIGS. 28 to 32, a detailed example of information processing (game processing) according to the exemplary embodiment is described. FIG. 28 is a flow chart showing an example of game processing executed by the game system 1. FIG. 29 is a subroutine showing an example of the details of a vertically-held game process performed in step S146 in FIG. 28. FIG. 30 is a subroutine showing an example of the details of an extension grip game process performed in step S148 in FIG. 28. FIG. 31 is a subroutine showing an example of the details of a mobile device mode game process performed in step S150 in FIG. 28. FIG. 32 is a subroutine showing an example of the details of a horizontally-held game process performed in step S151 in FIG. 28. In the exemplary embodiment, a series of processes shown in FIGS. 28 to 32 is performed by the processor 81 executing the communication program and a predetermined application program (a game program) included in the various programs Pa. Further, the game processing shown in FIGS. 28 to 32 is started at any timing.

It should be noted that the processes of all of the steps in the flow charts shown in FIGS. 28 to 32 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the processor 81 performs the processes of all of the steps in the flow charts. Alternatively, a processor or a dedicated circuit other than the processor 81 may perform the processes of some of the steps in the flow charts. Yet alternatively, part of the processing performed by the main body apparatus 2 may be executed by another information processing apparatus capable of communicating with the main body apparatus 2 (e.g., a server capable of communicating with the main body apparatus 2 via a network). That is, all the processes shown in FIGS. 28 to 32 may be executed by the cooperation of a plurality of information processing apparatuses including the main body apparatus 2.

In FIG. 28, the processor 81 performs initialization in the game processing (step S141), and the processing proceeds to the next step. For example, in the initialization, the processor 81 initializes parameters for performing the processing described below. Further, in the initialization, the processor 81 sets a game field for performing game play and sets the initial positions of the player object PO and the enemy object EO on the game field, thereby updating the player object position data Dm and the enemy object position data Dn. Further, the processor 81 initializes the moving directions of the first object G1 and the second object G2 to default values (e.g., front directions), thereby updating the player object position data Dm.

Next, the processor 81 acquires operation data from the left controller 3 and/or the right controller 4 and updates the operation data Da (step S142), and the processing proceeds to the next step.

Next, the processor 81 determines whether or not an operation method is selected by the user (step S143). Then, when an operation method is selected, the processing proceeds to step S144. On the other hand, when an operation method is not selected, the processor 81 repeats the process of step S142 and waits for the user to select an operation method.

In the process of the above step S143, as an example, when the operation data acquired in the above step S142 corresponds to any of the specific operations set for each of the plurality of operation methods, the processor 81 determines that an operation method is selected. For example, when the operation of simultaneously pressing the first L-button 38 of the left controller 3 and the first R-button 60 of the right controller 4 is performed in the state where the left controller 3 and the right controller 4 are not connected in a wired manner to the main body apparatus 2, the processor 81 determines that the vertically-held operation method is selected. Further, when the operation of simultaneously pressing the ZL-button 39 of the left controller 3 and the ZR-button 61 of the right controller 4 is performed in the state where the left controller 3 and the right controller 4 are not connected in a wired manner to the main body apparatus 2, the processor 81 determines that the extension grip operation method is selected. Further, when the main body apparatus 2 is physically connected (connected in a wired manner) to the left controller 3 and the right controller 4, the processor 81 determines that the mobile device mode operation method is selected. Further, when the operation of simultaneously pressing the second L-button 43 and the second R-button 44 of the left controller 3 is performed in the state where the left controller 3 and the right controller 4 are not connected in a wired manner to the main body apparatus 2, the processor 81 determines that the horizontally-held operation method using the left controller 3 is selected. When the operation of simultaneously pressing the second L-button 65 and the second R-button 66 of the right controller 4 is performed, the processor 81 determines that the horizontally-held operation method using the right controller 4 is selected.

As another example, the processor 81 displays options urging the user to select an operation method on the display 12 of the main body apparatus 2 or the display screen of the stationary monitor 6. When the operation data acquired in the above step S142 indicates the operation of selecting any one of the options, the processor 81 determines that an operation method is selected. For example, the processor 81 displays options for the user to select the vertically-held operation method, the extension grip operation method, the mobile device mode operation method, and the horizontally-held operation method on the display 12 of the main body apparatus 2 or the display screen of the stationary monitor 6, thereby urging the user to select any one of the options.

In step S144, the processor 81 sets the operation method, and the processing proceeds to the next step. For example, the processor 81 updates the operation method data De using data indicating the operation method selected in the above step S143.

Next, the processor 81 determines whether or not the vertically-held operation method is selected (step S145). Then, when the vertically-held operation method is selected, the processing proceeds to step S146. On the other hand, when the vertically-held operation method is not selected, the processing proceeds to step S147.

In step S146, the processor 81 performs a game process by the vertically-held operation method, and the processing proceeds to step S152. With reference to FIG. 29, the game process by the vertically-held operation method is described below.

In FIG. 29, the processor 81 acquires operation data from the left controller 3 and the right controller 4 and updates the operation data Da (step S161), and the processing proceeds to the next step.

Next, the processor 81 calculates the orientation, the angular velocities, and the accelerations of each of the left controller 3 and the right controller 4 (step S162), and the processing proceeds to the next step. For example, the processor 81 acquires data indicating accelerations generated in each of the left controller 3 and the right controller 4 from the operation data Da, calculates the direction of a gravitational acceleration acting on each of the left controller 3 and the right controller 4, and updates the orientation data Db using data indicating the direction. As a method for extracting a gravitational acceleration, any method may be used. For example, an acceleration component generated on average in each of the left controller 3 and the right controller 4 may be calculated and extracted as a gravitational acceleration. Then, the processor 81 calculates, as the orientation of the left controller 3, the xyz-axis directions of the left controller 3 with respect to the direction of the gravitational acceleration calculated for the left controller 3 and updates the orientation data Db using data indicating the orientation. Further, the processor 81 calculates, as the orientation of the right controller 4, the xyz-axis directions of the right controller 4 with respect to the direction of the gravitational acceleration calculated for the right controller 4 and updates the orientation data Db using data indicating the orientation. Further, the processor 81 acquires data indicating angular velocities generated in each of the left controller 3 and the right controller 4 from the operation data Da, calculates angular velocities about the xyz axes of each of the left controller 3 and the right controller 4, and updates the angular velocity data Dc using data indicating the angular velocities. Further, the processor 81 acquires data indicating accelerations generated in each of the left controller 3 and the right controller 4 from the operation data Da, removes the gravitational acceleration component from the accelerations in the xyz-axis directions generated in each of the left controller 3 and the right controller 4, and updates the acceleration data Dd using data indicating the accelerations after the removal.

It should be noted that after the xyz-axis directions with respect to the gravitational acceleration are calculated, the orientation of the left controller 3 or the right controller 4 may be updated in accordance with only the angular velocities about the xyz axes. However, to prevent the relationship between the orientation of the left controller 3 or the right controller 4 and the direction of the gravitational acceleration from shifting due to erroneous accumulation, the xyz-axis directions relative to the direction of the gravitational acceleration may be calculated every predetermined cycle, and the orientation of the left controller 3 or the right controller 4 may be corrected.

Next, the processor 81 performs a left controller swing recognition process (step S163), and the processing proceeds to the next step. For example, with reference to the acceleration data Dd, when the magnitude of an xy acceleration generated in the left controller 3 at the current moment is greater than a threshold for a swing determination regarding the left controller 3, the processor 81 determines that the left controller 3 is swung. Here, the xy acceleration is an acceleration obtained by removing a z-axis direction component (i.e., a horizontal direction component of the left controller 3 in an operation by the vertically-held operation method described with reference to FIGS. 8 to 13) from accelerations generated in the left controller 3.

Next, the processor 81 performs a right controller swing recognition process (step S164), and the processing proceeds to the next step. For example, with reference to the acceleration data Dd, when the magnitude of an xy acceleration generated in the right controller 4 at the current moment is greater than a threshold for a swing determination regarding the right controller 4, the processor 81 determines that the right controller 4 is swung. Here, the xy acceleration is an acceleration obtained by removing a z-axis direction component (i.e., a horizontal direction component of the right controller 4 in an operation by the vertically-held operation method described with reference to FIGS. 8 to 13) from accelerations generated in the right controller 4.

Next, the processor 81 performs a first object action process (step S165), and the processing proceeds to the next step. For example, in accordance with the determination in the above step S163 that the left controller 3 is swung, the processor 81 starts the movement of the first object G1 from the movement start position. Then, in accordance with the tilt in the z-axis direction of the left controller 3 relative to the direction of the gravitational acceleration, the processor 81 changes the moving direction of the first object G1. Specifically, the processor 81 acquires the orientation of the left controller 3 with reference to the orientation data Db and calculates the tilt in the z-axis direction of the left controller 3 relative to the direction of the gravitational acceleration. Further, in accordance with the angular velocity of the left controller 3 about the direction of the gravitational acceleration, the processor 81 changes the moving direction of the first object G1. Specifically, with reference to the angular velocity data Dc, the processor 81 acquires angular velocities about the xyz axes generated in the left controller 3, and based on the acquired angular velocities, the processor 81 calculates the angular velocity of the left controller 3 about the direction of the gravitational acceleration. Then, based on the moving direction and the movement algorithm of the first object G1, the processor 81 continues the movement of the first object G1 until the first object G1 returns to the movement start position. For example, with reference to the player object position data Dm, the processor 81 acquires the position and the moving direction of the first object G1, and based on the moving direction and the movement algorithm, the processor 81 causes the first object G1 to move from the acquired position of the first object G1. Then, the processor 81 updates the player object position data Dm using the position of the first object G1 after the movement. It should be noted that when the first object G1 is moving on a homeward path in the virtual space for returning to the movement start position, the processor 81 may fixedly set the moving direction to the direction in which the first object G1 returns from the current position of the first object G1 to the movement start position. Further, when the first object G1 collides with another object, the position of the first object G1 is set to a position corresponding to this collision state. Further, when the player object PO does not perform the action of throwing a left punch, the position of the first object G1 is set to a movement start position based on the position of the player object PO.

Next, the processor 81 performs a second object action process (step S166), and the processing proceeds to the next step. For example, in accordance with the determination in the above step S164 that the right controller 4 is swung, the processor 81 starts the movement of the second object G2 from the movement start position. Then, in accordance with the tilt in the z-axis direction of the right controller 4 relative to the direction of the gravitational acceleration, the processor 81 changes the moving direction of the second object G2. Specifically, the processor 81 acquires the orientation of the right controller 4 with reference to the orientation data Db and calculates the tilt in the z-axis direction of the right controller 4 relative to the direction of the gravitational acceleration. Further, in accordance with the angular velocity of the right controller 4 about the direction of the gravitational acceleration, the processor 81 changes the moving direction of the second object G2. Specifically, with reference to the angular velocity data Dc, the processor 81 acquires angular velocities about the xyz axes generated in the right controller 4, and based on the angular velocities, the processor 81 calculates the angular velocity of the right controller 4 about the direction of the gravitational acceleration. Then, based on the moving direction and the movement algorithm of the second object G2, the processor 81 continues the movement of the second object G2 until the second object G2 returns to the movement start position. For example, with reference to the player object position data Dm, the processor 81 acquires the position and the moving direction of the second object G2, and based on the moving direction and the movement algorithm, the processor 81 causes the second object G2 to move from the acquired position of the second object G2. Then, the processor 81 updates the player object position data Dm using the position of the second object G2 after the movement. It should be noted that when the second object G2 is moving on a homeward path in the virtual space for returning to the movement start position, the processor 81 may fixedly set the moving direction to the direction in which the second object G2 returns from the current position of the second object G2 to the movement start position. Further, when the second object G2 collides with another object, the position of the second object G2 is set to a position corresponding to this collision state. Further, when the player object PO does not perform the action of throwing a right punch, the position of the second object G2 is set to a movement start position based on the position of the player object PO.

Next, the processor 81 performs a player object action process (step S167), and the processing proceeds to the next step. For example, based on the description of the operation correspondence table indicated by the operation correspondence table data Dk, the processor 81 sets the content of an instruction indicated by the operation data acquired in the above step S161, and in accordance with the set content of the instruction, the processor 81 causes the player object PO to perform an action, thereby updating the player object position data Dm. That is, with reference to the orientation data Db, when both the left controller 3 and the right controller 4 are tilted to the left, the processor 81 causes the player object PO to move to the left at a moving velocity corresponding to the tilt angle, thereby updating the player object position data Dm. With reference to the orientation data Db, when both the left controller 3 and the right controller 4 are tilted to the right, the processor 81 causes the player object PO to move to the right at a moving velocity corresponding to the tilt angle, thereby updating the player object position data Dm. With reference to the orientation data Db, when both the left controller 3 and the right controller 4 are tilted forward, the processor 81 causes the player object PO to move forward at a moving velocity corresponding to the tilt angle, thereby updating the player object position data Dm. With reference to the orientation data Db, when both the left controller 3 and the right controller 4 are tilted backward, the processor 81 causes the player object PO to move backward at a moving velocity corresponding to the tilt angle, thereby updating the player object position data Dm. Then, with reference to the orientation data Db, when both the left controller 3 and the right controller 4 are tilted inward, and if the first object G1 and the second object G2 are placed at the movement start positions, the processor 81 causes the player object PO to perform a defense action. Further, with reference to the operation data Da, when the first L-button 38 is pressed, the processor 81 causes the player object PO to move dashing, thereby updating the player object position data Dm. Further, with reference to the operation data Da, when the first R-button 60 is pressed, the processor 81 causes the player object PO to jump, thereby updating the player object position data Dm.

Next, the processor 81 performs the process of generating vibration data for vibrating the left controller 3 (step S168), and the processing proceeds to the next step. For example, the processor 81 generates a vibration waveform corresponding to the type, the moving velocity, the moving direction, the collision state, and the like of the first object G1, and based on the vibration waveform, the processor 81 generates vibration data for vibrating the left controller 3, thereby updating the left controller vibration data Df. It should be noted that when the moving velocity or the moving direction of the first object G1 changes or when the first object G1 collides with another object, the processor 81 may change the amplitude or the frequency to vibrate the left controller 3 in accordance with the change or the degree of impact. Further, the processor 81 may add a vibration corresponding to the situation of the virtual game world except for the first object G1 to the vibration waveform. For example, the processor 81 may add to the vibration waveform a vibration corresponding to the action of the player object PO or an impact imparted to the player object PO, a vibration corresponding to the situation of the game field, a vibration corresponding to BGM or a sound effect, or the like.

Next, the processor 81 performs the process of adjusting the amplitude of the vibration data for vibrating the left controller 3 (step S169), and the processing proceeds to the next step. For example, based on an operation method indicated by the operation method data De (the vertically-held operation method), the processor 81 adjusts the amplitude of the vibration data generated in the above step S168 and updates the left controller adjusted vibration data Dh using the adjusted vibration data. Specifically, the processor 81 compares a value obtained by calculating an amplitude value indicated by a vibration waveform indicated by the left controller vibration data Df (a vibration waveform for the left controller) using the first sub-function (the coefficient a; a=1, for example), with a value limited using the second sub-function (the upper limit value b; b=1, for example), selects a smaller value as an adjusted amplitude value, and adjusts the vibration waveform using the adjusted amplitude value, thereby updating the left controller adjusted vibration data Dh. It should be noted that in the case of the vertically-held operation method, a setting is made so that the coefficient a=1 and the upper limit value b=1 (the maximum value of the amplitude), and as a result, the amplitude is not adjusted. In such a case, the amplitude adjustment process in the above step S169 may not be performed, and the left controller adjusted vibration data Dh may be updated using the vibration data generated in the above step S168 as it is.

Next, the processor 81 performs the process of generating vibration data for vibrating the right controller 4 (step S170), and the processing proceeds to the next step. For example, the processor 81 generates a vibration waveform corresponding to the type, the moving velocity, the moving direction, the collision state, and the like of the second object G2, and based on the vibration waveform, the processor 81 generates vibration data for vibrating the right controller 4, thereby updating the right controller vibration data Dg. It should be noted that when the moving velocity or the moving direction of the second object G2 changes or when the second object G2 collides with another object, the processor 81 may change the amplitude or the frequency to vibrate the right controller 4 in accordance with the change or the degree of impact. Further, the processor 81 may add a vibration corresponding to the situation of the virtual game world except for the second object G2 to the vibration waveform. For example, the processor 81 may add to the vibration waveform a vibration corresponding to the action of the player object PO or an impact imparted to the player object PO, a vibration corresponding to the situation of the game field, a vibration corresponding to BGM or a sound effect, or the like.

Next, the processor 81 performs the process of adjusting the amplitude of the vibration data for vibrating the right controller 4 (step S171), and the processing proceeds to the next step. For example, based on an operation method indicated by the operation method data De (the vertically-held operation method), the processor 81 adjusts the amplitude of the vibration data generated in the above step S170 and updates the right controller adjusted vibration data Di using the adjusted vibration data. Specifically, the processor 81 compares a value obtained by calculating an amplitude value indicated by a vibration waveform indicated by the right controller vibration data Dg (a vibration waveform for the right controller) using the first sub-function (the coefficient a; a=1, for example), with a value limited using the second sub-function (the upper limit value b; b=1, for example), selects a smaller value as an adjusted amplitude value, and adjusts the vibration waveform using the adjusted amplitude value, thereby updating the right controller adjusted vibration data Di. It should be noted that in the case of the vertically-held operation method, a setting is made so that the coefficient a=1 and the upper limit value b=1 (the maximum value of the amplitude), and as a result, the amplitude is not adjusted. In such a case, the amplitude adjustment process in the above step S171 may not be performed, and the right controller adjusted vibration data Di may be updated using the vibration data generated in the above step S170 as it is.

Next, the processor 81 performs the process of, in each cycle of transmitting vibration data, transmitting vibration data corresponding to this cycle to the left controller 3 and the right controller 4 (step S172), and the processing of this subroutine ends. For example, with reference to the left controller adjusted vibration data Dh, the processor 81 transmits vibration data for a vibration length corresponding to the transmission cycle to the left controller 3. Further, with reference to the right controller adjusted vibration data Di, the processor 81 transmits vibration data for a vibration length corresponding to the transmission cycle to the right controller 4. The vibration data for each controller is thus transmitted, whereby each of the left controller 3 and the right controller 4 receiving the vibration data vibrates based on vibration waveforms corresponding to the vibration data.

Referring back to FIG. 28, when it is determined in the above step S145 that the vertically-held operation method is not selected, the processor 81 determines whether or not the extension grip operation method is selected (step S147). Then, when the extension grip operation method is selected, the processing proceeds to step S148. On the other hand, when the extension grip operation method is not selected, the processing proceeds to step S149.

In step S148, the processor 81 performs a game process by the extension grip operation method, and the processing proceeds to step S152. With reference to FIG. 30, the game process by the extension grip operation method is described below.

In FIG. 30, the processor 81 acquires operation data from the left controller 3 and the right controller 4 and updates the operation data Da (step S181), and the processing proceeds to the next step.

Next, the processor 81 performs a first object action process (step S182), and the processing proceeds to the next step. For example, based on the description of the operation correspondence table indicated by the operation correspondence table data Dk, the processor 81 sets the content of an instruction indicated by the operation data acquired in the above step S181, and in accordance with the set content of the instruction, the processor 81 causes the first object G1 to perform an action, thereby updating the player object position data Dm.

For example, when the operation data acquired in the above step S181 indicates a pressing operation on the B-button 54, the processor 81 starts the movement of the first object G1 from the movement start position in a predetermined direction, thereby updating the player object position data Dm. Further, when the operation data acquired in the above step S181 indicates a tilt operation on the analog stick 32, and if the first object G1 is moving away from the movement start position in the virtual game world, then in accordance with the direction in which the analog stick 32 is subjected to the tilt operation and the tilt angle, the processor 81 changes the moving direction or the moving velocity of the first object G1, thereby updating the player object position data Dm. Then, based on the moving direction and the movement algorithm of the first object G1, the processor 81 continues the movement of the first object G1 until the first object G1 returns to the movement start position. For example, with reference to the player object position data Dm, the processor 81 acquires the position and the moving direction of the first object G1, and based on the moving direction and the movement algorithm, the processor 81 causes the first object G1 to move from the acquired position of the first object G1. Then, the processor 81 updates the player object position data Dm using the position of the first object G1 after the movement. It should be noted that when the first object G1 is moving on the homeward path in the virtual space for returning to the movement start position, the processor 81 may fixedly set the moving direction to the direction in which the first object G1 returns from the current position of the first object G1 to the movement start position. Further, when the first object G1 collides with another object, the position of the first object G1 is set to a position corresponding to this collision state. Further, when the player object PO does not perform the action of throwing a left punch, the position of the first object G1 is set to a movement start position based on the position of the player object PO.

Next, the processor 81 performs a second object action process (step S183), and the processing proceeds to the next step. For example, based on the description of the operation correspondence table indicated by the operation correspondence table data Dk, the processor 81 sets the content of an instruction indicated by the operation data acquired in the above step S181, and in accordance with the set content of the instruction, the processor 81 causes the second object G2 to perform an action, thereby updating the player object position data Dm.

For example, when the operation data acquired in the above step S181 indicates a pressing operation on the A-button 53, the processor 81 starts the movement of the second object G2 from the movement start position in a predetermined direction, thereby updating the player object position data Dm. Further, when the operation data acquired in the above step S181 indicates a tilt operation on the analog stick 32, and if the second object G2 is moving away from the movement start position in the virtual game world, then in accordance with the direction in which the analog stick 32 is subjected to the tilt operation and the tilt angle, the processor 81 changes the moving direction or the moving velocity of the second object G2, thereby updating the player object position data Dm. Then, based on the moving direction and the movement algorithm of the second object G2, the processor 81 continues the movement of the second object G2 until the second object G2 returns to the movement start position. For example, with reference to the player object position data Dm, the processor 81 acquires the position and the moving direction of the second object G2, and based on the moving direction and the movement algorithm, the processor 81 causes the second object G2 to move from the acquired position of the second object G2. Then, the processor 81 updates the player object position data Dm using the position of the second object G2 after the movement. It should be noted that when the second object G2 is moving on the homeward path in the virtual space for returning to the movement start position, the processor 81 may fixedly set the moving direction to the direction in which the second object G2 returns from the current position of the second object G2 to the movement start position. Further, when the second object G2 collides with another object, the position of the second object G2 is set to a position corresponding to this collision state. Further, when the player object PO does not perform the action of throwing a right punch, the position of the second object G2 is set to a movement start position based on the position of the player object PO.

Next, the processor 81 performs a player object action process (step S184), and the processing proceeds to the next step. For example, based on the description of the operation correspondence table indicated by the operation correspondence table data Dk, the processor 81 sets the content of an instruction indicated by the operation data acquired in the above step S181, and in accordance with the set content of the instruction, the processor 81 causes the player object PO to perform an action, thereby updating the player object position data Dm. That is, with reference to the operation data Da, when the analog stick 32 is subjected to a tilt operation in the positive x-axis direction, the processor 81 causes the player object PO to move to the left at a moving velocity corresponding to the tilt angle, thereby updating the player object position data Dm. With reference to the operation data Da, when the analog stick 32 is subjected to a tilt operation in the negative x-axis direction, the processor 81 causes the player object PO to move to the right at a moving velocity corresponding to the tilt angle, thereby updating the player object position data Dm. With reference to the operation data Da, when the analog stick 32 is subjected to a tilt operation in the positive y-axis direction, the processor 81 causes the player object PO to move forward at a moving velocity corresponding to the tilt angle, thereby updating the player object position data Dm. With reference to the operation data Da, when the analog stick 32 is subjected to a tilt operation in the negative y-axis direction, the processor 81 causes the player object PO to move backward at a moving velocity corresponding to the tilt angle, thereby updating the player object position data Dm. Then, with reference to the operation data Da, when the operation of pushing in the analog stick 32 is performed, and if the first object G1 and the second object G2 are placed at the movement start positions, the processor 81 causes the player object PO to perform a defense action. Further, with reference to the operation data Da, when the Y-button 56 is pressed, the processor 81 causes the player object PO to move dashing, thereby updating the player object position data Dm. Further, with reference to the operation data Da, when the X-button 55 is pressed, the processor 81 causes the player object PO to jump, thereby updating the player object position data Dm.

Next, the processor 81 performs the process of generating vibration data for vibrating the left controller 3 (step S185), and the processing proceeds to the next step. It should be noted that the vibration data generation process in the above step S185 is similar to the vibration data generation process in the above step S168, and therefore is not described in detail here.

Next, the processor 81 performs the process of adjusting the amplitude of the vibration data for vibrating the left controller 3 (step S186), and the processing proceeds to the next step. For example, based on an operation method indicated by the operation method data De (the extension grip operation method), the processor 81 adjusts the amplitude of the vibration data generated in the above step S185 and updates the left controller adjusted vibration data Dh using the adjusted vibration data. Specifically, the processor 81 compares a value obtained by calculating an amplitude value indicated by a vibration waveform indicated by the left controller vibration data Df (a vibration waveform for the left controller) using the first sub-function (the coefficient a; a=0.65, for example), with a value limited using the second sub-function (the upper limit value b; b=0.4, for example), selects a smaller value as an adjusted amplitude value, and adjusts the vibration waveform using the adjusted amplitude value, thereby updating the left controller adjusted vibration data Dh.

Next, the processor 81 performs the process of generating vibration data for vibrating the right controller 4 (step S187), and the processing proceeds to the next step. It should be noted that the vibration data generation process in the above step S187 is similar to the vibration data generation process in above step S170, and therefore is not described in detail here.

Next, the processor 81 performs the process of adjusting the amplitude of the vibration data for vibrating the right controller 4 (step S188), and the processing proceeds to the next step. For example, based on an operation method indicated by the operation method data De (the extension grip operation method), the processor 81 adjusts the amplitude of the vibration data generated in the above step S187 and updates the right controller adjusted vibration data Di using the adjusted vibration data. Specifically, the processor 81 compares a value obtained by calculating an amplitude value indicated by a vibration waveform indicated by the right controller vibration data Dg (a vibration waveform for the right controller) using the first sub-function (the coefficient a; a=0.65, for example), with a value limited using the second sub-function (the upper limit value b; b=0.4, for example), selects a smaller value as an adjusted amplitude value, and adjusts the vibration waveform using the adjusted amplitude value, thereby updating the right controller adjusted vibration data Di.

Next, the processor 81 performs the process of, in each cycle of transmitting vibration data, transmitting vibration data corresponding to this cycle to the left controller 3 and the right controller 4 (step S189), and the processing of this subroutine ends. It should be noted that the vibration data transmission process in the above step S189 is similar to the vibration data transmission process in the above step S172, and therefore is not described in detail here.

Referring back to FIG. 28, when it is determined in the above step S147 that the extension grip operation method is not selected, the processor 81 determines whether or not the mobile device mode operation method is selected (whether or not the main body apparatus 2 is physically connected (connected in a wired manner) to the left controller 3 and the right controller 4) (step S149). Then, when the mobile device mode operation method is selected, the processing proceeds to step S150. On the other hand, when the mobile device mode operation method is not selected, the processing proceeds to step S151.

In step S150, the processor 81 performs a game process by the mobile device mode operation method, and the processing proceeds to step S152. With reference to FIG. 31, the game process by the mobile device mode operation method is described below.

In FIG. 31, the processor 81 acquires operation data from the left controller 3 and the right controller 4, thereby updating the operation data Da (step S191), and the processing proceeds to the next step.

Next, the processor 81 performs a first object action process (step S192), and the processing proceeds to the next step. For example, based on the description of the operation correspondence table indicated by the operation correspondence table data Dk, the processor 81 sets the content of an instruction indicated by the operation data acquired in the above step S191, and in accordance with the set content of the instruction, the processor 81 causes the first object G1 to perform an action, thereby updating the player object position data Dm. It should be noted that the process of the above step S192 is similar to the first object action process in the above step S182, and therefore is not described in detail here.

Next, the processor 81 performs a second object action process (step S193), and the processing proceeds to the next step. For example, based on the description of the operation correspondence table indicated by the operation correspondence table data Dk, the processor 81 sets the content of an instruction indicated by the operation data acquired in the above step S191, and in accordance with the set content of the instruction, the processor 81 causes the second object G2 to perform an action, thereby updating the player object position data Dm. It should be noted that the process of the above step S193 is similar to the second object action process in the above step S183, and therefore is not described in detail here.

Next, the processor 81 performs a player object action process (step S194), and the processing proceeds to the next step. For example, based on the description of the operation correspondence table indicated by the operation correspondence table data Dk, the processor 81 sets the content of an instruction indicated by the operation data acquired in the above step S191, and in accordance with the set content of the instruction, the processor 81 causes the player object PO to perform an action, thereby updating the player object position data Dm. It should be noted that the process of the above step S194 is similar to the player object action process in above step S184, and therefore is not described in detail here.

Next, the processor 81 performs the process of generating vibration data for vibrating the left controller 3 (step S195), and the processing proceeds to the next step. It should be noted that the vibration data generation process in the above step S195 is similar to the vibration data generation process in above step S168, and therefore is not described in detail here.

Next, the processor 81 performs the process of adjusting the amplitude of the vibration data for vibrating the left controller 3 (step S196), and the processing proceeds to the next step. For example, based on an operation method indicated by the operation method data De (the mobile device mode operation method), the processor 81 adjusts the amplitude of the vibration data generated in the above step S195 and updates the left controller adjusted vibration data Dh using the adjusted vibration data. Specifically, the processor 81 compares a value obtained by calculating an amplitude value indicated by a vibration waveform indicated by the left controller vibration data Df (a vibration waveform for the left controller) using the first sub-function (the coefficient a; a=0.45, for example), with a value limited using the second sub-function (the upper limit value b; b=0.1, for example), selects a smaller value as an adjusted amplitude value, and adjusts the vibration waveform using the adjusted amplitude value, thereby updating the left controller adjusted vibration data Dh.

Next, the processor 81 performs the process of generating vibration data for vibrating the right controller 4 (step S197), and the processing proceeds to the next step. It should be noted that the vibration data generation process in the above step S197 is similar to the vibration data generation process in above step S170, and therefore is not described in detail here.

Next, the processor 81 performs the process of adjusting the amplitude of the vibration data for vibrating the right controller 4 (step S198), and the processing proceeds to the next step. For example, based on an operation method indicated by the operation method data De (the mobile device mode operation method), the processor 81 adjusts the amplitude of the vibration data generated in the above step S197 and updates the right controller adjusted vibration data Di using the adjusted vibration data. Specifically, the processor 81 compares a value obtained by calculating an amplitude value indicated by a vibration waveform indicated by the right controller vibration data Dg (a vibration waveform for the right controller) using the first sub-function (the coefficient a; a=0.65, for example), with a value limited using the second sub-function (the upper limit value b; b=0.4, for example), selects a smaller value as an adjusted amplitude value, and adjusts the vibration waveform using the adjusted amplitude value, thereby updating the right controller adjusted vibration data Di.

Next, the processor 81 performs the process of, in each cycle of transmitting vibration data, transmitting vibration data corresponding to this cycle to the left controller 3 and the right controller 4 (step S199), and the processing of this subroutine ends. It should be noted that the vibration data transmission process in the above step S199 is similar to the vibration data transmission process in the above step S172, and therefore is not described in detail here.

Referring back to FIG. 28, when it is determined in the above step S149 that the mobile device mode operation method is not selected, the processing proceeds to step S149 on the assumption that the horizontally-held operation method is selected. In step S149, the processor 81 performs a game process by the horizontally-held operation method, and the processing proceeds to step S152. With reference to FIG. 32, the game process by the horizontally-held operation method is described below.

In FIG. 32, the processor 81 acquires operation data from the left controller 3 or the right controller 4 set as a controller for use in the horizontally-held operation method, thereby updating the operation data Da (step S201), and the processing proceeds to the next step.

Next, the processor 81 performs a first object action process (step S202), and the processing proceeds to the next step. For example, based on the description of the operation correspondence table indicated by the operation correspondence table data Dk, the processor 81 sets the content of an instruction indicated by the operation data acquired in the above step S201, and in accordance with the set content of the instruction, the processor 81 causes the first object G1 to perform an action, thereby updating the player object position data Dm.

For example, in the horizontally-held operation method using the left controller 3, when the operation data acquired in the above step S201 indicates a pressing operation on the left direction button 36, the processor 81 starts the movement of the first object G1 from the movement start position in a predetermined direction, thereby updating the player object position data Dm. Further, when the operation data acquired in the above step S201 indicates a tilt operation on the analog stick 32, and if the first object G1 is moving away from the movement start position in the virtual game world, then in accordance with the direction in which the analog stick 32 is subjected to the tilt operation and the tilt angle, the processor 81 changes the moving direction or the moving velocity of the first object G1, thereby updating the player object position data Dm.

Further, in the horizontally-held operation method using the right controller 4, when the operation data acquired in the above step S201 indicates a pressing operation on the A-button 53, the processor 81 starts the movement of the first object G1 from the movement start position in a predetermined direction, thereby updating the player object position data Dm. Further, when the operation data acquired in the above step S201 indicates a tilt operation on the analog stick 52, and if the first object G1 is moving away from the movement start position in the virtual game world, then in accordance with the direction in which the analog stick 52 is subjected to the tilt operation and the tilt angle, the processor 81 changes the moving direction or the moving velocity of the first object G1, thereby updating the player object position data Dm.

Then, in a horizontally-held operation method using either controller, then based on the moving direction and the movement algorithm of the first object G1, the processor 81 continues the movement of the first object G1 until the first object G1 returns to the movement start position. For example, with reference to the player object position data Dm, the processor 81 acquires the position and the moving direction of the first object G1, and based on the moving direction and the movement algorithm, the processor 81 causes the first object G1 to move from the position of the first object G1. Then, the processor 81 updates the player object position data Dm using the position of the first object G1 after the movement. It should be noted that when the first object G1 is moving on the homeward path in the virtual space for returning to the movement start position, the processor 81 may fixedly set the moving direction to the direction in which the first object G1 returns from the current position of the first object G1 to the movement start position. Further, when the first object G1 collides with another object, the position of the first object G1 is set to a position corresponding to this collision state. Further, when the player object PO does not perform the action of throwing a left punch, the position of the first object G1 is set to a movement start position based on the position of the player object PO.

Next, the processor 81 performs a second object action process (step S203), and the processing proceeds to the next step. For example, based on the description of the operation correspondence table indicated by the operation correspondence table data Dk, the processor 81 sets the content of an instruction indicated by the operation data acquired in the above step S201, and in accordance with the set content of the instruction, the processor 81 causes the second object G2 to perform an action, thereby updating the player object position data Dm.

For example, in the horizontally-held operation method using the left controller 3, when the operation data acquired in the above step S201 indicates a pressing operation on the down direction button 34, the processor 81 starts the movement of the second object G2 from the movement start position in a predetermined direction, thereby updating the player object position data Dm. Further, when the operation data acquired in the above step S201 indicates a tilt operation on the analog stick 32, and if the second object G2 is moving away from the movement start position in the virtual game world, then in accordance with the direction in which the analog stick 32 is subjected to the tilt operation and the tilt angle, the processor 81 changes the moving direction or the moving velocity of the second object G2, thereby updating the player object position data Dm.

Further, in the horizontally-held operation method using the right controller 4, when the operation data acquired in the above step S201 indicates a pressing operation on the X-button 55, the processor 81 starts the movement of the second object G2 from the movement start position in a predetermined direction, thereby updating the player object position data Dm. Further, when the operation data acquired in the above step S201 indicates a tilt operation on the analog stick 52, and if the second object G2 is moving away from the movement start position in the virtual game world, then in accordance with the direction in which the analog stick 52 is subjected to the tilt operation and the tilt angle, the processor 81 changes the moving direction or the moving velocity of the second object G2, thereby updating the player object position data Dm.

Then, in a horizontally-held operation method using either controller, then based on the moving direction and the movement algorithm of the second object G2, the processor 81 continues the movement of the second object G2 until the second object G2 returns to the movement start position. For example, with reference to the player object position data Dm, the processor 81 acquires the position and the moving direction of the second object G2, and based on the moving direction and the movement algorithm, the processor 81 causes the second object G2 to move from the position of the second object G2. Then, the processor 81 updates the player object position data Dm using the position of the second object G2 after the movement. It should be noted that when the second object G2 is moving on the homeward path in the virtual space for returning to the movement start position, the processor 81 may fixedly set the moving direction to the direction in which the second object G2 returns from the current position of the second object G2 to the movement start position. Further, when the second object G2 collides with another object, the position of the second object G2 is set to a position corresponding to this collision state. Further, when the player object PO does not perform the action of throwing a right punch, the position of the second object G2 is set to a movement start position based on the position of the player object PO.

Next, the processor 81 performs a player object action process (step S204), and the processing proceeds to the next step. For example, based on the description of the operation correspondence table indicated by the operation correspondence table data Dk, the processor 81 sets the content of an instruction indicated by the operation data acquired in the above step S201, and in accordance with the set content of the instruction, the processor 81 causes the player object PO to perform an action, thereby updating the player object position data Dm.

That is, in the horizontally-held operation method using the left controller 3, then with reference to the operation data Da, when the analog stick 32 is subjected to a tilt operation in the positive y-axis direction, the processor 81 causes the player object PO to move to the left at a moving velocity corresponding to the tilt angle, thereby updating the player object position data Dm. With reference to the operation data Da, the analog stick 32 is subjected to a tilt operation in the negative y-axis direction, the processor 81 causes the player object PO to move to the right at a moving velocity corresponding to the tilt angle, thereby updating the player object position data Dm. With reference to the operation data Da, when the analog stick 32 is subjected to a tilt operation in the negative x-axis direction, the processor 81 causes the player object PO to move forward at a moving velocity corresponding to the tilt angle, thereby updating the player object position data Dm. With reference to the operation data Da, when the analog stick 32 is subjected to a tilt operation in the positive x-axis direction, the processor 81 causes the player object PO to move backward at a moving velocity corresponding to the tilt angle, thereby updating the player object position data Dm. Then, with reference to the operation data Da, when the operation of pushing in the analog stick 32 is performed, and if the first object G1 and the second object G2 are placed at the movement start positions, the processor 81 causes the player object PO to perform a defense action. Further, with reference to the operation data Da, when the up direction button 35 is pressed, the processor 81 causes the player object PO to move dashing, thereby updating the player object position data Dm. Further, with reference to the operation data Da, when the right direction button 33 is pressed, the processor 81 causes the player object PO to jump, thereby updating the player object position data Dm.

Further, in the horizontally-held operation method using the right controller 4, then with reference to the operation data Da, when the analog stick 52 is subjected to a tilt operation in the negative y-axis direction, the processor 81 causes the player object PO to move to the left at a moving velocity corresponding to the tilt angle, thereby updating the player object position data Dm. With reference to the operation data Da, when the analog stick 52 is subjected to a tilt operation in the positive y-axis direction, the processor 81 causes the player object PO to move to the right at a moving velocity corresponding to the tilt angle, thereby updating the player object position data Dm. With reference to the operation data Da, when the analog stick 52 is subjected to a tilt operation in the positive x-axis direction, the processor 81 causes the player object PO to move forward at a moving velocity corresponding to the tilt angle, thereby updating the player object position data Dm. With reference to the operation data Da, when the analog stick 52 is subjected to a tilt operation in the negative x-axis direction, the processor 81 causes the player object PO to move backward at a moving velocity corresponding to the tilt angle, thereby updating the player object position data Dm. Then, with reference to the operation data Da, when the operation of pushing in the analog stick 52 is performed, and if the first object G1 and the second object G2 are placed at the movement start positions, the processor 81 causes the player object PO to perform a defense action. Further, with reference to the operation data Da, when the B-button 54 is pressed, the processor 81 causes the player object PO to move dashing, thereby updating the player object position data Dm. Further, with reference to the operation data Da, when the Y-button 56 is pressed, the processor 81 causes the player object PO to jump, thereby updating the player object position data Dm.

Next, the processor 81 performs the process of generating vibration data for vibrating the left controller 3 (step S205), and the processing proceeds to the next step. It should be noted that the vibration data generation process in the above step S205 is similar to the vibration data generation process in above step S168, and therefore is not described in detail here.

Next, the processor 81 performs the process of adjusting the amplitude of the vibration data for vibrating the left controller 3 (step S206), and the processing proceeds to the next step. For example, based on an operation method indicated by the operation method data De (the horizontally-held operation method), the processor 81 adjusts the amplitude of the vibration data generated in the above step S205 and updates the left controller adjusted vibration data Dh using the adjusted vibration data. Specifically, the processor 81 compares a value obtained by calculating an amplitude value indicated by a vibration waveform indicated by the left controller vibration data Df (a vibration waveform for the left controller) using the first sub-function (the coefficient a; a=0.35, for example), with a value limited using the second sub-function (the upper limit value b; b=0.2, for example), selects a smaller value as an adjusted amplitude value, and adjusts the vibration waveform using the adjusted amplitude value, thereby updating the left controller adjusted vibration data Dh.

Next, the processor 81 performs the process of generating vibration data for vibrating the right controller 4 (step S207), and the processing proceeds to the next step. It should be noted that the vibration data generation process in the above step S207 is similar to the vibration data generation process in above step S170, and therefore is not described in detail here.

Next, the processor 81 performs the process of adjusting the amplitude of the vibration data for vibrating the right controller 4 (step S208), and the processing proceeds to the next step. For example, based on an operation method indicated by the operation method data De (the horizontally-held operation method), the processor 81 adjusts the amplitude of the vibration data generated in the above step S207 and updates the right controller adjusted vibration data Di using the adjusted vibration data. Specifically, the processor 81 compares a value obtained by calculating an amplitude value indicated by a vibration waveform indicated by the right controller vibration data Dg (a vibration waveform for the right controller) using the first sub-function (the coefficient a; a=0.35, for example), with a value limited using the second sub-function (the upper limit value b; b=0.2, for example), selects a smaller value as an adjusted amplitude value, and adjusts the vibration waveform using the adjusted amplitude value, thereby updating the right controller adjusted vibration data Di.

Next, the processor 81 performs a vibration combining process (step S209), and the processing proceeds to the next step. For example, based on the left controller adjusted vibration data Dh generated and updated in the above step S206 and the right controller adjusted vibration data Di generated and updated in the above step S208, the processor 81 generates combined vibration data for vibrating a single controller and updates the combined vibration data Dj using the generated data. Specifically, by the above selection method, the above addition method, or the like, the processor 81 combines a vibration waveform indicated by the left controller adjusted vibration data Dh (a vibration waveform for the left controller after being subjected to an amplitude adjustment) and a vibration waveform indicated by the right controller vibration data Dg (a vibration waveform for the right controller after being subjected to an amplitude adjustment) and updates the combined vibration data Dj using the combined vibration waveform.

Next, the processor 81 performs the process of, in each cycle of transmitting vibration data, transmitting vibration data corresponding to this cycle to the left controller 3 or the right controller 4 set as the controller for use in the horizontally-held operation method (step S210), and the processing of this subroutine ends. For example, with reference to the combined vibration data Dj, the processor 81 transmits vibration data for a vibration length corresponding to the transmission cycle to the left controller 3 or the right controller 4. The combined vibration data for vibrating a single controller is thus transmitted, whereby the left controller 3 or the right controller 4 receiving the combined vibration data vibrates based on a vibration waveform corresponding to the combined vibration data.

Referring back to FIG. 28, in step S152, the processor 81 performs a display control process, and the processing proceeds to the next step. For example, the processor 81 places the player object PO, the first object G1, the second object G2, and the enemy object EO on the game field using the player object position data Dm and the enemy object position data Dn. Then, the processor 81 performs the process of generating a virtual space image in which the game field is viewed from a virtual camera placed at a predetermined position (e.g., behind the player object PO), and displaying the virtual space image on a display screen of a display device (e.g., the stationary monitor 6 or the display 12).

Next, the processor 81 determines whether or not the game is to be ended (step S153). In the above step S153, examples of a condition for ending the game include: the fact that the result of the above game is settled; and the fact that the user performs the operation of ending the game. If the game is not to be ended, the processing returns to the above step S145, and the process of step S145 is repeated. If the game is to be ended, the processing of the flow chart ends. Hereinafter, the series of processes of steps S145 to S153 are repeatedly executed until it is determined in step S153 that the game is to be ended.

As described above, in the exemplary embodiment, a function for adjusting the intensity of a vibration is selected in accordance with the operation method that is being used. Thus, it is possible to adjust a vibration to be imparted to a game controller to an appropriate vibration intensity corresponding to the operation method. Further, in the exemplary embodiment, a plurality of sub-functions are selected in accordance with the operation method, and sub-functions can be separately used depending on a strong vibration and a weak vibration. Thus, it is possible to adjust the strong vibration to a suitable vibration intensity and also adjust the weak vibration to a suitable vibration intensity. Thus, it is possible to adjust vibrations to appropriate vibration intensities corresponding to the operation method.

It should be noted that in the above exemplary embodiment, an example has been used where an operation method is selected and set before a game is started. Alternatively, an operation method may be able to be changed even during a game. As an example, an operation method may be configured to be switched in accordance with the fact that a specific operation set for each of the plurality of operation methods described above is performed during a game. As another example, an operation method may be configured to be switched in accordance with the fact that a predetermined operation is performed to suspend a game by displaying options for the operation method, and an option is selected during the suspension of the game.

Further, in the above exemplary embodiment, the main body apparatus 2 performs the process of adjusting the amplitudes of vibration data based on vibration data for the left controller 3 and vibration data for the right controller 4. Alternatively, another apparatus may perform this process. For example, the process of adjusting the amplitudes of the vibration data may be performed by the left controller 3 and/or the right controller 4 that are to vibrate using the vibration data. In this case, the main body apparatus 2 transmits vibration data for the left controller 3 and functions (parameters) for adjusting the amplitude to the target controller, whereby the process of adjusting the amplitude of vibration data can be performed by the controller.

Further, in the above exemplary embodiment, examples have been used where a single user performs game play using the left controller 3 and/or the right controller 4 by the vertically-held operation method, the extension grip operation method, the mobile device mode operation method, and the horizontally-held operation method. Alternatively, it is also possible that a plurality of users perform game play. In this case, regarding the left controller 3 and/or the right controller 4 used by each of the users, a vibration corresponding to an operation method for which each of the users is set may be imparted to the controllers operated by each of the users.

Further, when a plurality of users use one of the left controller 3 and the right controller 4 by the horizontally-held operation method, it is also possible to impart the same vibration to the controller operated by each of the users. For example, an exemplary game is assumed where, when each of a plurality of users plays the same game by the vertically-held operation method, the extension grip operation method, or the mobile device mode operation method, the same vibration is imparted to the left controller 3 held by each of the users, and the same vibration is also imparted to the left controller 3 held by each of the users (e.g., a case where a vibration is imparted to each of the left controller 3 and the right controller 4 in conjunction with BGM or a sound effect reproduced in a game, a case where a plurality of users operate the same player object, or the like). When each of a plurality of users operates the above game by the horizontally-held operation method, a vibration waveform for the left controller 3 and a vibration waveform for the right controller 4 are the same for each user. Thus, the same vibration is imparted to the controller operated by each of the plurality of users.

Further, in the above exemplary embodiment, an example has been used where an operation method is set to the vertically-held operation method, the extension grip operation method, and the mobile device mode operation method using a plurality of controllers. Alternatively, an operation method may be set to each operation method using a single controller, and the intensity of a vibration to be imparted to the single controller may be adjusted in accordance with the operation method. For example, an example has been used where a plurality of controllers (the left controller 3 and the right controller 4) are attached to an accessory device (the extension grip 210), thereby setting an operation method to the extension grip operation method, and a plurality of controllers (the left controller 3 and the right controller 4) are attached to the main body apparatus 2, thereby setting an operation method to the mobile device mode operation method. Alternatively, when one of the controllers is attached to the accessory device or the main body apparatus 2, an operation method may be set to each operation method. As an example, when the left controller 3 is attached to the extension grip 210 or the main body apparatus 2 to which the right controller 4 is already attached or fixed, an operation method may be set to each operation method, and a vibration may be adjusted to an amplitude corresponding to the operation method. As another example, when only the left controller 3 or the right controller 4 is attached to the extension grip 210 or the main body apparatus 2 to which no controller is attached, an operation method may be set to each operation method, and when an operation is performed using only the attached controller, a vibration to be imparted to the controller may be adjusted to an amplitude corresponding to the operation method. Further, even when the above vertically-held operation is performed using only one of the left controller 3 and the right controller 4, an operation method may be set to the vertically-held operation method, and a vibration to be imparted to the one of the controllers used for the operation may be adjusted to an amplitude corresponding to the vertically-held operation method. Further, when game play can be performed using a single game controller different from the left controller 3 and the right controller 4, an operation using the single game controller may be selected, thereby adjusting the intensity of a vibration to be imparted to the game controller in accordance with the type of the selected game controller.

Further, when another member or another apparatus is configured to be attachable to and detachable from the left controller 3 and/or the right controller 4, the amplitude of a vibration may be adjusted depending on whether or not the other member or the other apparatus is attached. For example, when an external battery (e.g., a storage battery) is attachable to and detachable from the left controller 3 and/or the right controller 4, the amplitude of a vibration may be changed depending on whether or not the external battery is attached. As an example, the amplitude of a vibration may be adjusted using functions (parameters) different between a case where the horizontally-held operation method is used in the state where the external battery is attached, and a case where the horizontally-held operation method is used in the state where the external battery is not attached. The attachment and detachment of the external battery to and from the left controller 3 and/or the right controller 4 is detected, and the detection information is transmitted to the main body apparatus 2, whereby it is possible to select functions (parameters) for adjusting the amplitude of a vibration based on the detection information.

Further, in the above exemplary embodiment, an example has been used where the amplitude of a vibration is adjusted in accordance with the operation method that is being used. Alternatively, the frequency of a vibration may be adjusted in accordance with the operation method. For example, operation devices have different resonance frequency characteristics depending on the shape, the size, the weight, the material, and the like of an operation device used for an operation. Further, depending on an operation device used for an operation, a case is also possible where there are a frequency range where the user operating the operation device is likely to feel a vibration, and a frequency range where the user is less likely to feel a vibration. To avoid such a resonance frequency specific to an operation device, such a frequency range where a vibration is likely to be felt, and/or such a frequency range where a vibration is less likely to be felt, or to positively aim this resonance frequency and/or this frequency range, the frequency of a vibration may be adjusted. Further, depending on the configuration of an operation device, a case is possible where a vibration having a relatively high frequency is likely to be felt, or a case where a vibration having a relatively low frequency is likely to be felt. In such a case, in accordance with the characteristics of the operation device, the frequency of a vibration to be imparted to the operation device may be shifted to a relatively high frequency or a relatively low frequency, thereby adjusting the frequency. Further, the adjustment of the frequency of a vibration may be added to the adjustment of the amplitude of a vibration corresponding to the above operation method.

Further, in the above exemplary embodiment, the method for detecting the motions and the orientations of the left controller 3 and the right controller 4 is merely illustrative, and the motions and the orientations of the left controller 3 and the right controller 4 may be detected using another method or other data. Further, in the above exemplary embodiment, a game image corresponding to an operation using the left controller 3 or the right controller 4 is displayed on the stationary monitor 6. Alternatively, the game image may be displayed on the display 12 of the main body apparatus 2. Further, a controller for controlling the actions of the first object G1 and/or the second object G2 may not only be a set of the left controller 3 and the right controller 4, but also be obtained by combining another controller with the left controller 3 and/or the right controller 4, or combining other controllers together.

Further, in another exemplary embodiment, the main body apparatus 2 may be able to directly communicate with the stationary monitor 6. For example, the main body apparatus 2 and the stationary monitor 6 may be able to directly perform wired communication with each other, or directly perform wireless communication with each other. In this case, based on whether or not the main body apparatus 2 and the stationary monitor 6 can directly communicate with each other, the main body apparatus 2 may determine the display destination of an image.

Further, an additional apparatus (e.g., a cradle) may be any additional apparatus attachable to and detachable from the main body apparatus 2. The additional apparatus may or may not have the function of charging the main body apparatus 2 as in the exemplary embodiment.

Further, the game system 1 may be any apparatus, and may be a mobile game apparatus, any mobile electronic device (a PDA (Personal Digital Assistant), a mobile phone, a personal computer, a camera, a tablet, or the like) or the like.

Further, the above descriptions have been given using an example where the game system 1 performs information processing (game processing) and a communication process. Alternatively, another apparatus may perform at least some of the processing steps. For example, if the game system 1 is further configured to communicate with another apparatus (e.g., another server, another image display device, another game apparatus, or another mobile terminal), the other apparatus may cooperate to perform the processing steps. Another apparatus may thus perform at least some of the processing steps, thereby enabling processing similar to that described above. Further, the above information processing (game processing) can be performed by a processor or the cooperation of a plurality of processors, the processor or the plurality of processors included in an information processing system including at least one information processing apparatus. Further, in the above exemplary embodiment, information processing can be performed by the processor 81 of the game system 1 executing a predetermined program.

Alternatively, part or all of the processing of the flow charts may be performed by a dedicated circuit included in the game system 1.

Here, according to the above variations, it is possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information processing described above are merely illustrative. Thus, it goes without saying that the exemplary embodiment can be achieved also with other orders, other values, and other conditions.

Further, the above program may be supplied to the game system 1 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. When used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, it is an object of the exemplary embodiment to provide an information processing program, an information processing system, an information processing apparatus, and an information processing method that are capable of imparting an appropriate vibration to a user in accordance with the use form of a device including a vibrator.

What is claimed is:

1. A non-transitory computer-readable storage medium having stored therein an information processing program executed by a computer included in an information processing apparatus for vibrating a vibrator of a device including the vibrator, the information processing apparatus comprising a main body, the information processing program causing the computer to execute operations comprising:
   generating vibration data for vibrating the vibrator;
   in accordance with a use form of the device including a first use form in which the device is detached from the main body and used, and a second use form in which the device is attached to the main body and used, selecting a first function or a second function different from the first function depending on whether the use form of the device is the first use form or the second use form;
   based on a first amplitude value in the vibration data and the selected function, setting a second amplitude value; and
   outputting vibration data including the set second amplitude value to the device.

2. The non-transitory computer-readable storage medium having stored therein the information processing program according to claim 1, wherein
   the first amplitude value defines a first degree of increase in amplitude of the vibration data, and
   the second function provides a second degree of increase in amplitude of the vibration data which is smaller than the first degree of increase in the amplitude of the vibration data.

3. The non-transitory computer-readable storage medium having stored therein the information processing program according to claim 1, wherein
   the second function provides an increase in the second amplitude value in the vibration data, a degree of the increase in the second amplitude value being reduced in a stepwise manner or in a gradually decreasing manner.

4. The non-transitory computer-readable storage medium having stored therein the information processing program according to claim 1, wherein
   the second function at least includes a first sub-function and a second sub-function, and
   in the setting of the second amplitude value, in a case where the second function is selected, selecting a calculation result using either (a) the first amplitude value in the vibration data and the first sub-function, or (b) the first amplitude value in the vibration data and the second sub-function, thereby setting the selected result as the second amplitude value.

5. The non-transitory computer-readable storage medium having stored therein the information processing program according to claim 4, wherein
   the first sub-function includes a monomial expression or a polynomial expression including a term for multiplying the first amplitude value in the vibration data by a predetermined coefficient.

6. The non-transitory computer-readable storage medium having stored therein the information processing program according to claim 4, wherein the second sub-function comprises a function for converting the first amplitude value in the vibration data into a predetermined upper limit value.

7. The non-transitory computer-readable storage medium having stored therein the information processing program according to claim 4, wherein
in the setting of the second amplitude value, the first result and the second result are compared, and a smaller one of the first result and the second result is set as the second amplitude value.

8. The non-transitory computer-readable storage medium having stored therein the information processing program according to claim 1, wherein
the first amplitude value defines a first degree of increase in the vibration data, and
the first function comprises a function in which as the first amplitude value in the vibration data increases, a degree of increase in the second amplitude value becomes greater than in the second function.

9. The non-transitory computer-readable storage medium having stored therein the information processing program according to claim 1, wherein
in the setting of the second amplitude value, the second amplitude value is set with respect to a plurality of frequency ranges.

10. The non-transitory computer-readable storage medium having stored therein the information processing program according to claim 1, wherein
the device including the vibrator is a game controller capable of communicating with the information processing apparatus.

11. The non-transitory computer-readable storage medium having stored therein the information processing program according to claim 1, wherein
the use form includes a use form in which a user uses the device including the vibrator by holding the device with one hand, and a use form in which the user uses the device including the vibrator by holding the device with both hands, and
in the selection of the function, different functions are selected depending on whether the use form of the device is the use form in which a user uses the device including the vibrator by holding the device with one hand, or the use form in which the user uses the device including the vibrator by holding the device with both hands.

12. A non-transitory computer-readable storage medium having stored therein the information processing program executed by a computer included in an information processing apparatus for vibrating a vibrator of a device including the vibrator, the information processing program causing the computer to execute:
generating vibration data for vibrating the vibrator;
in accordance with a use form of the device, selecting a first function or a second function, the second function at least including a first sub-function and a second sub-function, and
in a case where the second function is selected, and when a first amplitude value in the vibration data is less than a predetermined threshold, the first sub-function is selected, and when the first amplitude value in the vibration data is equal to or greater than the threshold, the second sub-function is selected,
based on the first amplitude value in the vibration data and the selected function and sub-function, setting a second amplitude value; and
outputting vibration data including the set second amplitude value to the device.

13. A non-transitory computer-readable storage medium having stored therein an information processing program executed by a computer included in an information processing apparatus for vibrating a vibrator of a device including the vibrator, the information processing apparatus comprising a main body, the information processing program causing the computer to execute:
generating vibration data for vibrating the vibrator;
selecting a first function or a second function different from the first function in accordance with a use form of the device, the use form including a first use form in which a user uses a main body of the device including the vibrator by moving the main body, and a second use form in which the user uses the main body of the device including the vibrator by performing an input operation using an input device provided in the device including the vibrator;
based on a first amplitude value in the vibration data and the selected function, setting a second amplitude value; and
outputting vibration data including the set second amplitude value to the device.

14. The non-transitory computer-readable storage medium having stored therein the information processing program according to claim 13, wherein
the second function comprises a function for calculating the second amplitude value to be a value relatively smaller than a value calculated based on the first function, and
in the selection of the function, when the use form of the device is the first use form, the first function is selected, and when the use form of the device is the second use form, the second function is selected.

15. An information processing system including a device including a vibrator, and an information processing apparatus for vibrating the vibrator,
the information processing apparatus comprising a main body and a computer configured to perform operations comprising:
generate vibration data for vibrating the vibrator;
in accordance with a use form of the device including a first use form in which the device is detached from the main body and used, and a second use form in which the device is attached to the main body and used, select a first function or a second function different from the first function depending on whether the use form of the device is the first use form or the second use form;
based on a first amplitude value in the vibration data and the selected function, set a second amplitude value; and
output vibration data including the set second amplitude value to the device, the device comprising a computer configured to vibrate the vibrator based on the vibration data output from the information processing apparatus.

16. An information processing apparatus for vibrating a vibrator of a device including a vibrator, the information processing apparatus comprising a main body and a computer configured to perform operations comprising:
generate vibration data for vibrating the vibrator;
in accordance with a use form of the device including a first use form in which the device is detached from the main body and used, and a second use form in which the device is attached to the main body and used, select a first function or a second function different from the first function depending on whether the use form of the device is the first use form or the second use form;

based on a first amplitude value in the vibration data and the selected function, set a second amplitude value; and output vibration data including the set second amplitude value to the device.

17. An information processing method for vibrating a vibrator of a device including a vibrator, the information processing method comprising:

generating vibration data for vibrating the vibrator;

in accordance with a use form of the device including a first use form in which the device is detached from the main body and used, and a second use form in which the device is attached to the main body and used, selecting a first function or a second function different from the first function depending on whether the use form is the first use form or the second use form;

based on a first amplitude value in the vibration data and the selected function, setting a second amplitude value; and outputting vibration data including the set second amplitude value to the device.

18. An information processing system including a device including a vibrator, and an information processing apparatus for vibrating the vibrator, the information processing apparatus comprising a main body and a computer configured to perform operations comprising:

generate vibration data for vibrating the vibrator;

select a first function or a second function different from the first function in accordance with a use form of the device, the use form including a first use form in which a user uses a main body of the device including the vibrator by moving the main body, and a second use form in which the user uses the main body of the device including the vibrator by performing an input operation using an input device provided in the device including the vibrator;

based on a first amplitude value in the vibration data and the selected function, set a second amplitude value; and output vibration data including the set second amplitude value to the device, the device comprising a computer configured to vibrate the vibrator based on the vibration data output from the information processing apparatus.

19. An information processing apparatus for vibrating a vibrator of a device including a vibrator, the information processing apparatus comprising a main body and a computer configured to perform operations comprising:

generate vibration data for vibrating the vibrator;

select a first function or a second function different from the first function in accordance with a use form of the device, the use form including a first use form in which a user uses a main body of the device including the vibrator by moving the main body, and a second use form in which the user uses the main body of the device including the vibrator by performing an input operation using an input device provided in the device including the vibrator;

based on a first amplitude value in the vibration data and the selected function, set a second amplitude value; and output vibration data including the set second amplitude value to the device.

20. An information processing method for vibrating a vibrator of a device including a vibrator, the information processing method comprising:

generating vibration data for vibrating the vibrator;

selecting a first function or a second function different from the first function in accordance with a use form of the device, the use form including a first use form in which a user uses a main body of the device including the vibrator by moving the main body, and a second use form in which the user uses the main body of the device including the vibrator by performing an input operation using an input device provided in the device including the vibrator;

based on a first amplitude value in the vibration data and the selected function, setting a second amplitude value; and outputting vibration data including the set second amplitude value to the device.

* * * * *